US008214313B1

(12) United States Patent
Puskorius et al.

(10) Patent No.: US 8,214,313 B1
(45) Date of Patent: Jul. 3, 2012

(54) TURN RATE CALCULATION

(75) Inventors: Gintaras V. Puskorius, Novi, MI (US); Bryan R. Goodman, Dearborn, MI (US); Martin Lenardon, Ann Arbor, MI (US); He Li, Novi, MI (US); Barbara Nance, Grosse Ile, MI (US)

(73) Assignee: Ford Motor Company, Dearborn, MI (US)

( * ) Notice: Subject to any disclaimer, the term of this patent is extended or adjusted under 35 U.S.C. 154(b) by 522 days.

(21) Appl. No.: 12/554,686

(22) Filed: Sep. 4, 2009

(51) Int. Cl.
*G06F 15/18* (2006.01)
*G06E 1/00* (2006.01)
*G06E 3/00* (2006.01)
*G06G 7/00* (2006.01)

(52) U.S. Cl. .......................................................... 706/28
(58) Field of Classification Search ...................... 706/28
See application file for complete search history.

(56) References Cited

U.S. PATENT DOCUMENTS

| | | | |
|---|---|---|---|
| 6,212,559 B1 * | 4/2001 | Bixler et al. .................. 709/221 |
| 6,470,324 B1 | 10/2002 | Brown et al. | |
| 6,725,257 B1 | 4/2004 | Cansler et al. | |
| 6,871,198 B2 * | 3/2005 | Neal et al. .............................. 1/1 |
| 7,003,548 B1 | 2/2006 | Barck et al. | |
| 7,227,114 B2 * | 6/2007 | Sebbag et al. ............. 250/203.1 |
| 7,895,586 B2 * | 2/2011 | Ozone ........................... 717/155 |
| 7,958,080 B2 * | 6/2011 | Kumar et al. .................... 706/62 |
| 2002/0143653 A1 | 10/2002 | DiLena et al. | |

FOREIGN PATENT DOCUMENTS

JP 2004287976 A 10/2004

OTHER PUBLICATIONS

Ford Simplifies Vehicle Order Process to Boost Sales, Customer Satisfaction and Dealer Profits. (Web Article found at www.google.com) (3 pages).
Strategic Motor Vehicle Systems (1 page).
English Abstract of JP2004287976 (1 page).
Declaration of Bryan R. Goodman (3 pages).

* cited by examiner

*Primary Examiner* — Michael B Holmes
(74) *Attorney, Agent, or Firm* — Raymond Coppiellie; Ford Global Technologies, LLC

(57) ABSTRACT

A data store includes item configuration data for a plurality of configurations of an item and inventory mix rate data. A computing device is configured to generate a matrix that combines the item configuration data with the inventory mix rate data such that cells in the matrix include an indication of an inventory mix rate related to an item feature; use the matrix to develop a plurality of neural network inventory turn rate models; and use the turn rate models to associate a value with each configuration in the plurality of configurations.

42 Claims, 31 Drawing Sheets

Inventory and Sales Report
2010 Item Sales

History observed week of 5/4/2009 thru week of 8/17/2009
Dealer's turn rate was 1% higher than surrounding market area August 27, 2009

2010 Item Recommended Orders for Week 200933

```
# to order    style     color
1             S01       U1
1             S01       UH
1             S02       ZY
2             S02       U1
1             S02       UH
1             S03       UH
4             S03       WS
```

| 2010 Item - Sales Volumes | | | | | |
|---|---|---|---|---|---|
| | Dealer Sales Volume | | | | |
| Style | Week 28 | Week 29 | Week 30 | Week 31 | Week 32 |
| S01 | 0 | 0 | 2 | 2 | 4 |
| S02 | 1 | 2 | 1 | 3 | 7 |
| S03 | 2 | 0 | 0 | 0 | 2 |
| S04 | 0 | 0 | 1 | 0 | 1 |
| S05 | 1 | 0 | 0 | 0 | 1 |
| Total | 4 | 2 | 4 | 5 | 15 |

Historical mix is derived from a weighted sales history with the most recent sales weighted more heavily. Not showing data in mix tables and graphs where sales and inventory for dealer and market area are less than 2%.

| 2010 Item - Mix Rates | | | |
|---|---|---|---|
| | Dealer | | Market |
| | Historical Sales Mix | Projected Inventory Mix | Historical Sales Mix |
| Base Item | | | |
| B01 | 35% | 5% | 23% |
| B02 | 50% | 40% | 48% |
| B03 | 5% | 18% | 4% |
| B04 | 8% | 14% | 12% |
| B05 | 3% | 23% | 10% |
| B06 | 0% | 0% | 3% |
| Feature 1 | | | |
| Type 1 | 90% | 63% | 74% |
| Type 2 | 10% | 37% | 26% |

TURN RATE CALCULATION

RELATED APPLICATIONS

Some or all of the subject matter disclosed in this application is also disclosed in co-pending applications having Ser. Nos. 12/554,643 and 12/554,672, entitled "FEATURE ALLOCATION" and "ORDER RECOMMENDATIONS," respectively, each of which is filed the same day as the present application and incorporated herein by reference in its entirety.

BACKGROUND

Items for sale may be pre-ordered by a dealer in various configurations based on a forecast of item demand, i.e., based on the number of items of a particular configuration that the dealer thinks it can sell. Once received, pre-ordered items are included in dealer inventory, and may be made available for sale. For many, if not most, manufactured items, a large percentage of retail sales are delivered from available dealer inventory. Therefore, sales rates for items at a dealer are often largely determined based on the configuration of items that the dealer has in inventory.

It is possible that an item may be produced in only one configuration. Accordingly, a forecast of demand would include only the number of units to order. However, many items are produced in multiple configurations of features. In such cases, items may be pre-ordered by a dealer based on a forecast of item demand, where forecasted item demand may be determined from rates at which items having a similar feature or features have recently sold. However, often an item may be ordered with many different combinations of features. This variety in configuration complicates forecasting of item demand because sold items may have configurations including many different features, making it difficult to determine what features contributed to past sales and therefore should be ordered, and in what combination. Variety in configurations for an item also adds difficulties to the parts supply chain for the item, because different configurations may require different materials for manufacture of the items.

BRIEF DESCRIPTION OF THE DRAWINGS

FIGS. 22-24 illustrate pages of an exemplary dealer report.

DETAILED DESCRIPTION

I. Introduction

A. System Overview

Figure 1:
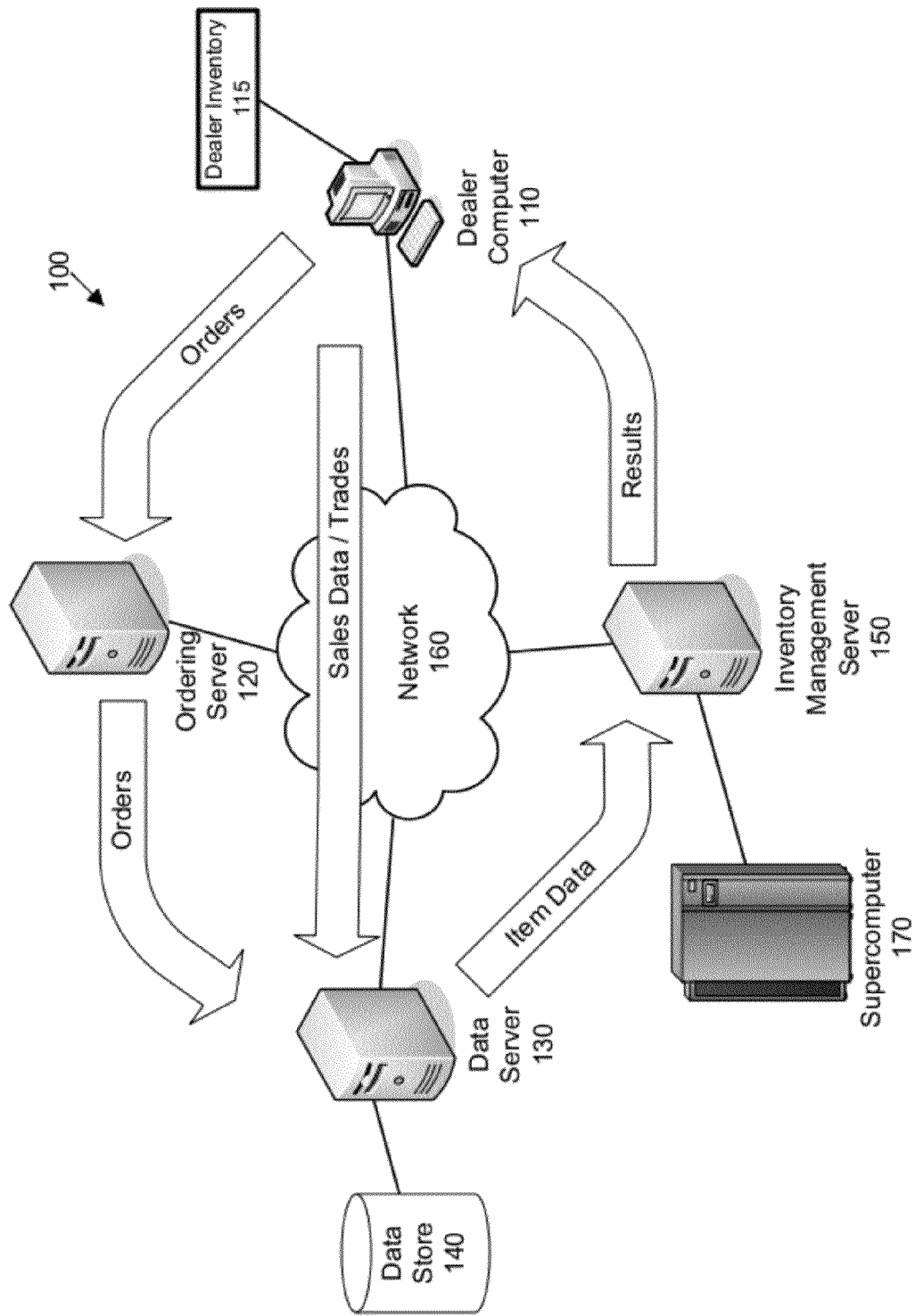
FIG. 1 is a block diagram illustrating an exemplary implementation of a feature selection system.

An order generation system utilizes a feature selection subsystem to generate order recommendations for multiple dealers which result in a balanced inventory. Generally, the order recommendations relate to a particular item, and specify a configuration of a feature or features recommended to be included in the item. A "feature," as that term is used herein, means any characteristic or attribute of an item. A "configuration," as that term is used herein, means a combination of one or more features attributed to an item.

One exemplary use of an order generation system is for automobile dealerships. In the context of automobile dealerships, "retail orders" are orders for vehicles that are specially ordered for customers, while "stock orders" are orders made to replenish dealer inventory. Accordingly, an order generation system may generate recommended stock orders, i.e., orders for vehicles that may be used to replenish dealer stock. In such an example, the item with respect to which an order recommendation is generated may be a particular make and model of a vehicle. Features that may be recommended to be included in vehicles ordered by a dealer could then be determined, such as exterior paint color, transmission type, presence or absence of a moon-roof, wheel size, brake packages, interior trim packages, etc. Specific configurations of the recommended features may then be determined by the order generation system and sent to the dealer as a recommendation of what to order for dealer stock.

In one implementation, the system projects sales and inventory based on reported data and/or assumptions that various quantities of items having various configurations of features have been or will be ordered. The system then performs an optimization to determine quantities of items with various features that the dealer should order. The system then may recommend quantities of items containing various features, i.e., quantities of recommended configurations, to be ordered. The optimization may include minimizing a function of the difference between projected inventory mix rates and target inventory mix rates, where the target may be based on expected sales.

Generally, a "mix rate" is the ratio of items in a particular subset compared to all items regardless of membership in the subset. For example, a sales mix rate for a particular model of vehicle configured with a moonroof would be the ratio of sales for the model with moonroofs (a subset of all units for the model) to the total sales of the model regardless of whether it was sold with a moonroof. For further example, an "inventory mix rate" for an item having a particular feature means the number of the item in inventory having the feature divided by the total number of the items in inventory, regardless of whether the feature is present.

Minimizing the difference between projected inventory mix rates and target inventory mix rates means that the order generation system may attempt to provide a dealer with what is referred to as a "balanced inventory." One meaning of a balanced inventory is that projected sales mix rates and projected inventory mix rates are equal, or as close to it as possible. (Other ways of understanding the concept of balanced inventory are discussed below.) The order generation system may generate both projected sales mix rates and projected inventory mix rates for a dealer, and uses these projections to attempt to balance inventory.

In general, once the order generation system determines feature allocations that are used to arrive at balanced inventory, the order generation system may then recommend that a dealer order configurations including the allocated features. Which configurations to choose, and how many of each configuration, may be determined based on a measure of the goodness of each particular configuration, i.e., how much better one configuration is over other configurations. For example, a goal of determining recommended configurations may be to create a fast turning inventory, i.e., an inventory in which items remain for a relatively short time before being sold. Where fast turning inventory is a goal, a better configuration may be defined as a configuration that is more likely to sell quickly.

Accordingly, the system may determine inventory turn rates associated with items and features. An "inventory turn rate" for an item is essentially the rate of sale for the item, i.e., the rate at which the item is turned from inventory. Factors that may affect the inventory turn rate other than sales, such as dealer trades, may also be taken into account. Other measures of how good one configuration of features is compared to other configurations of features are possible (i.e., relative goodness). However, in some instances the order generation system may use what are referred to as "inventory turn rate calculators" to measure the relative goodness of one configuration over other configurations in terms of inventory turn rate. The system may use various processes such as those described below to develop the inventory turn rate calculators.

In general, inventory turn rates for an item with a configuration of features are a function of (i) the demand for the item with the configuration and (ii) its availability in inventory. Inventory turn rates for an item may further be a function of the availability of other similar items in inventory at a dealer of interest and also in the market area of the dealer. However, in practice demand is generally not a linear function, and other factors can affect inventory turn rates as well. For example, attempting to estimate demand for an item associated with a particular feature can be affected by other features with which the particular feature is bundled. In other words, it can be difficult to look at features in isolation. Moreover, some factors relevant to turn rates may not be observed, or observable, and therefore are not knowable to the system. Such factors may present disturbances affecting the usefulness of inventory turn rate functions derived from past inventories and sales rates. Therefore, the system may use neural networking technology or another suitable technology to generate turn rate calculators providing projected turn rates that in turn are used to maximize relative goodness for recommended configurations, and thus generate order recommendations.

Order recommendations may take into account history and projections concerning multiple order cycles. For example, if an order cycle is weekly, meaning that dealer orders are submitted once per week, item orders may be managed for multi-week periods. Managing orders over a span of multiple order cycles can be useful in managing a supply chain for materials required in item manufacture, in addition to providing order recommendations that will assist dealers in maximizing their sales.

B. Configuration

An item configuration is a unique or substantially unique combination of features associated with, i.e., attributable to, an item. Generally, but not necessarily, an item configuration includes all of the features that may be attributed to the item. For example, if the item is a vehicle, a configuration may include a combination of all selectable features with which the vehicle is sold, e.g., exterior paint color, interior trim color, transmission type, presence or absence of a moon-roof, wheel size, brake packages, interior trim packages, etc.

An item may be manufactured in one or more configurations of features, i.e., for an item, one or more configurations may be possible. For some items, the potential number of unique configurations may number in the hundreds. For more complex items with many available features, the number of configurations of features may number in the tens-of-billions.

C. Constraints and Realizable Configurations

Feature allocations, order recommendations, turn rate calculations, etc. may be subject to various constraints. One type of constraint is a production constraint. A production constraint is a constraint on the ordering of items based on a limit in production. For example, if a certain part is required for a highly desirable feature, and the part is not available, then the order generation system may be configured not to recommend orders or to limit the number of recommended orders including that feature. Thus, a production constraint may prevent a combination of features from including an all-wheel drive system due to a temporary shortage or a limited supply of a particular part or component required for production of items including the all-wheel drive system.

Additional types of constraints may include, for example, a business decision to limit production including a particular feature, and a constraint on production related to a particular region, among others.

In addition, although a large number of possible combinations of features may exist for an item, not all possible combinations of features may be capable of being manufactured. Such a limit on the combination of one or more features may be referred to as a product definition constraint. An example of a product definition constraint may be that for some vehicles a manual transmission may only be available with certain engine choices. As another example, for some vehicles heated seats are only available with leather seats, but never with cloth seats. In some instances, product definition constraints may be the result of lack of engineering plans to account for a possibility, or may be based on a business decision to disallow one or more combinations.

A "realizable" configuration is a combination of features that is possible to be built, given various product definition constraints. An order generation system preferably will not recommend for a dealer to order a configuration that is not realizable.

It is important to note that a configuration may be realizable based on product definition constraints, but may not be buildable at a particular time due to another constraint, such as a production constraint, related to a shortage of a particular required part.

D. Feature Families

A "feature family" is a set of values that comprise all possible values for a feature. An item may possess exactly one feature from a feature family. For example, in general, a vehicle is provided with only one exterior paint color; therefore, a feature family could include a set of possible vehicle colors, where a feature for the vehicle must include only one color. Logically, every feature family must contain at least two values, because if there is only one value in a feature family, i.e., for a feature, then all items with regard to that feature are the same. For example, for features that are either present or not (i.e., binary features), the two features in the family will be the presence of the feature and the absence of the feature. An example of a binary feature is a vehicle rear spoiler. An example of a family including more than two features would be a vehicle paint color feature family, mentioned above. Such a feature family may include many different paint colors, including red, green, blue, white, silver, and black, etc.

A "superfamily" is a logical grouping of two or more feature families. Thus, a superfamily may consist of all possible combinations of features from the different feature families that are included in the superfamily. In other words, a superfamily is comprised of multiple features families, and contains exactly one feature selected from each contributing feature family. Superfamilies are predefined constructs, and are used to allow multiple features to be considered in combination, e.g., where the features are considered to be strongly related. Superfamilies allow for the system to better handle feature family interactions at the feature allocation stage. Without superfamilies, individual feature families would otherwise be considered independently. Generally, superfamilies are created by a user as a logical grouping based on operator knowledge of features that should be considered in combination.

Care must be taken in defining superfamilies, however, because superfamilies introduce additional complexity into feature allocation. For example, for a set of three binary features, there are eight ways to combine the features when put together as a superfamily. However, when considered separately as a sequence of three binary features, there are only six elements to consider, not eight.

E. Metrics

The system determines and utilizes various sales and inventory metrics. These metrics may be determined for a dealer or for a market that, as explained in detail below, is determined with reference to the dealer. Such metrics are sometimes referred to as a dealer-level metrics or market-level metrics, respectively. Further, sales and inventory metrics, and other metrics, may be determined with respect to a feature, or with respect to all configurations for an item. Accordingly, metrics may also be referred to as feature-level, or item-level, as warranted. Note that item-level and configuration-level are sometimes used interchangeably. Mix rates typically represent feature-level or super-feature-level data, while turn rates may represent feature/super-feature-level as well as item-level data. Further, as used herein, a reference to a metric as being on a per-dealer, per-market, etc., basis means the same thing, respectively, as a metric that is dealer-level, market-level, etc.

Some metrics compare feature-level metrics with item-level metrics. For example, a sales mix rate may be a percentage calculated by comparing feature-level sales with item-level sales. Similarly, inventory mix rates may be a percentage of inventory at a given point in time that includes a feature. In general, sales rates may be referred to as inventory turn rates, i.e., the rate at which an item is removed from inventory because it has been sold. As discussed below, projecting and estimating inventory turn rates can be an important component for generating order recommendations.

As mentioned above, the system generally generates order recommendations for a specific dealer for a particular item. Thus, although order recommendations are based both on dealer-level and market-level data, order recommendations are generally tailored for the specific dealer. Further, the system may generate reports for the dealer concerning the dealer's past performance to explain the order recommendations.

F. Sales And Inventory Mix Rates

As explained above, a sales mix rate is the ratio of items sold with a specific feature relative to all sales. A sales mix rate may be determined based on sales data for a particular period of time.

As also discussed above, an inventory mix rate is a ratio of the amount of inventory that has a particular feature compared to a measure of the total inventory of an item with which the feature is associated.

Intuitively, dealers can only sell what they have in inventory, which may lead to the assumption that observed sales mix rates are strongly biased by corresponding production and inventory mix rates. Over an entire run of items, such as an entire model year for a vehicle, this may be true, and over a vehicle model year sales may be a measure of supply. However, it has been discovered that, over a short period of time where only a small fraction of inventory is sold, sales mix rates and inventory mix rates may differ substantially, and accordingly may serve as a measure of demand.

Inventory mix rates and sales mix rates may bear some relationship. For example, if there are no items in inventory with a particular feature, then the inventory mix rate for that feature would be zero. Likewise, the sales mix rate for that feature would also be zero. On the other hand, if all items in inventory have a particular feature, then 100% of the sales will be of items that have that feature.

G. Inventory

1. Balanced Inventory

The order generation system uses a feature selection (sometimes also referred to as feature allocation) subsystem to attempt to provide a dealer with a balanced inventory, referred to above. In a balanced inventory, projected inventory mix rates are roughly equal to historical sales mix rates, possibly adjusted to account for recent trends and/or other external factors. Thus, to balance inventory, the historical sales mix rate may be used to derive a target inventory mix rate, where the target inventory mix rate is a measure of desired inventory based on historical sales mix rates.

Another way of describing balanced inventory is to state that any given item in inventory, regardless of the item's configuration, should have the same probability of sale as any other item in inventory. Yet another way of describing balanced inventory is to state that all items in inventory should have the same inventory turn rate, which may be defined as the number of items, e.g., associated with a particular feature or configuration, that have been sold in a given time period divided by the number of items associated with the feature or configuration that are in inventory during the time period. In other words, a balanced inventory implies that the mix of features for an item in inventory matches what customers are likely to purchase.

A balanced inventory may be created through targeted ordering of items with certain features or combinations of features, incentives or price discounts, or a combination of these strategies. Targeted ordering is often preferable because it leads to higher profits than incentives or discounts.

Targeted ordering may include measuring inventory levels for an item associated with various features, further measuring sales rates of the items including the various features, and then ordering items having feature configurations intended to lead to a balanced inventory in the future. However, because items take time to manufacture, there may be substantial delays associated with such an inventory rebalancing approach through targeted ordering. Accordingly, manufacturing delay must be taken into account when recommending orders in order to create a balanced inventory through inventory projection, discussed in detail below.

2. Fast Turning Inventory

Fast turning inventory is a distinct concept from balanced inventory. Fast turning inventory means that each unit in inventory should have a relatively high probability of sale. For a given dealer, the order generation system may maximize the overall inventory turn rate, i.e., maximizing a risk adjusted rate of sales, by choosing an appropriate mixture of configurations of features. For example, even if red is the best selling vehicle color, the system may determine that, in a given time period, a dealer is likely to sell a small number of white cars even as the dealer sells a larger number of red cars. Thus, to provide each car with a relatively high probability of sale, the system may recommend that the dealer order a relatively large number of red cars but also a smaller number of white cars.

Although promotion of fast turning inventory may lead to an inventory imbalance, such imbalance may be desirable if the resultant inventory includes particular items that turn faster than average. Additionally, a dealer's inventory may be balanced, but slow-turning, in which case additional measures may be required to guide targeted ordering to improve the item turn rate for the dealer.

Fast turning inventory may allow a dealer to maximize profits and minimize the costs of carrying an item in inventory. Further, with a higher inventory turn rate, a dealer or a manufacturer may obtain timely feedback from the marketplace relevant to an inventory stocking strategy, as well as pricing decisions, which then may place the dealer or manufacturer in a better position to adapt to the market as it evolves.

3. Diverse Inventory

While the feature selection subsystem of the order generation system generally attempts to provide dealers with balanced inventories, it may also generate recommendations that attempt to provide a diverse inventory, i.e., an inventory in which items have a diverse set of features. For example, a vehicle dealer may offer a particular make and model of a vehicle where one color is a best seller, but nonetheless may wish to stock a range of colors. In terms of diversity, it may be desirable for a dealer to order a quantity of vehicles with a particular feature. The recommended orders may for example, all be for red vehicles, but a dealer may prefer to order different colored vehicles to have a more diverse inventory of colors. Indeed, the concept of diverse inventory may lead to promoting somewhat less popular features based on a measure between target and actual inventory mix rates in addition to more popular features, because even if a feature is less popular, e.g., a less popular color, there is still a probability that a certain number of items with the less popular feature will be sold. That is, as an example of promoting a diverse inventory, a dealer may prefer to order a variety of configurations even if some of the configurations will lead to slower-turning inventory.

II. Exemplary System Elements

FIG. 1 is a block diagram illustrating an exemplary order generation system 100. The system 100 may include a dealer computer 110, an ordering server 120, a data server 130, a data store 140, an inventory management server 150, and a supercomputer 170. System elements including without limitation the foregoing may be in selective communication with one another over a network 160.

A. Dealer Computer

As illustrated in FIG. 1, feature configuration system 100 includes a dealer computer 110. A dealer may offer merchandise for sale, barter, or trade. For example, a dealer may purchase goods or services from consumers or businesses, and may offer those goods and services for resale, such as to end consumers. The dealer may use dealer computer 110 for various operations, including receiving order recommendations and placing orders in system 100.

A dealer may be a franchisee or may be otherwise authorized by a manufacturer to deal goods of a particular model line or brand. For example, an automobile dealer may be authorized by an automotive manufacturer to sell vehicles from that manufacturer. Moreover, a dealer may be authorized by a manufacturer to operate only in one or more particular markets and/or geographic areas. To allow for the goods and services to be sold, a dealer may maintain an establishment within the authorized market area for the dealer.

As illustrated in FIG. 1, dealer may use a dealer computer 110 to communicate inventory orders to ordering server 120, e.g., via network 160. Although only one dealer computer 110 is shown in FIG. 1, system 100 may include many dealers, and generally does.

B. Dealer Inventory

A dealer may hold a supply or stock of goods in order to offer the goods for sale. Information regarding this supply or stock of goods may be represented by dealer computer 110 as records of dealer inventory 115. Although not shown in FIG. 1, information concerning inventory 115 for a dealer may also be stored in data store 140. Because a dealer may take ownership of goods and/or other assets in dealer inventory 115, the dealer may be exposed to risk if the dealer orders items that sell slowly or not at all. In the case of a vehicle dealer, for example, the longer a vehicle is in dealer inventory 115, the more money the dealer may have to pay in interest on a loan for the vehicle, which may reduce dealer profits. To mitigate this risk, a dealer may endeavor to order an optimal mix and amount of dealer inventory 115. Specifically a dealer may endeavor to have a dealer inventory 115 that is balanced, fast-turning, and diverse.

C. Ordering Server

Ordering server 120 may be implemented as a combination of hardware and software, and may include instructions stored on one or more computer-readable media, the instructions for causing one or more computer processors to perform the operations of the ordering server 120 described herein.

Ordering server 120 may receive orders, and may forward the orders to be built by a manufacturer. For example, ordering server 120 may be in selective communication with one or more dealer computers 110, e.g., via network 160, and may receive item orders from at least a subset of the one or more dealer computers 110. Thus, in some examples, orders are placed via dealer computer 110 and sent to ordering server 120 for further processing. In other examples, dealer computer 110 may use a terminal connection to a mainframe computer to enter orders, where the software that generates the orders runs on the mainframe computer, not the dealer computer 110.

In any event, ordering server 120 or the mainframe may be configured to provide order options or an order form to dealer computer 110 through a user interface, e.g., a graphical user interface (GUI), over a terminal session, etc. The interface may include information relating to features available for one or more items. The interface may further present ordering options according to availability of features for an item and/or according to dependencies between various features.

D. Data Server

Data server 130 may be implemented as a combination of hardware and software, and may include instructions stored on one or more computer-readable media, the instructions for causing one or more computer processors to perform the operations of the data server 130 described herein.

Data server 130 is capable of receiving information from one or more sources. Data server 130 generally includes a set of instructions needed to provide data storage and retrieval functionality for the system 100. Data server 130 may include, or be communicatively coupled to, one or more data stores 140. Although only one data server 130 is illustrated in FIG. 1, systems may include multiple data servers 130. In some systems including multiple data servers 130, each data server 130 may be configured to store and retrieve a particular subset of data, or data of a particular type or types.

E. Data Store

Data store 140 may include one or more data storage mediums, devices, or configurations, and may employ various types, forms, and/or combinations of storage media, including but not limited to hard disk drives, flash drives, read-only memory, and random access memory. Data store 140 may include various technologies useful for storing and accessing information and may be integrated within or external of data server 130. Data server 130 may be configured to communicate with data store 140, including searching, accessing, and retrieving data from host data store 140. Data store 140 may be implemented as a combination of hardware and software, and may include instructions stored on one or more computer-readable media, the instructions for causing one or more computer processors to perform the operations of the data store 140 described herein.

Data store 140 may be configured to store any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS).

Figure 2:
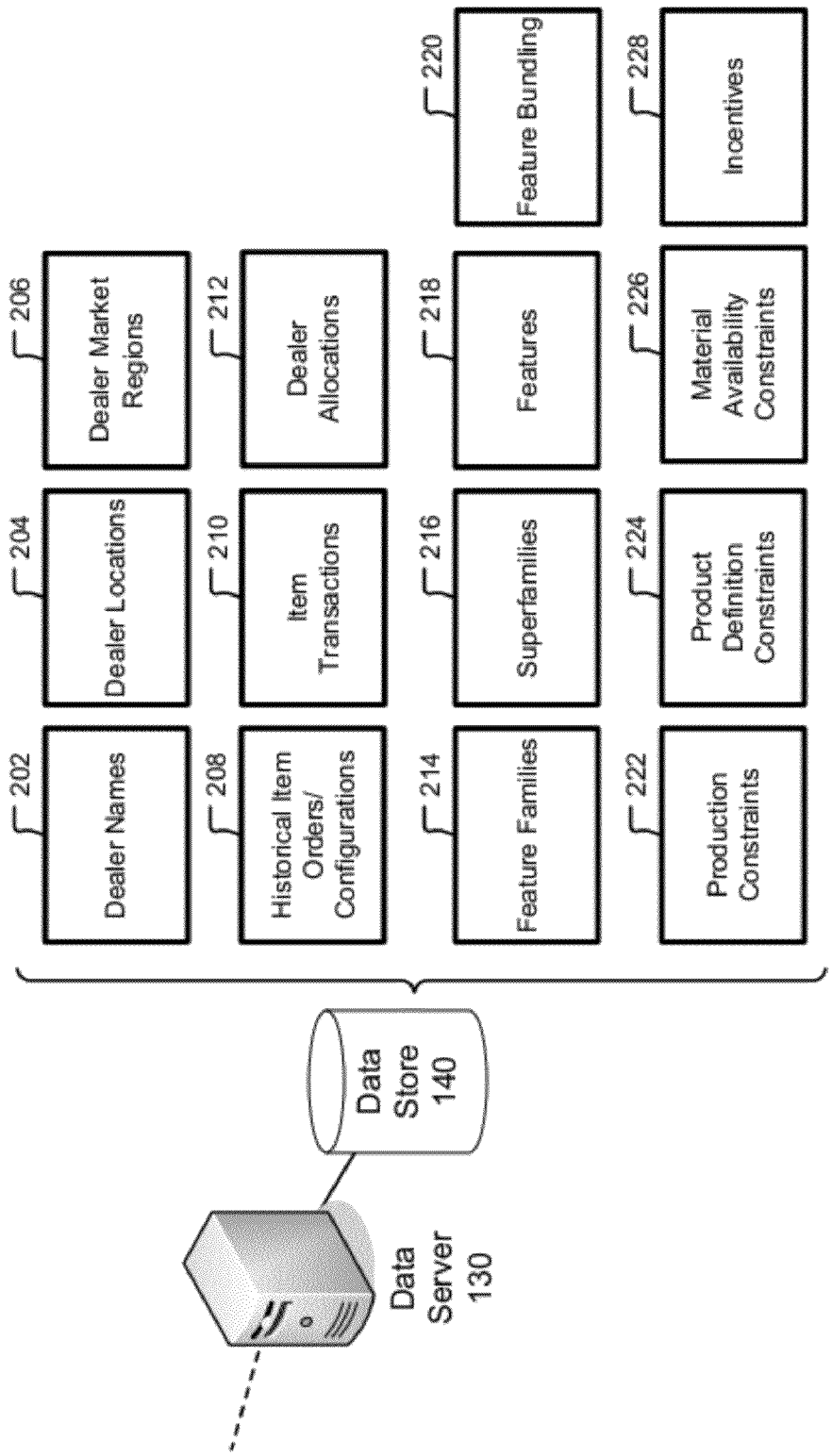
FIG. 2 is a block diagram illustrating further details of the feature selection system.

As illustrated in FIG. 2, content stored in data store 140 may include information concerning dealers, including dealer name 202 and dealer location 204, dealer region 206, detailed data regarding pending historical item orders/configurations 208 (e.g., vehicle features and order type), as well as dates of relevant item transactions 210 (e.g., order, production, gate release, shipment, arrival, trade-away, sales dates, etc.); dealer allocations 212 (i.e., how many vehicle orders a dealership has committed to place for a given time period); production constraints 222 that may limit the number of units that can be produced with a given feature; records for each item produced including the total item configuration; item sales and trade data for each item including production date, trade date, and sales date; item delivery timelines; and groupings such as feature families 214, superfamilies 216, and features 218; other information regarding item features such as product definition constraints 224 and material availability constraints 226 that may limit realizable feature combinations; and other information relating to market conditions, such as feature bundling 220 and incentives 228. These, and other data elements stored in the data store 140, are discussed in greater detail below.

F. Inventory Management Server

Returning to FIG. 1, inventory management server 150 may be implemented as a combination of hardware and software, and may include instructions embodied on one or more computer-readable media, the instructions for causing one or more servers to perform the operations of the inventory management server 150 described herein.

Generally, inventory management server 150 may be configured to retrieve data from data store 140 via data server 130, and to generate order recommendations based on the received data. Exemplary data elements utilized by the inventory management server 150 are discussed below, as are details of the operation of the inventory management server 150.

G. Supercomputer

Supercomputer 170 is a computing device that is generally capable of performing parallel, processing-intensive, and/or memory-intensive calculations. Some examples of supercomputers 170 are a specially designed custom computing device, or a cluster or collection of off-the-shelf processing components, or nodes, operated together through specialized interconnections. Supercomputers may be used for highly calculation-intensive tasks, such as weather and climate prediction, molecular modeling, and other types of simulation that allow for a task to be broken up into smaller units that may be processed in parallel.

Supercomputer 170 may be used to carry out many tasks in parallel, such as treating vehicle lines in parallel, further parallelizing by region, and also parallelization for training of neural network rate of sale calculators. This ability to perform tasks in parallel may allow for quicker computations of complex statistical analyses such as singular value decomposition (SVD) and principal components analysis (PCA). To aid in computation of the SVD and the PCA, a supercomputer 170 may perform many independent computations in parallel, such as computations relating to multiple types of items, or calculations for multiple geographic regions. SVD is a factorization of rectangular real or complex matrixes, with applications in signal processing and statistics, such as computing a pseudoinverse, a least squares fitting of data, a matrix approximation, and determining a rank, range and null space of a matrix. PCA is a mathematical procedure that transforms a number of possibly correlated variables into a smaller number of uncorrelated variables called principal components. The first principal component accounts for as much of the variability in the data as possible, and each succeeding component accounts for as much of the remaining variability as possible. Depending on the field of application, it may also be referred to as a discrete Karhunen-Loève transform (KLT), a Hotelling transform or proper orthogonal decomposition (POD).

Supercomputer 170 may be in selective communication with inventory management server 150, and may be used to aid in or otherwise perform SVD and PCA for the inventory management server 150.

H. Summary of Exemplary System Configuration

The elements shown in FIG. 1 may be implemented as software, hardware, firmware, etc., or combinations thereof. In many examples, some of which were identified above, components shown in FIG. 1 include or are in the form of software or firmware modules stored on computer-readable media for execution in one or more computing devices. Thus, system 100 may be implemented on one or more than one physical computing device. In particular, ordering server 120, data server 130, data store 140, and inventory management server 150 may be included in or implemented on one or more computing devices, such as one or more servers. Computing devices of system 100 may include, but are not limited to, servers, personal and laptop computers, as well as virtual computing devices, for example virtual servers implemented on rack-mount virtualization systems.

In general, the ordering server 120, data server 130, data store 140, inventory management server 150, and supercomputer 170 may employ any of a number of computer operating systems, including, but by no means limited to known versions and/or varieties of mobile operating systems, the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., an operating system distributed by Apple, Inc. of Cupertino, Calif., and the Linux operating system.

The ordering server 120, data server 130, data store 140, inventory management server 150, and supercomputer 170 may further include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, Fortran, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data store 140 may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements and/or modules may be tangibly implemented as computer-readable instructions (e.g., software) on one or more computing devices (e.g., the ordering server 120, data server 130, data store 140, inventory management server 150, supercomputer 170, etc.), and stored on computer readable media associated therewith (e.g., disks, memories, etc.).

While FIG. 1 illustrates an exemplary system 100, other implementations may be used. In other embodiments, additional elements may be included, or the elements shown in FIG. 1 may be omitted or modified. For example, ordering server 120 and inventory management server 150 may be combined in certain implementations. As another example, data server 130 and data store 140 may be implemented as a plurality of heterogeneous database systems. As yet another example, supercomputer 170 may be omitted and/or combined with inventory management server 150.

III. System Data

The system 100 uses and/or generates various data elements in performing processes to generate order recommendations and other information. Exemplary data elements are described below with respect to FIGS. 2-3 and 7-9. Further, before turning to the descriptions of specific data elements in FIGS. 2-3 and 7-9, preliminary concepts of weighting factors and market area definition are discussed. In general, some or all of the data elements illustrated in FIGS. 2-3 and 7-8 may be stored in data store 140, and may be accessible from data store 140 by the inventory management server 150 through use of the data server 130.

As will be clear from the explanation that follows, some of these data elements are directly based on physical phenomena or reported facts, while others are derived from the elements that are directly based on physical phenomena, e.g., via various computations and/or processes. For example, data store 140 may store data representative of actual physical phenomena such as actual dealer sales 302 (discussed below with reference to FIG. 3) or actual dealer inventory 702 (discussed below with reference to FIG. 7). Further for example, data store 140 may store, and/or inventory management server 150 may compute, derived data such as weighted dealer sales 306 or weighted dealer inventory 706.

In general, system 100 operates on data that pertains to a specific item. For example, as explained in detail below, the system 100 may generate feature allocations and/or order recommendations for different configurations. However, the configurations are all of a specific item. For example, the particular item may be a particular make and model of a motor vehicle, i.e., a vehicle line. The system 100 may then work with data relating to that particular vehicle line, and with various features and superfeatures relative to that vehicle line. Thus, in general, data and metrics discussed herein, whether at a dealer level, a market level, etc., generally pertain to a specific item.

A. Market Definition

Certain operations of system 100 may require comparing metrics for a dealer, e.g., sales, to metrics for a market in which the dealer is included. In some instances, a sales region may be defined based on the geographic area in which the dealer is located, e.g., a city, a postal code, etc., where all dealers included within the sales region are considered to be a part of that region. However, there are advantages to defining a market with reference to the specific dealer for whom comparisons are being performed, rather than simply grouping a dealer according to the geographic area in which the dealer may be located. That is, a market may be defined that is unique or substantially unique for each dealer processed by the system 100 that takes into account the dealer's location relative to the other dealers.

Figure 4:
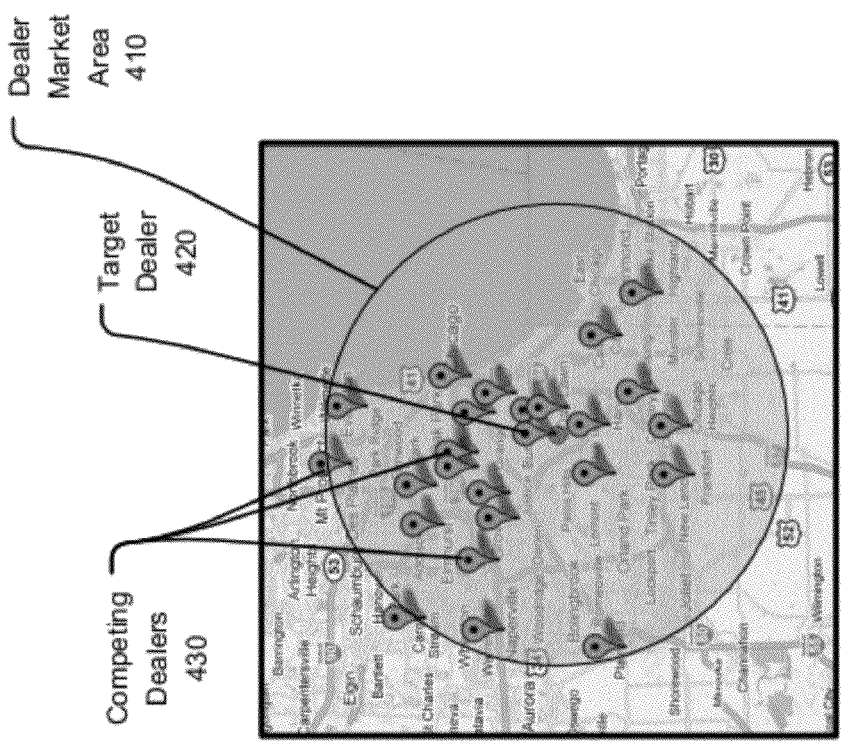
FIG. 4 illustrates an exemplary dealer market area.

FIG. 4 illustrates an exemplary dealer market area 410 defined for target dealer 420. The market area 410 is substantially a circle determined according to a predefined radius, e.g., 25 miles, around the target dealer 420. Dealer market area 410 includes a plurality of competing dealers 430. The purpose of defining the market area 410 is to include other dealers that are in competition with the target dealer 420, e.g., competing dealers 430. The advantage of defining a unique or substantially unique market area 410 for each target dealer 420 is to maximize the likelihood that sales and inventory metrics and other metrics for competing dealers 430 are most relevant to the target dealer 420. Where market areas are defined in other ways, e.g., according to pre-existing geographic boundaries, there is a greater likelihood of including less relevant competing dealers 430 and also of excluding more relevant competing dealers 430.

A dealer market area 410 may be used to compare the sales and inventory performance of a target dealer 420 to that of competing dealers 430. For example, a dealer market area 410 may be used to determine when the target dealer 420 performs better or worse than an average of competing dealers 430 for a given time period and/or feature or configuration. The dealer market area 410 calculated in this manner also may allow the inventory for a target dealer 420 to be viewed in context of other inventory available in a dealer market area 410. Determination of market area inventory may provide a basis or a factor to aid in the estimation of likelihood of sales for a specific configuration at a target dealer 420, because the number of items sold at a target dealer 420 may be influenced by what inventory may be available at competing dealers 430.

Figure 5:
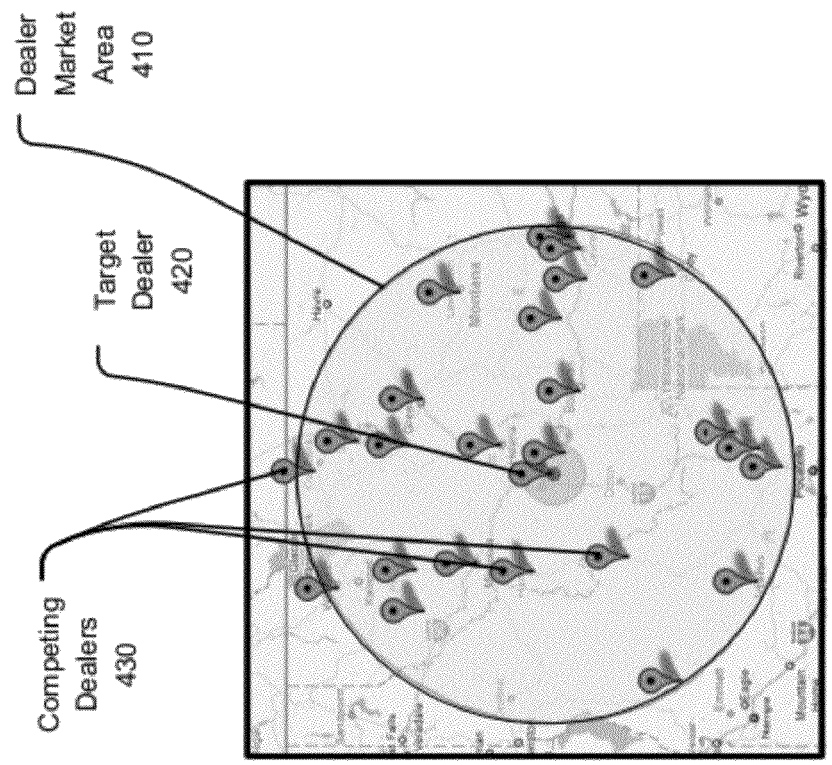
FIG. 5 illustrates an exemplary expanded dealer market area.

FIG. 5 illustrates an exemplary expanded dealer market area 410 for a target dealer 420 in a more sparsely populated area. In some cases, a predefined radius, e.g., 25 miles, around a target dealer 420 may encompass a relatively low number of competing dealers 430. Therefore, dealer market area 410 may also include, in one exemplary implementation, dealerships beyond a predefined radius, e.g., 25 miles, until either a predefined number of dealerships, e.g., 25 dealerships, are identified, including the target dealer 420, or until a predefined distance, e.g., 200 miles (or 322 kilometers), is reached. As illustrated in FIG. 5, only two competing dealers 430 are included within a 25 mile radius of target dealer 420, as indicated by the inner circle within the dealer market area 410. Accordingly, dealer market area 410 is illustrated as being expanded to further include additional competing dealers 430, such that the dealer market area 410 includes a total of 25 dealers.

While the distance calculations for defining market areas 410 may be based on a radial distance, i.e., by defining a circle or a substantially circular shape with the target dealer 420 in the center, in other examples alternative dealer market area characterizations may be based on actual distance, or actual travel distance, between dealerships, or on expected travel time between dealerships. Such distances or travel times may be determined, for example, by reference to online services, such as Google Maps, Yahoo! Maps, MapQuest, etc.

In other examples, postal codes, e.g., zip codes, associated with physical locations of dealers may be used to define dealer market areas 410. Alternately, a region or zone may be defined by a manufacturer without reference to a particular target dealer 420. Exemplary dealer market areas 410 of this type are a metro area, and a postal zip code. Such a dealer market area 410 may provide for a logical grouping for the manufacturer, and may be used, for example, by the manufacturer to provide for market area promotions.

However, as mentioned above, such use of predefined geographic boundaries may be less advantageous than defining a market area 410 with reference to a specific target dealer 420. For example, a target dealer 420 at the edge of a particular zip code or metro area may in fact be closer to competing dealers 430 in an adjacent manufacturer-defined market area 410. From the target dealer's 420 perspective, the dealer market area 410 is comprised of those competing dealers 430 that are likely to share a customer base and can thus be thought of as competing dealers 430. Accordingly, the target dealer 420 may consider those competing dealers 430 in an adjacent market area 410 as more relevant competition than the other competing dealers 430 included within a manufacturer-defined market area 410. Thus, use of a target dealer 420 to define a market area 410 presents advantages, including the advantage of providing relevant and pertinent comparisons for the target dealer 420.

B. Weighting Factor Vectors

Figure 3:
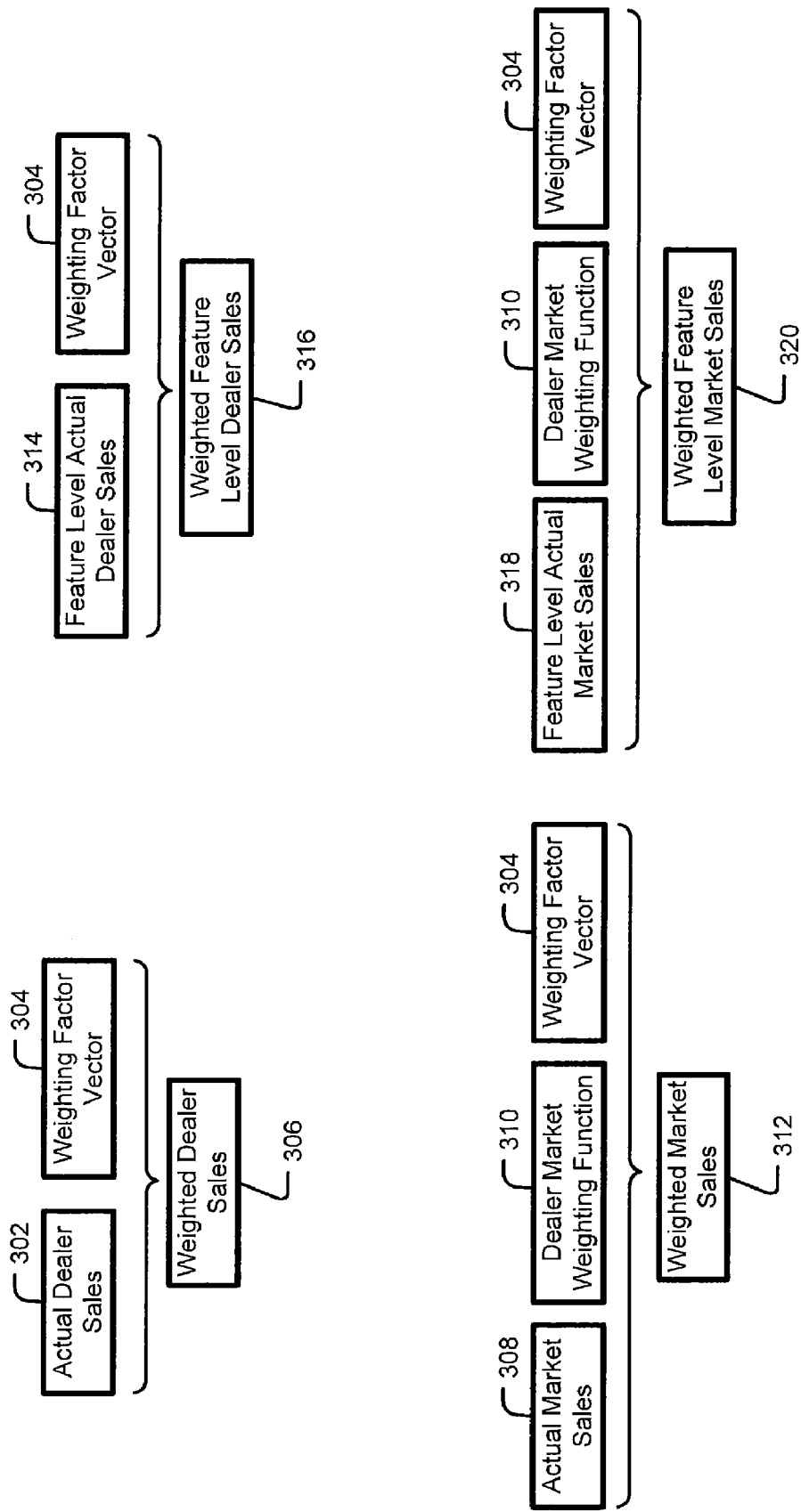
FIG. 3 illustrates exemplary sales data elements.

FIG. 3 illustrates exemplary data elements related to sales metrics, including actual and weighted sales metrics on both a per-dealer and a per-market area basis. Some or all of the data elements illustrated in FIG. 3 may be stored in data store 140, and may be accessible from data store 140 by the inventory management server 150, either directly or by querying through data server 130. Alternatively or additionally, some of these data elements may be computed by a device such as inventory management server 150.

A weighting factor is a factor that may be used to affect the relative influence of a quantity in a value being computed. System 100 may use weighting factors in computing various quantities, such as sales and inventory volumes. A weighting factor vector 304 may include a set of weighting factors applied to measurements associated with different periods of time. For example, an exemplary set of sales data may include 16 weeks of sales history, where the most recent 4 weeks are weighted at 100%, the four week before that are weighted at 75%, the four weeks before that are weighted at 50% and the four weeks before that are weighted at 25%. These weighting factors may be placed in a weighting factor vector 304, e.g., vector $\omega = [1.00\ 0.75\ 0.50\ 0.25]$. The exemplary weighting factor vector 304 may provide weighted values for use in evaluating historical sales and historical inventory, insuring that sales and inventory in more recent time periods are given greater consideration, or weight.

C. Weighted Dealer Sales

As used herein, data elements that reference quantities related to a target dealer 420 are indicated throughout by use of the modifier "dealer." In contrast, data elements that reference quantities related to a market area 410 including the target dealer 420 are indicated throughout by use of the modifier "market." As an example, actual dealer sales 302 refers to sales of items made by a target dealer 420, while actual market sales 308 refers to sales of items made by a target dealer 420 and also by competing dealers 430 in the market area 410 defined by the target dealer 420.

With regard to the sales of items by a target dealer 420, actual dealer sales 302 may include sales reported for the particular dealer during a particular time period. Weighted dealer sales 306 is then defined as the actual dealer sales 302 made by a dealer during a particular time period, multiplied by a weighting factor vector 304. An exemplary weighting for historical sales and inventory is shown in Table 1:

TABLE 1

Example of sales weighting scheme

| Dates: | 12/03-12/30 | 12/31-01/27 | 01/28-02/24 | 02/25-03/23 | TOTALS |
|---|---|---|---|---|---|
| Actual Sales | 8 | 8 | 8 | 8 | 32 |
| Weighting Factor Vector | 25% | 50% | 75% | 100% | — |
| Weighted Sales | 2 | 4 | 6 | 8 | 20 |

As illustrated in the example of Table 1, while the actual dealer sales 302 over the exemplary 16 week period number 32 sales, the weighted dealer sales 306 over the illustrated 16 weeks is computed to be 20 sales.

D. Weighted Market Sales

Continuing with FIG. 3, actual market sales 308 include a sum of actual sales within a given time period by a target dealer 420 and competing dealers 430 in the market area 410 defined by the target dealer 420. Weighted market sales 312 may be defined as the actual market sales 308 multiplied by an appropriate element from weighting factor vector 304.

Actual market sales 308 may be weighted for each competing dealer 430 in a dealer market area 410 according to a dealer market weighting function 310, e.g., according to a distance of competing dealer 430 from target dealer 420. Such weighting according to a dealer market weighting function 310 may be performed instead of or in addition to multiplying actual market sales 308 by a weighting factor vector 304. Thus, weighted market sales 312 may be defined as the actual market sales 308 as multiplied by at least one of a weighting factor vector 304 and a dealer market weighting function 310.

Figure 6:
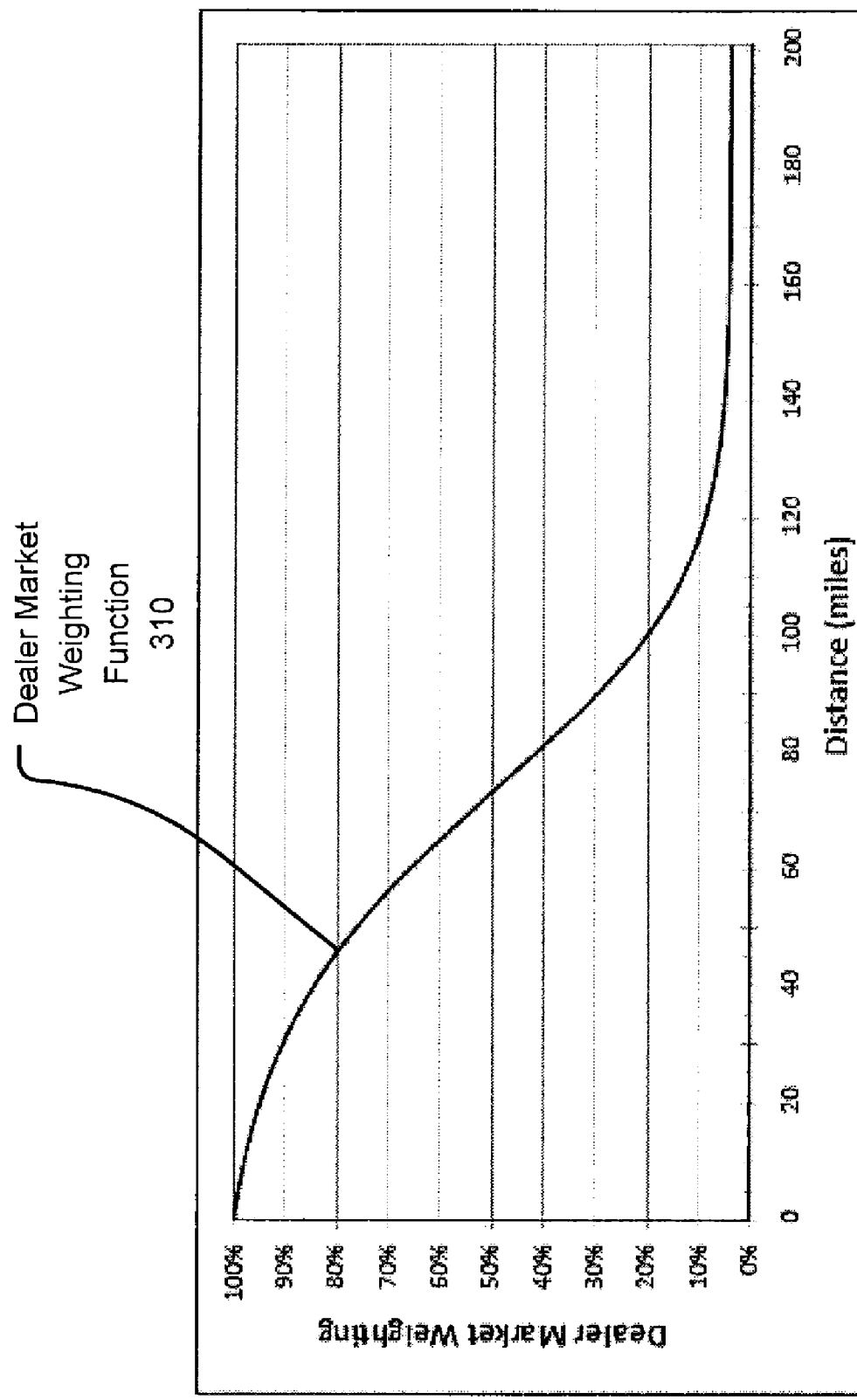
FIG. 6 illustrates an exemplary dealer market weighting.

FIG. 6 illustrates an exemplary dealer market weighting function 310. As illustrated in FIG. 6, metrics associated with competing dealers 430 are weighted according to a distance of the competing dealer 430 from the target dealer 420. Generally, competing dealer 430 that are closer to a target dealer have a greater weighting factor applied than competing dealers 430 that are farther from the target dealer 420. This is because competing dealers 430 that are closer to a target dealer 420 are determined to be more relevant than competing dealers 430 that are farther away. When computing weighted market sales 312, the sales of each competing dealer 430 may be weighted according to the dealer market weighting function 310, and then added to the total weighted market sales 312. As shown in FIG. 6, the dealer market weighting function is a monotonically decreasing function, with a value of 100% for a distance of zero (corresponding to the target dealer), with values slightly less than 100% for dealers within a few miles of the target dealer, and with a value of approximately 5% for distances ranging from 140 to 200 miles.

Although only one dealer market weighting function 310 is illustrated, other weighting functions are possible. For example, a linearly decreasing dealer market weighting function 310 could alternately be used in part to determine weighted market sales 312.

E. Weighted Feature Level Dealer Sales

Returning to FIG. 3, feature level actual dealer sales 314 may include the actual, i.e., unweighted, sales made by a dealer that include a particular item feature. For example, if a vehicle sold by a dealer is painted a red color, then that vehicle may count as a feature level actual dealer sale 314 of a vehicle with the feature of being painted red. Weighted feature level dealer sales 316 may likewise be determined as the feature level actual dealer sales 314 for a particular time period, multiplied by an appropriate element from weighting factor vector 304.

F. Weighted Feature Level Market Sales

Feature level actual market sales 318 includes the sales of a feature, i.e., a particular item having one or more specified features, by a target dealer 420 and competing dealers 430 in a market area 410. Weighted feature level market sales 320 may be determined as the feature level actual market sales 318 made by target dealer 420 and competing dealers 430 during a particular time period, multiplied by an appropriate element from weighting factor vector 304 and/or according to a dealer market weighting function 310.

G. Weighted Dealer Inventory

Figure 7:
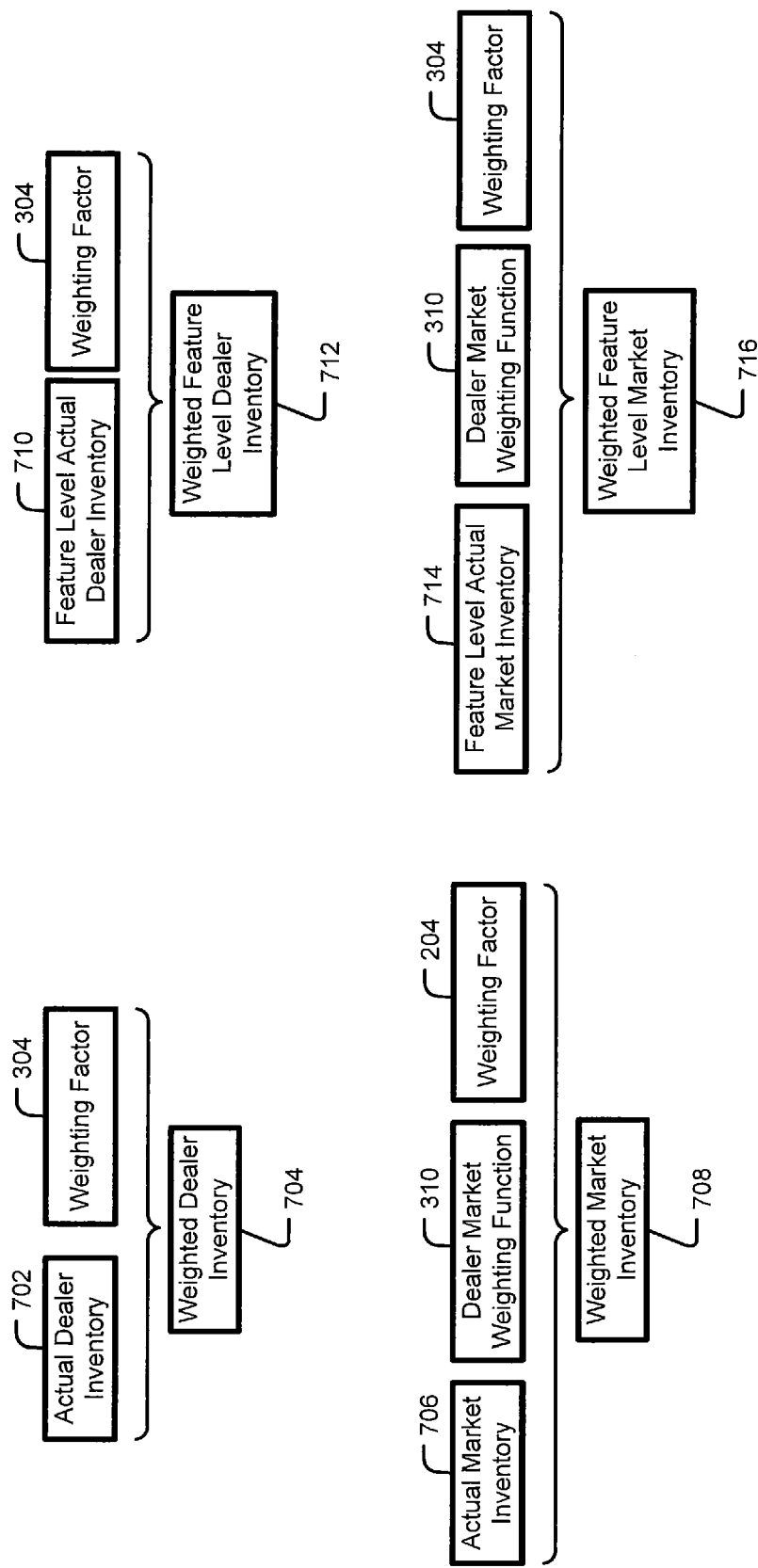
FIG. 7 illustrates an exemplary relationship between actual inventory and weighted inventory.

FIG. 7 illustrates exemplary inventory-related data elements, including an exemplary relationship between actual and weighted inventory, both per-dealer and per-market area. Actual dealer inventory 702 may include the inventory that a target dealer 420 has in stock at a particular time. Weighted dealer inventory 704 may be defined as the actual dealer inventory 702 multiplied by an appropriate element from a weighting factor vector 304.

H. Weighted Market Inventory

Actual market inventory 706 includes the inventory available in stock by a target dealer 420 and competing dealers 430 in a market area 410. Weighted market inventory 708 is the actual market inventory 706 multiplied by an appropriate element from weighting factor vector 304 and/or based on a dealer market weighting function 310.

I. Weighted Feature Level Dealer Inventory

Feature level actual dealer inventory 710 includes inventory for a particular time period of a target dealer 420 that include a particular item feature. Weighted feature level dealer inventory 712 may be determined as the feature level actual dealer inventory 710 multiplied by an appropriate element from a weighting factor vector 304.

J. Weighted Feature Level Market Inventory

Feature level actual market inventory 714 may include inventory of a target dealer 420 and the competing dealers 430 including a particular item feature. Weighted feature level market inventory 716 may be determined as feature level actual market inventory 714 multiplied by an appropriate element from a weighting factor vector 304 and/or based on a dealer market weighting function 310.

K. Weighted Dealer Turn Rate

Figure 8:
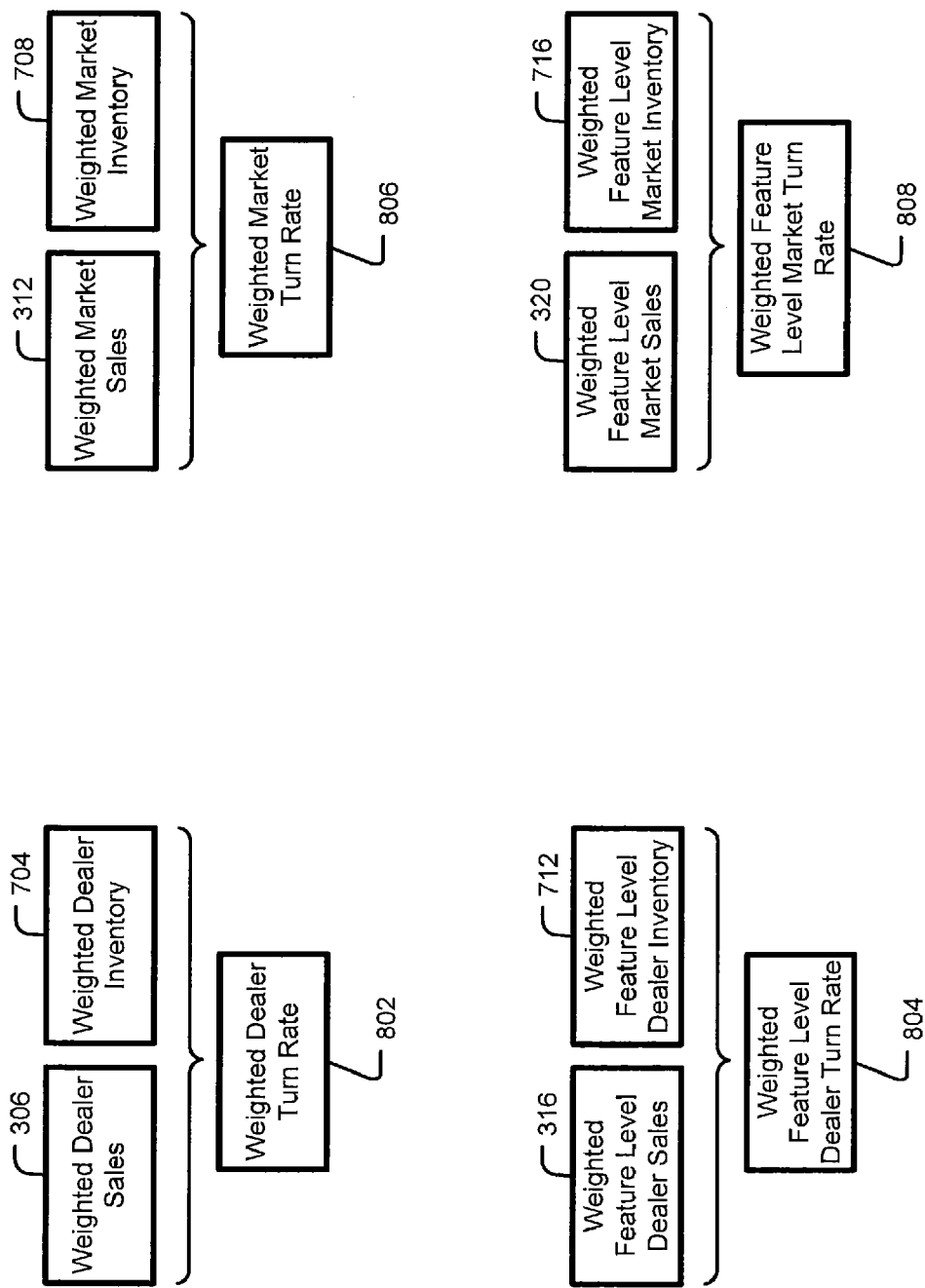
FIG. 8 illustrates an exemplary relationship between weighted sales, weighted inventory, and weighted turn rates.

FIG. 8 illustrates an exemplary relationship between weighted sales, weighted inventory, and weighted inventory turn rates. As mentioned above, an inventory turn rate for a feature in a given time period may be determined by dividing sales related to the feature by the total amount of inventory related to the feature in the time period. Inventory turn rates may be determined for the overall inventory of a target dealer 420, for the overall inventory of a dealer market area 410, and/or for a feature either on a per-dealer or per-market basis.

A weighted dealer turn rate 802 may be defined as a rate of sale of an item, regardless of its feature configuration, from inventory of a target dealer 420. The weighted dealer turn rate 802 may be calculated as weighted dealer sales 306 divided by weighted dealer inventory 704.

L. Weighted Feature Level Dealer Turn Rate

A weighted feature level dealer turn rate 804 may be defined as a rate of sale of an item, having a particular feature, from inventory including the particular feature of a target dealer 420. A weighted feature level dealer turn rate 804 may be calculated as weighted feature level dealer sales 316 divided by feature-level weighted dealer inventory 704.

M. Weighted Market Turn Rate

A weighted market turn rate 806 may be defined as a rate of sale of an item, regardless of its feature configuration, from inventory of target dealers 420 and competing dealers 430 in a dealer market area 410. The weighted market turn rate 806 may be calculated as weighted market sales 312 divided by weighted market inventory 708.

N. Weighted Feature Level Market Turn Rate

A weighted feature level market turn rate 808 may be defined as a rate of sale of items in inventory of a dealer market area 410 that possess a particular feature. The weighted feature level market turn rate 808 may be calculated as weighted feature level market sales 320 divided by weighted feature level market inventory 716.

O. Weighted Feature Level Dealer Sales Mix Rate

Figure 9:
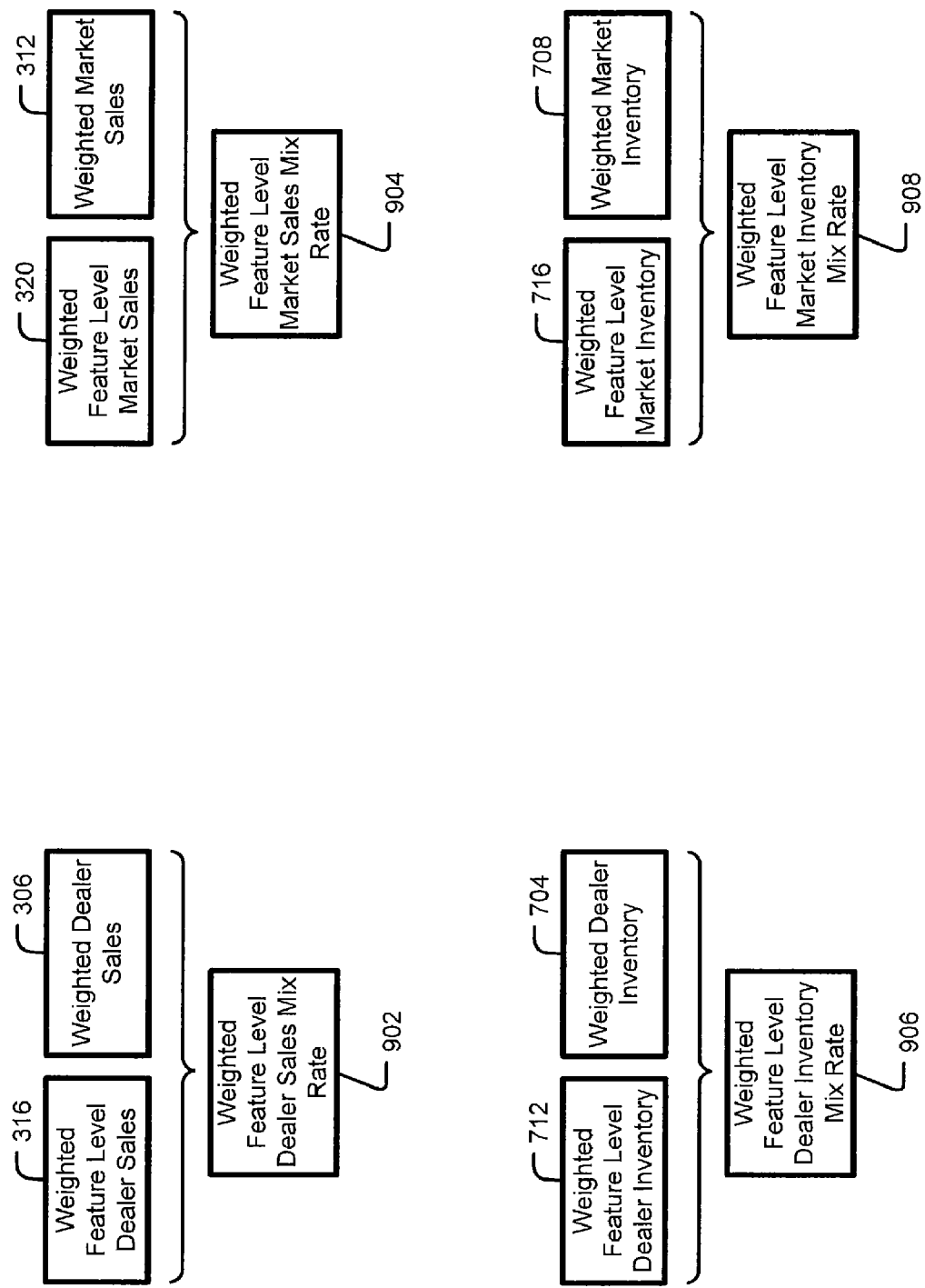
FIG. 9 illustrates exemplary relationships among certain sales metrics.

FIG. 9 illustrates an exemplary relationship between weighted sales and weighted inventory used in the generation of weighted sales mix rates and weighted inventory mix rates. A weighted feature level dealer sales mix rate 902 is a measure of the sales from dealer stock including a particular feature compared to the overall amount of sales from stock at the dealer. For example, weighted feature level dealer sales mix rate 902 may be determined by dividing weighted feature level dealer sales 316 by weighted dealer sales 306.

P. Weighted Feature Level Market Sales Mix Rate

A weighted feature level market sales mix rate 904 is a measure of the sales from stock of a target dealer 420 and competing dealer 430 in a dealer market area 410, where the sales including a particular feature is compared to the overall amount of sales in the dealer market area 410. A weighted feature level market sales mix rate 904 may be determined by dividing weighted feature level market sales 320 by weighted market sales 312.

Q. Weighted Feature Level Dealer Inventory Mix Rate

A weighted feature level dealer inventory mix rate 906 is a measure of the inventory of a dealer including a particular feature compared to the overall inventory of the dealer. For example, weighted feature level dealer inventory mix rate 906 may be determined by dividing weighted feature level dealer inventory 712 by weighted dealer inventory 704.

R. Weighted Feature Level Market Inventory Mix Rate

A weighted feature level market inventory mix rate 908 is a measure of the inventory of a target dealer 420 and competing dealer 430 in a dealer market area 410, where the inventory including a particular feature is compared to the overall inventory in the dealer market area 410. A weighted feature level market inventory mix rate 908 may be determined by dividing weighted feature level market inventory 716 by weighted market inventory 708.

S. Dealer Projected Sales

Figure 10:
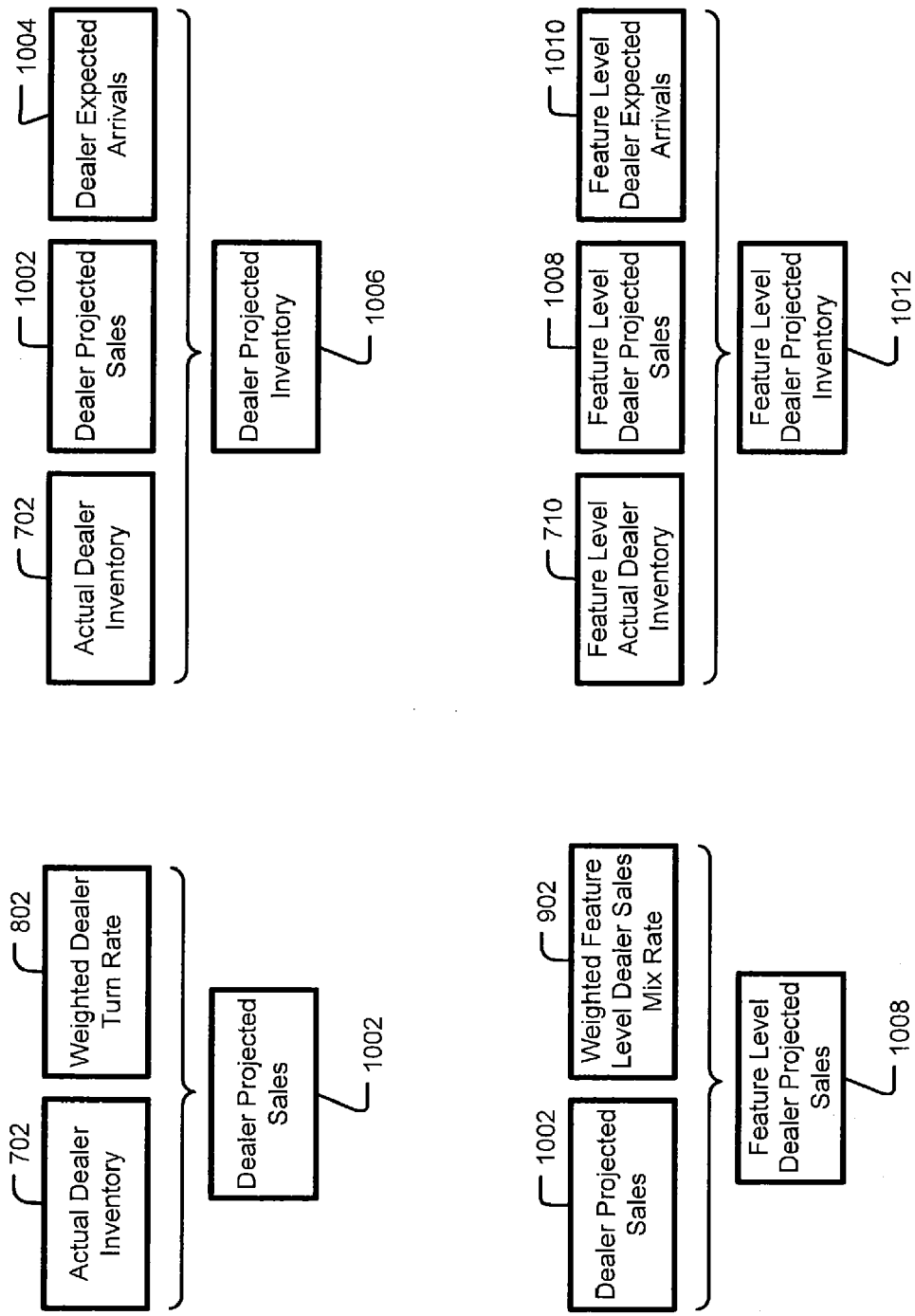
FIG. 10 illustrates exemplary relationships relating to the projection of dealer inventory.

FIG. 10 illustrates exemplary relationships relating to the projection of dealer inventory. Dealer projected sales 1002 is a measure of sales that are projected to be made by a dealer over a future time period, generally for an item regardless of its feature configuration. For example, dealer projected sales 1002 may be calculated beginning at the most recent week of available sales data, proceeding up to the point in time for which items that are ordered in the current week are expected to arrive at dealerships.

In many instances, inventory turn rate is assumed to be relatively constant, and accordingly weighted dealer turn rates 802 may be used to determine dealer projected sales 1002. Importantly, if inventory turn rates are not relatively constant and instead fluctuate wildly, then the ability to estimate future inventory turn rates may be markedly reduced. Accordingly, dealer projected sales 1002 may be computed by multiplying actual dealer inventory 702 by weighted dealer turn rate 802.

T. Feature Level Dealer Projected Sales

Feature level dealer projected sales 1008 is a measure of the number of sales that are projected to be made by a dealer including a particular feature over a future period of time. Feature level dealer projected sales 1008 may be computed by multiplying dealer projected sales 1002 by weighted feature level dealer sales mix rate 902.

U. Dealer Projected Inventory

Dealer projected inventory 1006 is a measure of the inventory for a dealer, generally for an item regardless of its feature configuration, at a future point in time. Generally, inventory by dealer may be calculated by taking the prior-period inventory, subtracting the projected prior-period sales, and adding the expected arrivals. Dealer expected arrivals 1004 are items that were previously ordered, and are expected to leave the supply pipeline and reach dealer inventory 115 during the week being projected. For example, dealer projected inventory 1006 may be computed by adding dealer expected arrivals 1004 to actual dealer inventory 702, and subtracting dealer projected sales 1002.

V. Feature Level Dealer Projected Inventory

Feature level dealer projected inventory 1012 is a measure of the inventory for a dealer that includes a particular feature at a future point in time. Feature level dealer expected arrivals 1010 are items that were previously ordered including the particular feature, and are expected to leave the supply pipeline and reach dealer inventory 115 during the week being projected. Therefore, feature level dealer projected inventory 1012 may be computed by adding feature level dealer expected arrivals 1010 to feature level actual dealer inventory 710, and subtracting feature level dealer projected sales 1008.

W. Relative Total Weighted Dealer Turn Rate

Figure 11:
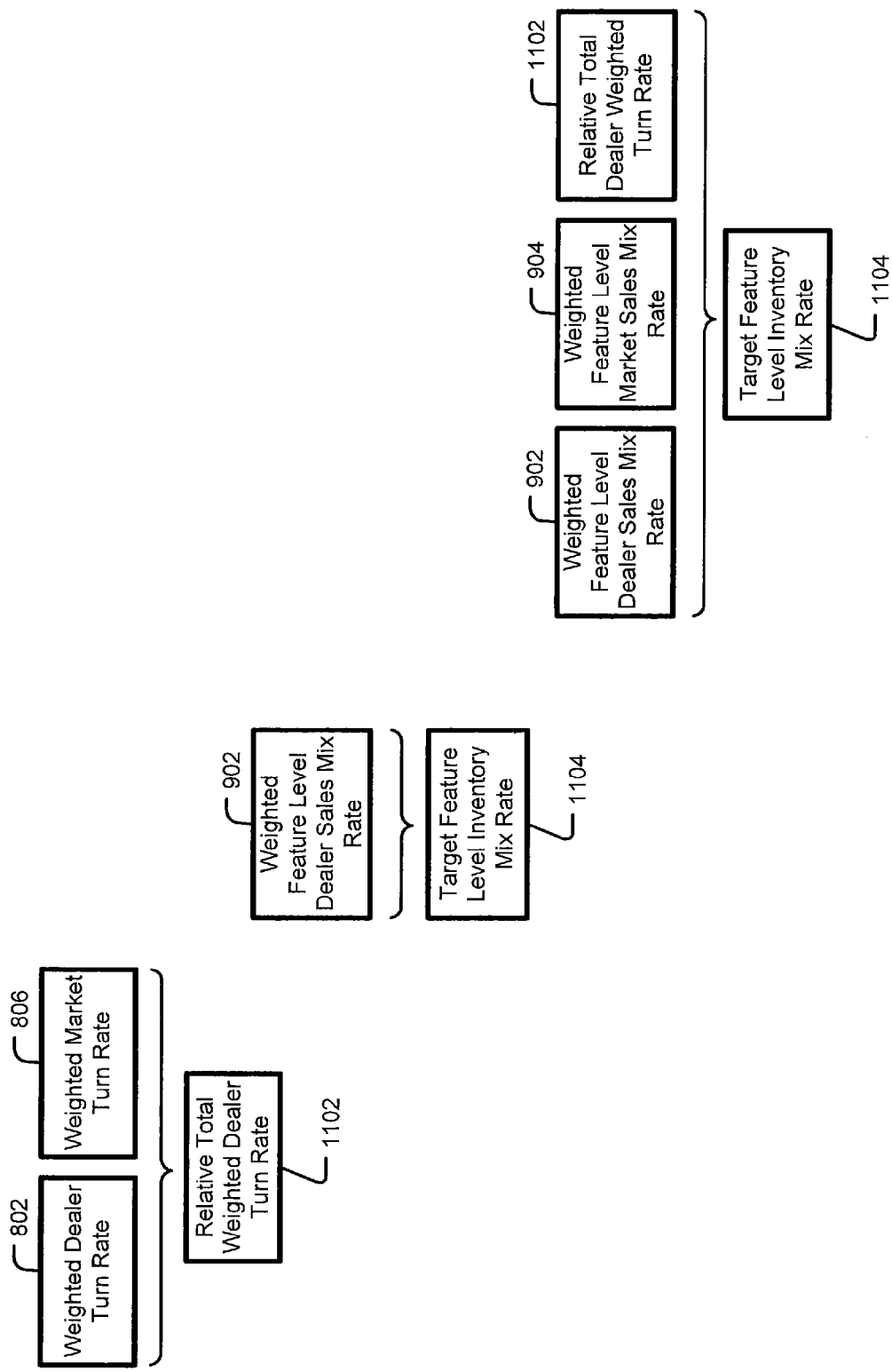
FIG. 11 illustrates exemplary relationships relating to the calculation of a target feature level inventory mix rate.

FIG. 11 illustrates exemplary relationships relating to the calculation of a target feature level inventory mix rate 1104 through use of a relative total weighted dealer turn rate 1102. A relative total weighted dealer turn rate 1102 is a measure of whether a target dealer 420 is over or underperforming compared to other competing dealers 430 in the dealer market area 410 for the target dealer 420. Relative total weighted dealer turn rate 1102 may be measured in terms of weighted dealer turn rate 802 compared to a weighted market turn rate 806 including competing dealers 430 in the dealer market area 410. For example, weighted market turn rate 806 may be subtracted from weighted dealer turn rate 802, and the result may in turn be divided by weighted market turn rate 806, yielding relative total weighted dealer turn rate 1102.

Then, if relative total weighted dealer turn rate 1102 is positive, the target dealer 420 may be determined to be outperforming other competing dealers 430 in the dealer market area 410. If relative total weighted dealer turn rate 1102 is negative, the target dealer 420 may be determined to be underperforming.

X. Target Feature Level Inventory Mix Rate

In order to balance inventory at the feature level, a target feature level inventory mix rate 1104 may be established based at least in part on weighted feature level dealer sales mix rate 902. In other words, inventory targets may be established at least in part based on sales history. In addition, a target feature level inventory mix rate 1104 may be established based at least in part on a predetermined turn rate for dealer inventory, and/or based on a turn rate that is favorable compared to the turn rates for the relevant feature in the relevant dealer market area 410.

Accordingly, where a target dealer 420 is outperforming its dealer market area 410 in terms of overall weighted dealer turn rate 802 (i.e., positive relative total weighted dealer turn rate 1102), then target feature level inventory mix rates 1104 may be determined based on the performance of the target dealer 420 (i.e., according to the weighted feature level dealer sales mix rates 902 of the target dealer 420).

On the other hand, when the target dealer 420 is underperforming the dealer market area 410 (i.e., negative relative total weighted dealer turn rate 1102), target feature level inventory mix rate 1104 may based on a combination of weighted feature level dealer sales mix rate 902 and weighted feature level market sales mix rate 904. Specifically, a target feature level inventory mix rate 1104 may be determined by adding the number one to the relative total weighted dealer turn rate 1102 and multiplying this quantity by the weighted feature level dealer sales mix rate 902, and from that result subtracting relative total weighted dealer turn rate 1102 multiplied by weighted feature level market sales mix rate 904.

Weighted feature level dealer sales mix rates 902 and weighted feature level market sales mix rates 904 may be weighted relative to relative total weighted dealer turn rate 1102, such that a dealer that is only slightly underperforming may have a target feature level inventory mix rate 1104 based mostly on weighted feature level dealer sales mix rates 902, whereas a target dealer 420 that is greatly underperforming the dealer market area 410 may have a target feature level inventory mix rate 1104 based in greater part on weighted feature level market sales mix rate 904. For example, for a dealer having no sales related to a feature in a relevant time period, e.g., the past 16 weeks, target feature level inventory mix rate 1104 would be determined entirely or almost entirely based on the weighted feature level market sales mix rate 904.

Y. Dealer Initial Total Inventory

Figure 12:
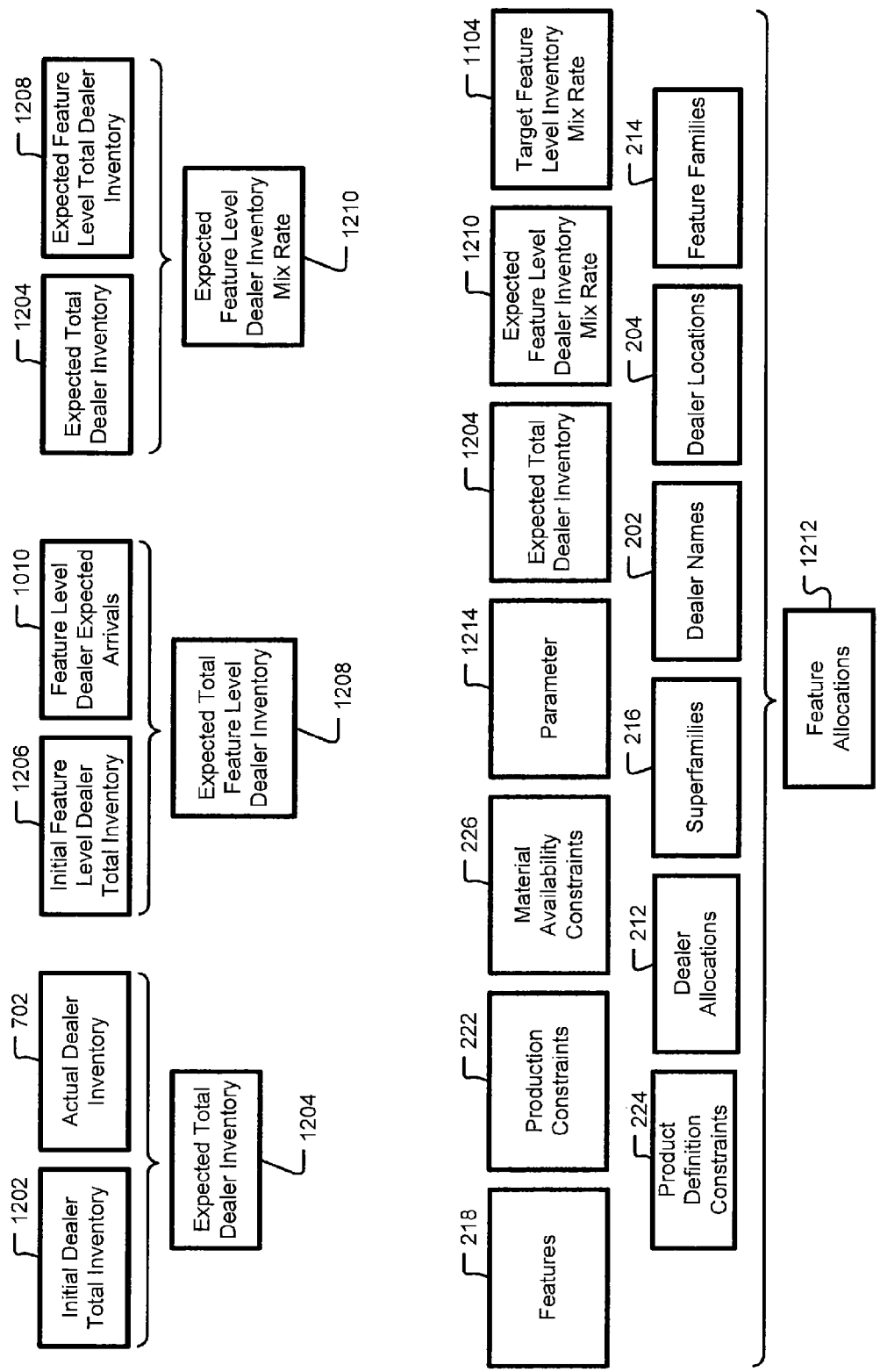
FIG. 12 illustrates exemplary relationships relating to feature allocation.

FIG. 12 illustrates exemplary relationships relating to feature allocation. Initial total dealer inventory 1202 is a measure of the inventory at the beginning of a time period, before any sales from inventory or deliveries to inventory occur. For example, for a current week, initial total dealer inventory 1202 may be determined based on actual dealer inventory 702. As another example, when inventory is projected one week into the future, initial total dealer inventory 1202 for the projected week may be based on the dealer projected inventory 1006 for the next week, before any sales or deliveries occur that week.

Z. Expected Total Dealer Inventory

Expected total dealer inventory 1204 is a measure of dealer inventory available for sale during a particular time period. Accordingly, expected total dealer inventory 1204 may be determined by calculating the sum of initial total dealer inventory 1202 and dealer expected arrivals 1004. Thus, this measure of expected total dealer inventory 1204 assumes that if an item is for sale at any time during a time period, then that item is part of expected total dealer inventory 1204 for that entire time period, even if it, for example, arrives late in the week or is sold early in the week.

AA. Initial Feature Level Total Dealer Inventory

Initial feature level total dealer inventory 1206 is a measure of the inventory including a particular feature that is available at the beginning of a time period, before any sales from inventory or deliveries to inventory occur. For example, for the current week, initial feature level total dealer inventory 1206 may be based on the feature level actual dealer inventory 710. When inventory is projected one week into the future, initial feature level total dealer inventory 1206 for the projected week may be based on the feature level dealer projected inventory 1012 for the next week.

BB. Expected Feature Level Total Dealer Inventory

Expected feature level total dealer inventory 1208 is a measure of dealer inventory for a feature that is available for sale during a particular time period. Accordingly, expected feature level total dealer inventory 1208 may be determined by calculating the sum of initial feature level total dealer inventory 1206 and feature level dealer expected arrivals 1010. Thus, this measure of expected feature level total dealer inventory 1208 assumes that if an item is for sale at any time during a time period, then that item is part of expected feature level total dealer inventory 1208 for that entire time period.

CC. Expected Feature Level Dealer Inventory Mix Rate

An expected feature level dealer inventory mix rate 1210 is a measure of the inventory mix rate related to a feature at a future point in time, after items that are expected to be delivered during that future week have arrived. The expected feature level dealer inventory mix rate 1210 may be defined as the expected feature level total dealer inventory 1208 for a particular feature at a future time period, divided by the expected total dealer inventory 1204 for the same future time period. In other words, the expected feature level dealer inventory mix rate 1210 may also be defined as the sum of inventory for that feature at the beginning of a week plus expected deliveries of items with that feature for the week, divided by the expected total dealer inventory 1204 for the week.

DD. Feature Allocations

Feature allocations (or feature selections) 1212 include quantities of each feature, i.e., a number of an item having a particular feature, that are recommended to be ordered, without regard for other features that may be included in an item configuration. In other words, feature allocations 1212 do not generate configurations, although feature allocations are consistent with possible configurations because feature allocations take into account constraints such as product definition constraints 224. For example, a feature allocation 1212 may be determined to include three red vehicles, seven blue vehicles and two vehicles with a moonroof. That is, the features for which quantities are provided are for a particular vehicle make and model, specifically where the vehicle is red (three vehicles allocated), a vehicle that is blue (seven vehicles allocated), and a vehicle with a moonroof (two vehicles allocated). However, the feature allocation 1212 does not indicate whether any of the blue vehicles or the red vehicles are to have a moonroof, or whether the vehicles with a moonroof are some other color.

An objective of feature allocation 1212 is to select orders for items with features such that the inventory mix rates when the ordered items are expected to arrive at the dealer match, as closely as possible, historically based inventory mix rate targets. Feature allocations 1212 may be calculated in various ways, and may be calculated based on various data elements.

As illustrated in FIG. 12, feature allocations 1212 may be a function of numerous data elements stored within data store 140. For example, feature allocations 1212 may be based on features 218, production constraints 222, material availability constraints 226, a parameter 1214 (discussed below), expected total dealer inventory 1204, expected feature level dealer inventory mix rate 1210, target feature level inventory mix rate 1104, dealer allocations 212, superfamilies 216, dealer names 202, dealer locations 204, and feature families 214.

1. Feature Allocation Function

A function for feature allocation 1212 may be structured as a minimization of the squared difference between the target feature level inventory mix rate 1104 and expected feature level dealer inventory mix rates 1210 at a future time for all item features that can be ordered by a target dealer 420. Although the objective of the minimization is to minimize the squared difference, it may not be possible to obtain a difference of zero in one iteration. However, it may certainly be possible to approach the target feature level inventory mix rate 1104.

An exemplary objective function is as follows:

$$\min \sum_{k=1}^{Nd} S_{t',k} \sum_{j=1}^{Nj} \phi_j \sum_{i=1}^{I_j} \left( p_{t',k}^{j,i} - a_{t',k}^{j,i} \right)^2$$

where items are expected to arrive at the $k^{th}$ dealer at time t', where p is the target feature level inventory mix rate for feature i in feature family j, where a is the inventory mix rate for items with feature i in feature family j at dealership k, where $N_d$ is the number of dealers within a sales region, where S is the expected sales at the $k^{th}$ dealer, Nf is the number of feature families which completely define a vehicle order, $i_j$ is the number of different feature values associated with the $j^{th}$ feature family, and $\emptyset_j$ is a predefined parameter, generally having a default value of unity. While an exemplary objective function is given above, other functions may be used to perform the minimization. For example, in some example the objective function may scale by inventory, rather than by expected sales.

When planning is conducted in the presence of production constraints 222 or material availability constraints 226, then feature allocations 1212 across all dealers within a dealer market area 410, who are collectively subject to these constraints, must be optimized together. In that case, the objective function may be scaled by each respective expected total dealer inventory 1204 level, thereby giving greater weight to dealers with larger inventories. In other examples, expected sales, e.g., computed based on inventory multiplied by inventory turn rate, may be used to scale the objective function. In still other examples, yet another scaling factor may be used.

Additionally, a feature-family specific parameter 1214 may be used to weight the relative importance of particular feature families 214 in relation to one another. For example, the feature allocation optimization may use a parameter 1214 to give greater consideration to balancing inventory at the base feature level (i.e., a feature composed of vehicle series, engine transmission, drive, and optionally cab and body style for trucks), at the expense of balancing other feature families 214.

As mentioned above, multiple classes of constraints must be satisfied in an optimization that generates feature allocations, including dealer allocations 212, production constraints 222 and material availability constraints 226, and product definition constraints 224. First, the sum of orders across all features within a feature family 214 must equal the total dealer allocation 212 for all target dealers 420 and feature families 214. Second, production constraints 222 and material availability constraints 226 must be satisfied. In some cases, these production constraints 222 and material availability constraints 226 may be specified as do-not-exceed constraints. For example, a constraint may indicate that total allocation for a feature within a dealer market area 410 cannot exceed a particular limit. Production constraints 222 and material availability constraints 226 may also, in another example, be specified as equality constraints or must-not-be-less-than constraints. Third, the feature allocation 1212 must also satisfy product definition constraints 224 that must be satisfied separately for each target dealer 420. These constraints may be provided as inequality constraints, where the left and right sides of any inequality constraint are sums of various feature allocations 1212.

As an example of optimization of feature allocations 1212 based on a constraint, a moonroof feature may be ordered with two other vehicle features, e.g., "Series 1" and "Series 2," but not with "Series 3." Thus, for each dealer, a constraint may be specified that the number of vehicles with a moonroof ordered by the dealer must be less than or equal to the number of vehicles ordered with Series 1 and Series 2 by that same dealer. These product definition constraints 224 are generated once in the setup process, and may be re-used period-over-period, until product definition or order guide changes occur, at which point the product definition constraints 224 must be regenerated.

Constraints are used to account for configurations that are available to a target dealer 420, and also to account for the relationships between features, e.g., product definition constraints 224. Without constraints, attempts to recommend orders may not have a feasible solution for some target dealers 420. While constraints involving relationships between features are often expressed logically (e.g., heated seats must be leather), generating order recommendations requires that constraints be expressed arithmetically. For computational purposes, it is also important to represent these arithmetic relationships compactly. Possible ways of generating vehicle feature relationship constraints are respectively based on set theory and computational geometry. In each case, a binary vehicle configuration matrix such as discussed above is provided input and used to generate product definition constraints 224.

Under a set theory approach, items with different features in a feature family are divided into subsets of a universal set that contains all item orders for a certain target dealer 420. Then empty intersections of subsets are identified that contain only orders with a specific feature. From the identification of empty intersections, product definition constraints 224 can be generated.

A computational geometry approach identifies a sub-space in an n-dimensional space that only contains a feasible solution domain of the order selection optimization, where n is the number of features in an item order. The configuration matrix provides vertices (extreme points) of the convex hull. Then, computer software is used to translate the vertices into a set of algebraic inequalities that describe the n-dimensional polyhedron. These inequalities may be, for example, product definition constraints 224.

In addition to optimizing feature allocation 1212 through use of constraints, variety in feature allocation 1212 may be encouraged during feature allocation 1212 through a controlled decrease in the target feature level inventory mix rate 1104 for those features that are expected to receive allocation, in the absence of production constraints 222 and product definition constraints 224.

2. Uses of Feature Allocation

Feature allocation is often used to support the objective of balancing inventory for a particular dealer. For example, a use for feature allocation is to identify a number of items having a certain feature that each dealer will order, this number of items being included as an input to the execution of turn rate calculators to determine the relative goodness of various combinations (i.e., configurations) of the allocated features, as discussed below. However, feature allocation may have other uses.

Feature allocation can also be used to allocate features without subsequently performing order recommendations. This could be done either when there is a scarcity of one or more desirable features or when there is a requirement to use more than the desired number of one or more features.

For example, feature allocation may be used to balance inventory across dealers in a market or some other set of dealers by providing inventory to those dealers with greatest need. In this case the feature family is the group of dealers, and feature allocation represents the number of units to allocate to the group of dealers. Using the expected inventory mix rates of the dealers, a target for feature allocation may be determined based on historical sales of the dealers, where the output of feature allocation is the number of items to allocate to a particular dealer. The faster a particular dealer sells its inventory, the more the target level for that dealer is increased. Additionally, the faster a dealer sells its inventory, the more the dealer is losing inventory. This gap between inventory mix rate and sales turn rate may thus be measured and used by feature allocation to balance inventory to those dealers with a greater need for inventory. Such a system may be characterized as a "turn-and-earn" feature allocation system.

It may further be that there are material or production constraints related to the production of the items that also have to be taken into account. Feature allocation may be used to determine the number of each item for a dealer to agree to order over a future time period based on these constraints on what the dealer wishes to order and based on what is currently possible to be manufactured.

As another example of the use of feature allocation, for some franchises, dealers are required to negotiate with a manufacturer for how many items they are committed to buy in a future time period, such as over the next one or more months. When dealers enter into the negotiation, the dealers may want an estimate of the number of items including a particular feature they will be able to obtain. This estimate of the number of items including a particular feature may guide the dealer's decision on how many items to order. For example, if a dealer can obtain 83% of the items they order with a scarce feature, then the dealer may want to order twelve items total. However, if the dealer can only obtain 50% of the items they order with the scarce feature, the dealer may want to order fewer total items, e.g., eight total items.

Feature allocation may further be used to estimate, before the numbers of items to order for each target dealer 420 are known, the number or percentage of each feature each dealer will be allocated in the future. Feature allocation will either estimate a number of items each dealer is likely to order or feature allocation will receive from another data source an estimate of the number of items each dealer is likely to order. Feature allocation will use these item count estimates to provide output that may be used as an estimate of feature counts, or item counts are divided into the estimated feature counts to produce estimated percentages of each feature.

EE. Turn Rate Calculators

Optimization of feature allocations 1212 allows the order generation system 100 to determine what features to recommend to be ordered and in what quantities. However, feature allocations 1212 do not include configurations of the allocated features. In other words, feature allocations 1212 do not indicate how the features in the feature allocations 1212 are to be combined into configurations to be recommended to a target dealer 420 to order.

For example, feature allocations 1212 may indicate that three red vehicles, seven blue vehicles, and one vehicle with a moonroof should be ordered. However, the feature allocation 1212 does not indicate whether any of the blue vehicles or the any of the red vehicles is to have the allocated moonroof, or whether the vehicle with a moonroof should be ordered in yet another color.

Accordingly, the system 100 may use trained inventory turn rate calculators 1302 to determine which configurations of the features to use, given the feature allocations 1212, dealer allocations 212, and other constraints (e.g., product definition constraints 224, material availability constraints 226, etc.). Through this process, the system 100 determines, for example, that a red vehicle should be ordered with the moonroof.

1. Overview of Generating Turn Rate Calculators

Before determining configurations to order, the neural network models included in the inventory turn rate calculators 1302 are first trained based on records of inventory and sales of items, including configuration information regarding the specific features in the item configurations, contextual information regarding dealer location, dealer inventory level as a fraction of market area, average turn rate during the time period, and inventory mix rate information regarding the specific item configurations compared to what else was in dealer and market inventory.

The purpose of the neural network training is to create inventory turn rate calculators 1302 that will estimate the expected turn rates of all possible configurations of features. The neural network includes a plurality of models, e.g., 100 models in one exemplary implementation, that are trained with the input data, and the result of the training of the neural network is a set of inventory turn rate calculators 1302. Each inventory turn rate calculator 1302 is thus trained to determine a set of dealer configuration turn rates 1902 for a particular configuration of features, one for each model in the inventory turn rate calculator 1302, discussed in detail below. In some implementations, a set of inventory turn rate calculators 1302 are common to all dealers in a particular sales region.

Feature allocations 1212 may be based on linear assumptions concerning sales rates and available inventory. However, as noted above, demand and other factors affecting inventory turn rates may be nonlinear, or may be subject to non-unobservable disturbances. Thus, feature allocations 1212 alone are generally not optimal for determining which item configurations should include which features, i.e., to determine what feature combinations should be recommended for ordering by a target dealer 420. In addition to feature allocations 1212, it is generally useful to employ a mechanism that provides estimates of future turn rates for various features, e.g., inventory turn rate calculators 1302.

Figure 13:
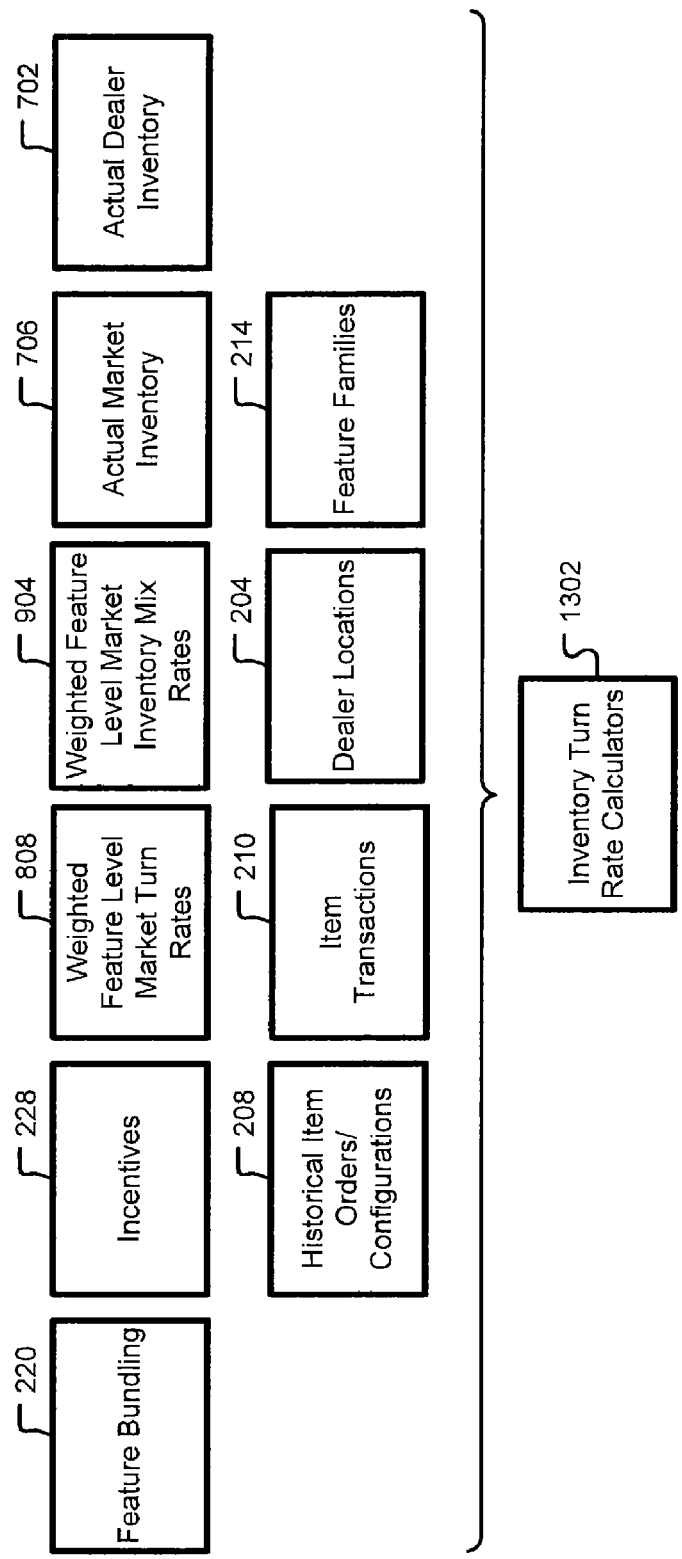
FIG. 13 illustrates exemplary relationships relating to generation of inventory turn rate calculators.

FIG. 13 illustrates exemplary data used in generation of inventory turn rate calculators 1302, each of data 202, 204, 216, 216, 218, 222, 224, and 226 each having been discussed above. A set of inventory turn rate calculators 1302 may created for providing estimates of inventory turn rates for any or all particular configurations. In some instances, inventory turn rate calculators 1302 are determined for each item configuration that a target dealer 420 may order to stock or replenish inventory. Using the turn rate calculators 1302 and a matrix of all possible configurations that may be built using feature allocations 1212, the system 100 may determine what configurations of items to recommend to a target dealer 420. Because this matrix can be extremely large, it generally cannot be processed manually, and generally some or all of the processing involving this configuration matrix is performed by one or more computing devices.

Turn rate calculators are created applying principles of statistical survival analysis with neural network methodologies. Turn rate calculators are designed to model a conditional probability that a specific item configuration, i.e., an item associated with a collection of features, at a given target dealer 420, under pre-specified dealer and market inventory mix rates, such as target feature level inventory mix rates 1104, will sell within a given time period, given that the item with the specific configuration has not been sold up to that point in time.

As mentioned above, turn rate calculators 1302 are designed, among other things, to address the problem that unobservable factors are preferably accounted for when estimating turn rates. For example, actual items available in inventory, and sales of items, are likely to account for only a fraction of possible item configurations. Therefore, turn rate calculators generalize and create inventory turn rate calculators 1302 based on observing multiple configurations with various combinations of features.

2. Mix Rate Modulation Encoding

Figure 14:
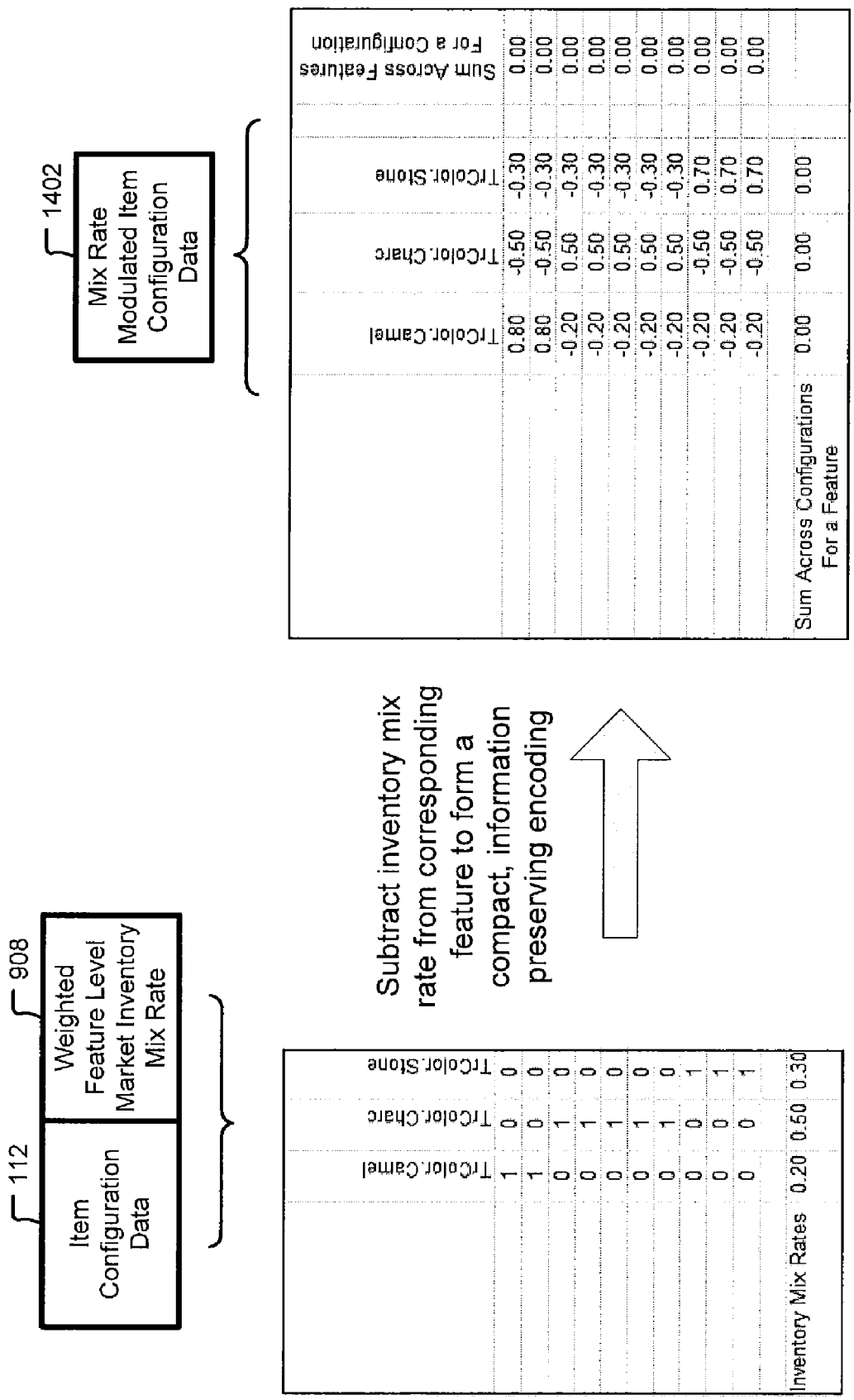
FIG. 14 illustrates an exemplary mix rate modulation encoding.

FIG. 14 illustrates an exemplary mix rate modulation encoding. This encoding may later be used for facilitating neural network processing, among other uses. As illustrated in FIG. 14, historical item orders/configurations 208 in combination with weighted feature level market inventory mix rates 904 may be used to construct a compact representation of configurations of individual items in relation to the mix rates for the items. The representation may take historical configuration data (e.g., vehicle color) and modulate that data according to a number or a percentage of inventory (e.g., fraction of red items in inventory) that the configuration represented.

For each item, a configuration for the item may be created in a binary fashion. Specifically, a data record for the item may be encoded which includes a list of features associated with an item by, for each feature in the list of features, placing the value "1" in a field associated with a feature if the feature exists with respect to the item, and placing the value "0" in the field associated with the feature if the feature does not exist with respect to the item.

Then, this representation may be converted into mix rate modulated item configuration data 1402. Specifically, for each feature in the list of features, a percentage of items in inventory for which the feature exists is determined. For each field associated with a feature in the data record, the percentage of items in inventory for which the feature exists is subtracted from the one or the zero encoded in the field, thereby generating a matrix of inventory mix-rate modulated configurations.

The exemplary mix rate modulation encoding has non-negative values for those features that are present in a configuration, and non-positive values for the features that are not present in a current configuration, because the mix rates are always bounded between zero and unity. Furthermore, it is almost always possible to recover the original information with this encoding, except for the case where all items for a feature are of the same value. However, for this special case where all items have the same value for a feature, no estimates may be made with regard to an item that has a different value for the feature, because no variation in vehicle configurations with the indicated features is observed.

Other properties of the mix rate modulation are that the sum of the values across all features within a feature family for a given record are equal to zero, and average value across all records for any given feature in any given time interval must be equal to zero.

It is important to note that other encodings of item configuration data and inventory mix rates are possible instead of the mix rate modulated item configuration data 1402. One alternative encoding is similar to the encoding described above in that it uses the binary representation of features coupled with the feature-level market inventory mix rates. However, rather than subtracting the inventory mix rate from the binary encoding, this alternative encoding operates as follows: if a feature is present in a configuration, then the binary signal "1" is multiplied by the inventory mix rate; however, if the feature is not present, then the binary signal "−1" is multiplied by the inventory mix rate.

Note that in the case of the absence of the feature, the original encoding discussed above (using 1s and 0s) and this alternative encoding (using 1s and −1s) yield similar results. However, in the case of the presence of the feature, in this alternative encoding, as the inventory mix rate approaches unity, so does the mix rate modulated encoding. In the encoding that uses 1s and 0s, as the inventory mix rate approaches unity, the mix rate modulated encoding approaches zero. Further, in this alternative representation, the characteristic is lost that the sum across all features of a feature family of the individual mix rate modulated configuration values approaches zero.

Also, for data sets prepared for training of turn rate calculators 1302, this alternative encoding does not provide the property that the sum of the mix rate modulated encoding across all records for a given feature equals zero. Hence, application of PCA would require some normalizing of the mix rate modulated data in the alternative encoding. On the other hand, the use of the alternative encoding makes it possible to always recover the original information, even in the case where the inventory mix rate for a feature is 100%. The encoding discussed above that uses 1s and 0s, on the other hand, does not allow recovery of which feature was always present (since the mix rate modulated encoding is zero everywhere), whereas the alternative encoding allows for the full recovery of information even in this limit.

3. Principal Components Analysis

For some items, there may be few possible combinations of features and therefore the dimensionality of the mix rate modulated item configuration data 1402 matrix may be acceptable for further processing as-is. However, in other cases, such as for an item with many possible configurations, e.g., a vehicle with a large number of different possible features, it may be desirable to reduce the dimensionality of the matrix to a more manageable level.

Mix rate modulated item configuration data 1402 is a redundant representation, as can be seen in the repetition of various quantities in FIG. 14. Further, the sum of the number of features across all feature families can be quite large for items with a great quantity of features. However, in some cases, the effective dimensionality can be substantially less, e.g., at a minimum, the number of actual feature families. Because the neural network training methods may have computational complexity that scales with the square of the number of inputs (or feature space dimensionality), it is may be useful in some cases to take steps to reduce the input space dimensionality while preserving as much information as is reasonably possible.

PCA may be used to reduce the dimensionality of the matrix including the mix rate modulated item configuration data 1402 created above. One aspect of the mix rate modulated item configuration data 1402 encoding is that the encoded data is already in a form natural for application of PCA, where no further transformations may be required. For example, the average value of mix rate modulated feature indices are nearly zero, and would be zero in the absence of cross sales region contributions to the mix rate calculations. Furthermore, the values of each of these indexes are bounded by plus and minus one.

Figure 15:
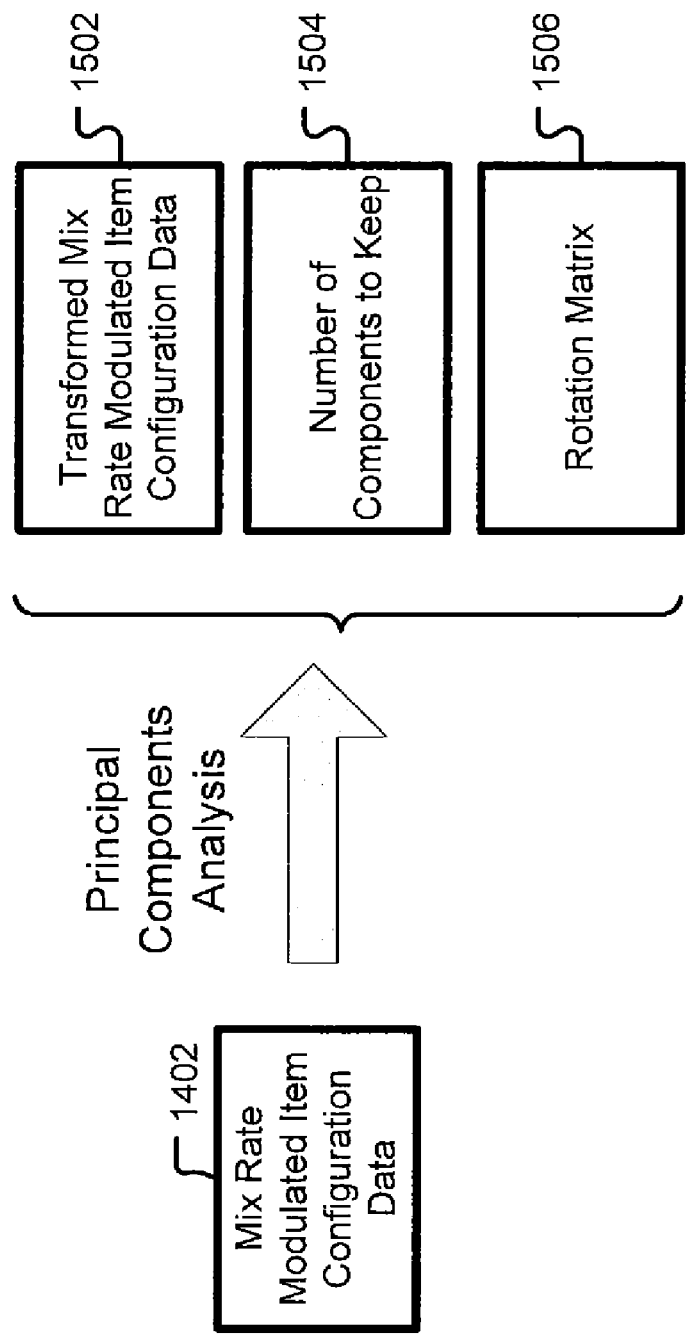
FIG. 15 illustrates exemplary data relating to principal component analysis.

FIG. 15 illustrates exemplary data relating to principal component analysis. As seen in FIG. 15, the input to the PCA is the mix rate modulated item configuration data 1402. More specifically, the mix rate modulated item configuration data 1402 may be organized into a matrix A of size $n_r$ rows by $n_c$ columns, where $n_r$ is the number of records that have previously been assembled for the 8-week period, and $n_c$ is the number of features across all feature families. In many cases $n_r \geq n_c$. SVD may be used to perform the PCA, as due to the nature of the mix rate modulated item configuration data 1402, no scaling or centering of the data may be necessary.

Generally, SVD decomposes the matrix A into three matrices:

$$A = UWV^T;$$

where U is a column-orthogonal matrix of size $n_r$ by $n_c$; W is a diagonal matrix of size $n_c$ by $n_c$ and containing a vector of scaled standard deviations along the matrix diagonal; and V is an orthogonal matrix of size $n_c$ by $n_c$, also known as the rotation matrix 1506.

The transformed values may be recovered from the untransformed data as follows:

$$X = AV = UW;$$

because of the fact that $V^T V = I$. Accordingly, principal component techniques may be performed to generate three outputs from the mix rate modulated item configuration data 1402: a transformed mix rate modulated matrix 1502 (i.e., matrix X), a number of components to keep 1504 (based on analysis of matrix W), and a rotation matrix 1506 (i.e., matrix $V^T$), The sorted list of standard deviations from the diagonal matrix of standard deviations W may be analyzed to determine the minimum number of transformed components to retain that account for a certain percentage, e.g., 98%, of the variance in the original data set. The concept of "variance" is discussed further below; for the moment, note that "variance" may be defined as the square of the standard deviation. The number of components retained is given by $n_x$, or the number of components to keep 1504. Only the first $n_x$ components are retained from the transformed mix rate modulated matrix 1502 (i.e., the transformed variables in matrix X) for training the turn rate calculators 1302. This reduction in the input data accordingly allows for the dimensionality of the later calculations to be reduced. Note that the vector of standard deviations encoded in the matrix W must be retained, as well as the rotation matrix 1506 (i.e., matrix V), so that the same transformation can be applied to the evaluation of mix rate modulated item configuration data 1402 in the next step, where expected turn rates for different configurations are evaluated.

4. Neural Network Models

Figure 16:
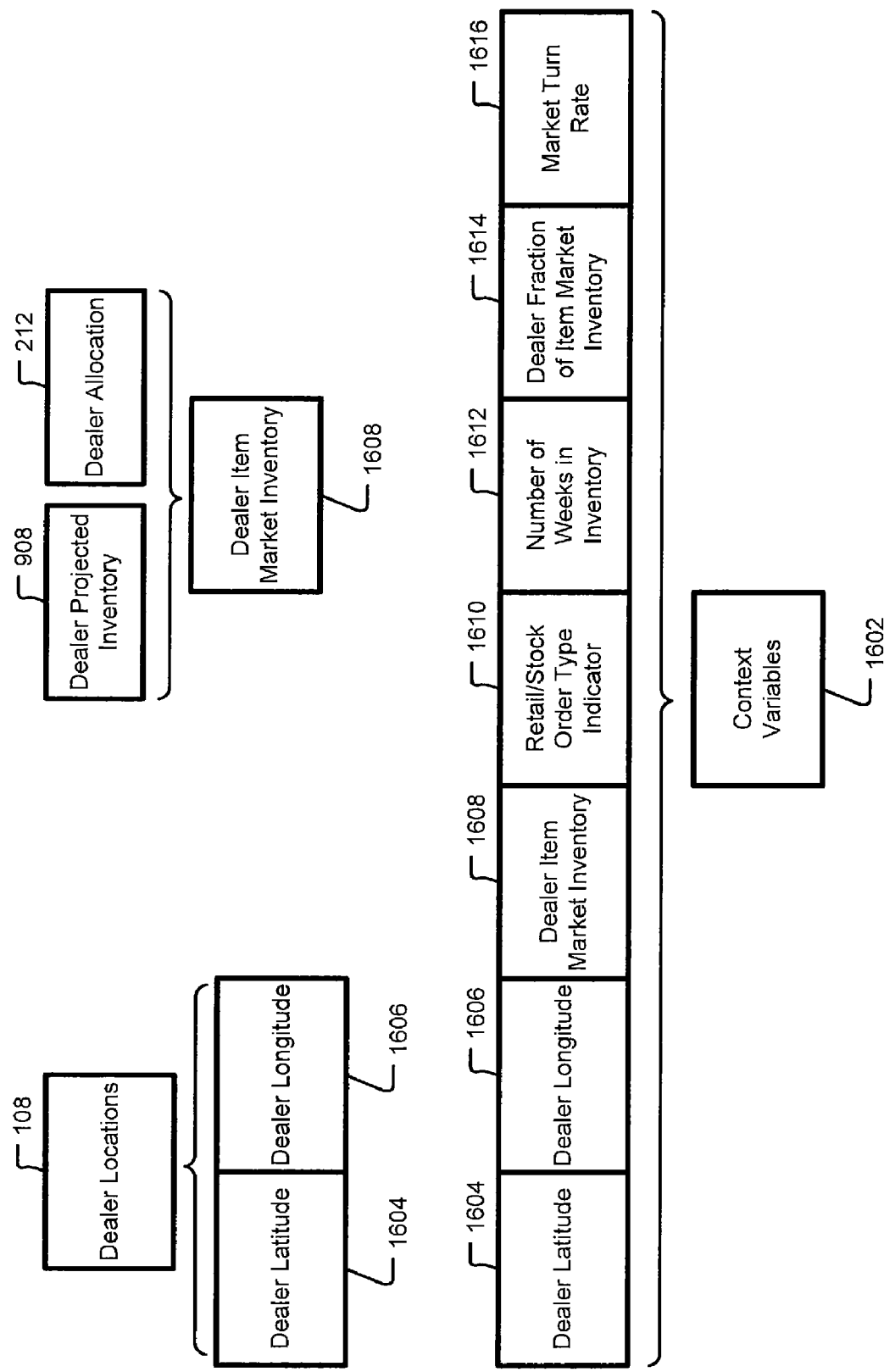
FIG. 16 illustrates exemplary neural network context variables relating to neural network data set records.

FIG. 16 illustrates exemplary context variables relating to neural network data set records. Context variables 1602 are variables that include information regarding particular items unrelated to the configuration of the items, such as a location of a dealer at which an item was in inventory. As illustrated, context variables 1602 are added to the transformed mix rate modulated matrix 1502. In other instances, where PCA is not used to reduce dimensionality, the context variables 1602 may instead be added to the to the mix rate modulated item configuration data 1402 itself. In any event, providing configuration information for the items as input to the neural network training modules allows for the order generation system 100 to generate neural network models that further take into account variables that are not related to item configuration. As an example of the importance of contextual information, a vehicle with a moonroof may be more popular in a first dealer market area 410, but may be far less popular in a second dealer market area 410.

Inputs to neural network training modules may include, but are no means limited to, records relating to the configuration of items that have sold or are in inventory, combined with contextual information for the items. Merely by way of example, inputs to the neural network training modules may include historical item orders/configurations 208, item transactions 210, dealer locations 204, feature families 214, actual market inventory 706, actual dealer inventory 702, weighted feature level market turn rates 808, and weighted feature level market inventory mix rates 906. Inputs may further include other market factors, including feature bundling 220 and incentives 228 that should be taken into account to prevent sales rates from being skewed based on temporary dealer or manufacturer promotions.

As mentioned above, inputs to the neural network training modules may include information relating to configurations of items that have sold within a given time period, or that are in inventory, combined with contextual information for the items. As illustrated in FIG. 16, context variables 1602 may be included in the inventory turn rate calculators 1302 to allow for the contextual information relating to an item to be taken into account, in addition to the configuration of the items that are sold or in inventory. Specifically, exemplary context variables 1602 may include dealer latitude 1604, dealer longitude 1606, dealer item market inventory 1608, retail/stock order type indicator 1610, number of weeks in inventory 1612, dealer fraction of item market inventory 1614, and market turn rate 1616.

In other implementations, more, fewer, or different context variables 1602 may be used. As an example, as illustrated, dealer latitude 1604 and dealer longitude 1606 are determined based on dealer locations 204. However, in other examples, dealer location may be omitted entirely from the set of context variables 1602. As another example, as illustrated, dealer item market inventory 1608 is determined based on dealer projected inventory 1006 and a dealer allocation 212 for items, such as items that could be ordered and in inventory. However, in yet another example, context variables 1602 may be utilized that do not include contextual information relating to other available inventory. Regardless of the context variables 1602 that may be used, each row of the matrix includes mix rate modulated item configuration data 1402, and may be combined with context variables 1602 for that row.

Generally, neural network modules may develop predictive capabilities by being trained on a set of historical inputs and known resulting outputs. As one example, each of a set of neural network modules may initially estimate a set of parameters, where a parameter directly or indirectly connects one or more of the designated input variables to one or more of the processing elements of the neural network module. The neural network training process may then adjust these parameters in response to the applied input variables so that the output values of the neural network module more closely match the known resulting outputs associated with the set of historical input data. Once appropriate parameters have been optimized to minimize the difference between expected and actual output from the neural network module, the neural network module may then be used to predict output values for new input data.

Accordingly, the matrix of mix rate modulated item configuration data 1402 and context variables 1602 may thus be used as input to neural network modules. Based on these inputs, the neural network training modules may produce multiple neural network models that can be used to obtain expected inventory turn rates at the configuration level, as well as a measure of variance for the expected inventory turn rates.

Expected inventory turn rates and the variance may be used to calculate risk-adjusted turn rates, i.e., turn rates that take into account the relative reliability of the estimate. Turn rates may have a high variance because of insufficient information available in the inputs to the neural network models to determine an inventory turn rate calculator 1302 with much reliability. Accordingly, a high turn rate accompanied with high uncertainty may reflect an undesirable configuration to use, because the risk of error may be too high. Instead, a configuration with a lower estimated turn rate may be preferable if that lower estimated turn rate is based on a turn rate having a lower variance.

5. Exemplary Neural Network Processing of Mix Rate Modulation Encoded Data

Figure 17:
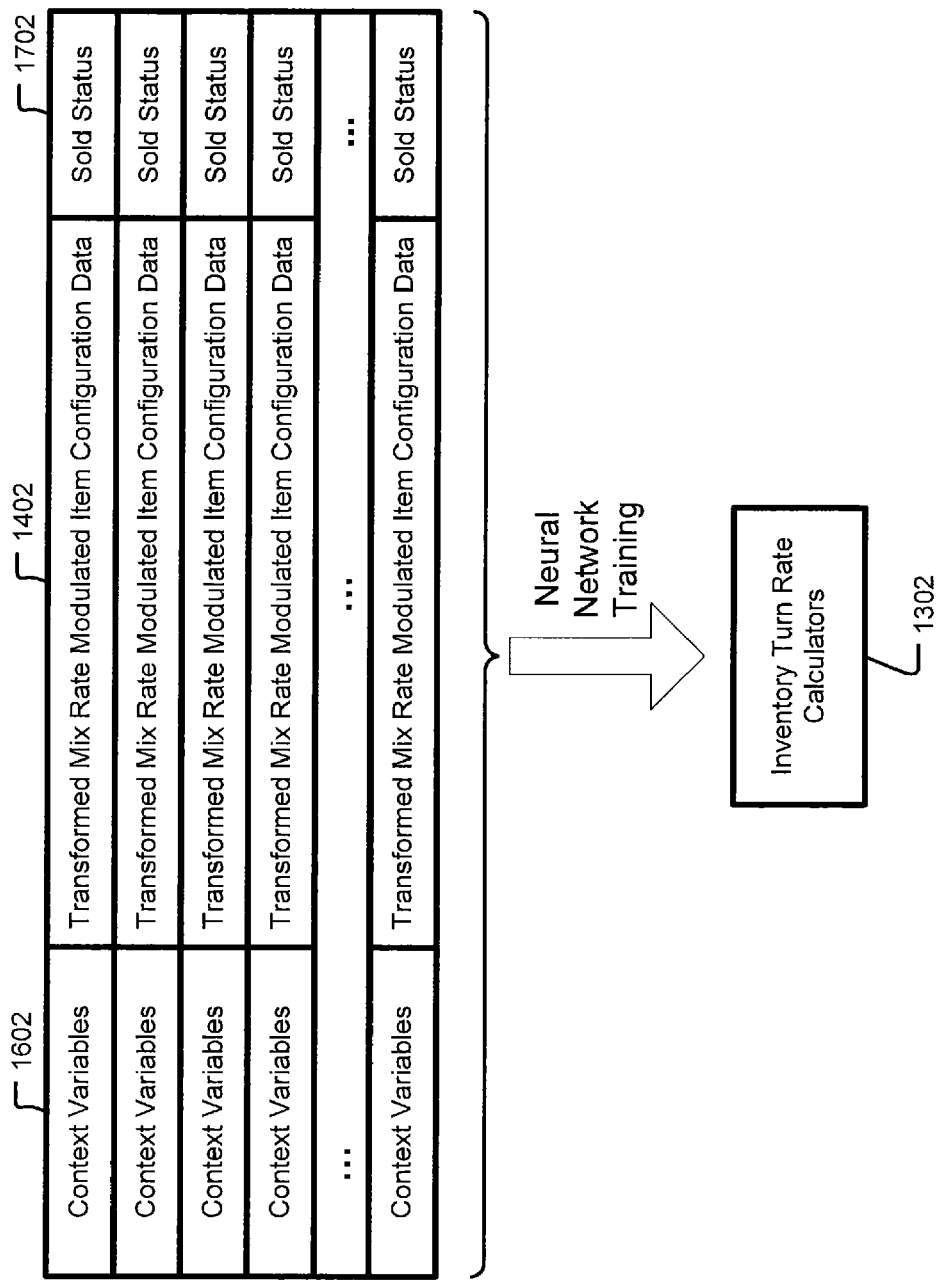
FIG. 17 illustrates an exemplary neural network processing of mix rate modulation encoded data.

FIG. 17 illustrates an exemplary neural network processing of mix rate modulation encoded data to generate inventory turn rate calculators 1302.

The data set for neural network training on sales and inventory data for an item in a dealer market area 410 includes of a plurality of records, each including context variables 1602, mix rate modulated item configuration data 1402, and a sold status 1702. The sold status 1702 indicates whether or not the item corresponding to the data row was sold.

For training of the neural network training models, such as mentioned above, the resulting data set including mix rate modulated item configuration data 1402, context variables 1602, and sold status 1702 may be processed by a neural network training program to develop neural network inventory turn rate calculators 1302 for each item and sales region. This step is particularly well-suited to parallelization, and many separate neural network models for different items and sales regions may be computed in parallel, for example by supercomputer 170.

In other examples, turn rate calculators 1302 may be generated from the mix rate modulated data through techniques other than neural networks. For example, turn rate calculators 1302 may be developed through use of regression analysis methods such as simple logistic regression, in which prediction of the probability of occurrence of an event is determined by fitting data to a logistic curve. As another example, turn rate calculators 1302 may be developed through statistical survival models, such as Cox proportional hazards models.

6. Configuration Matrix

Figure 18:
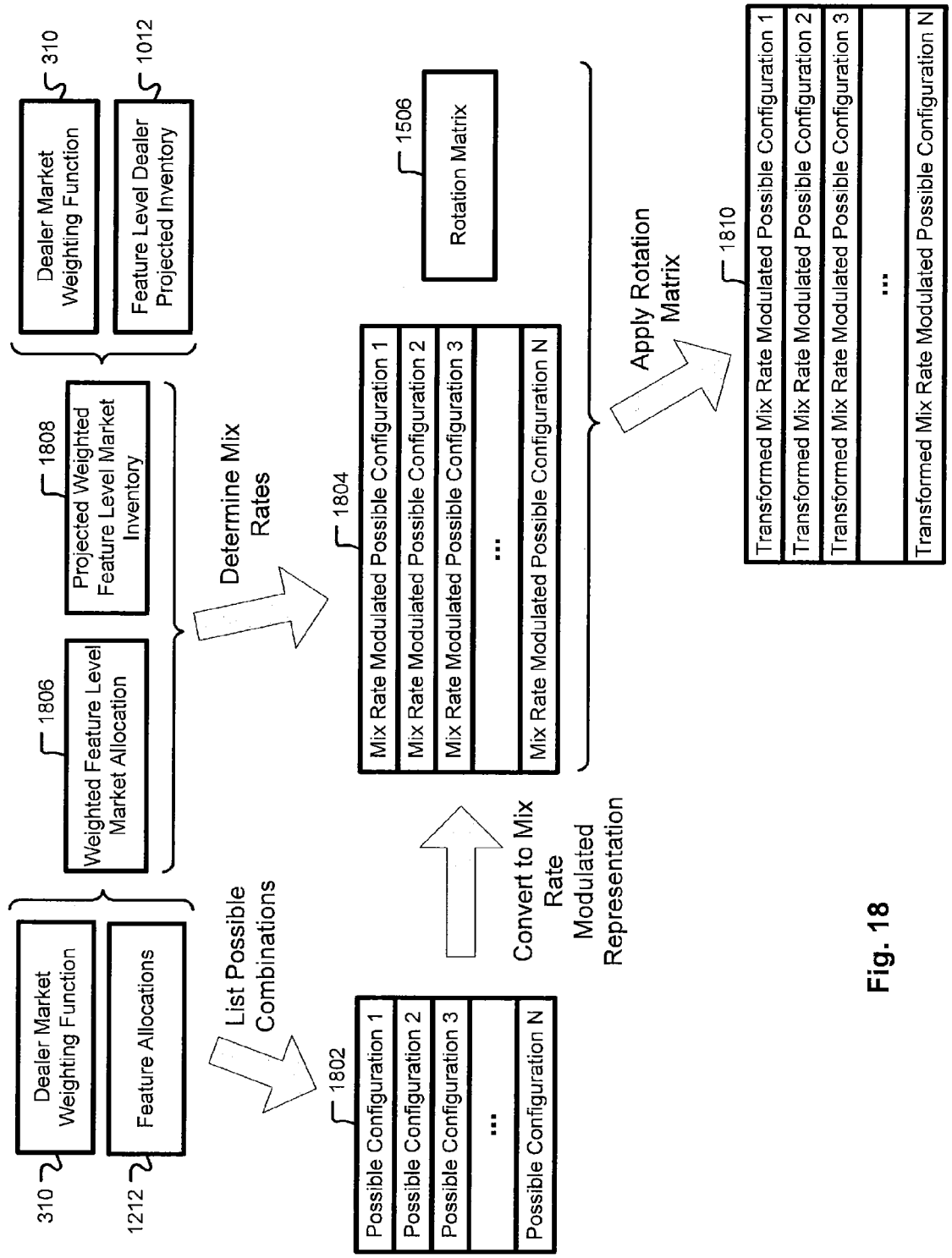
FIG. 18 illustrates exemplary construction of a configuration matrix for the evaluation of neural network inventory turn rate calculators.

FIG. 18 illustrates exemplary construction of a configuration matrix for the evaluation of neural network inventory turn rate calculators. Evaluation of the trained neural network inventory turn rate calculators 1302 is performed to determine turn rates for various configurations of features based on the training.

Once the neural network is trained, and the inventory turn rate calculators 1302 are generated, the system 100 uses the inventory turn rate calculators 1302 to determine turn rates for the possible configurations of features in feature allocations 1212. Specifically, the order generation system 100 may create a matrix of all realizable configurations, which may then be further limited to a possible configurations matrix 1802 based on feature allocations 1212, which are affected by constraints such as product definition constraints 224, dealer allocations 212, material availability constraints 226, etc As illustrated, the possible configurations matrix 1802 includes N possible configurations. Any configuration that is precluded from being considered due to zero allocation of certain features may be pruned from the matrix at this point since no such configuration will be recommended. As a result, it is not necessary to evaluate the pruned configuration expected turn rate for that dealer, reducing the necessary processing.

The possible configurations matrix 1802 may be mix rate modulated into a mix rate modulated possible configurations matrix 1804. Specifically, for each possible configuration in possible configurations matrix 1802, mix rate modulated possible configurations matrix 1804 indexes may be encoded by subtracting determined market-level projected inventory mix rates from the binary feature encoding.

To allow the inventory mix rates needed to account for projected inventory at the point in time when the items may be added to dealer inventory, the market-level projected inventory mix rates may be determined based on the feature allocations 1212, and also based on the feature level projected dealer inventory 1012. Weighted feature level market allocations 1806 may be determined based on the feature allocations 1212 for a target dealer 420 and competing dealers 430 in the dealer market area 410 weighted by a dealer market weighting function 310. Additionally, projected weighted feature level market inventory 1808 may be determined from the feature level dealer projected inventory 1012 based on a dealer market weighting function 310. Weighted feature level market allocations 1806 and projected weighted feature level market inventory 1808 may be used to determine market-level mix rates for the possible configurations matrix 1802 for a future time, based on the projected level of market inventory at that time and also based on the feature allocations 1212 for the market area.

The mix rate modulated possible configurations matrix 1804 may be transformed according to the rotation matrix 1506 previously computed during the PCA of the mix rate modulated item configuration data 1402. Specifically the rotation matrix 1506 from the PCA performed in the neural network training step may be applied to the mix rate modulated possible configurations matrix 1804 to transform the matrix 1804 into a transformed mix rate modulated possible configurations matrix 1810. Importantly, the resulting transformed mix rate modulated possible configurations matrix 1810 is transformed into a reduced space of size $n_x$ as was done above to reduce the dimensionality of the data used to train the turn rate calculators 1302. Also, the transformed mix rate modulated possible configurations matrix 1810 includes the minimum number of components that account for a predetermined percentage, e.g., 98%, of the variance of the original data used to train the turn rate calculators 1302.

7. Evaluation of Turn Rate Calculators

Figure 19:
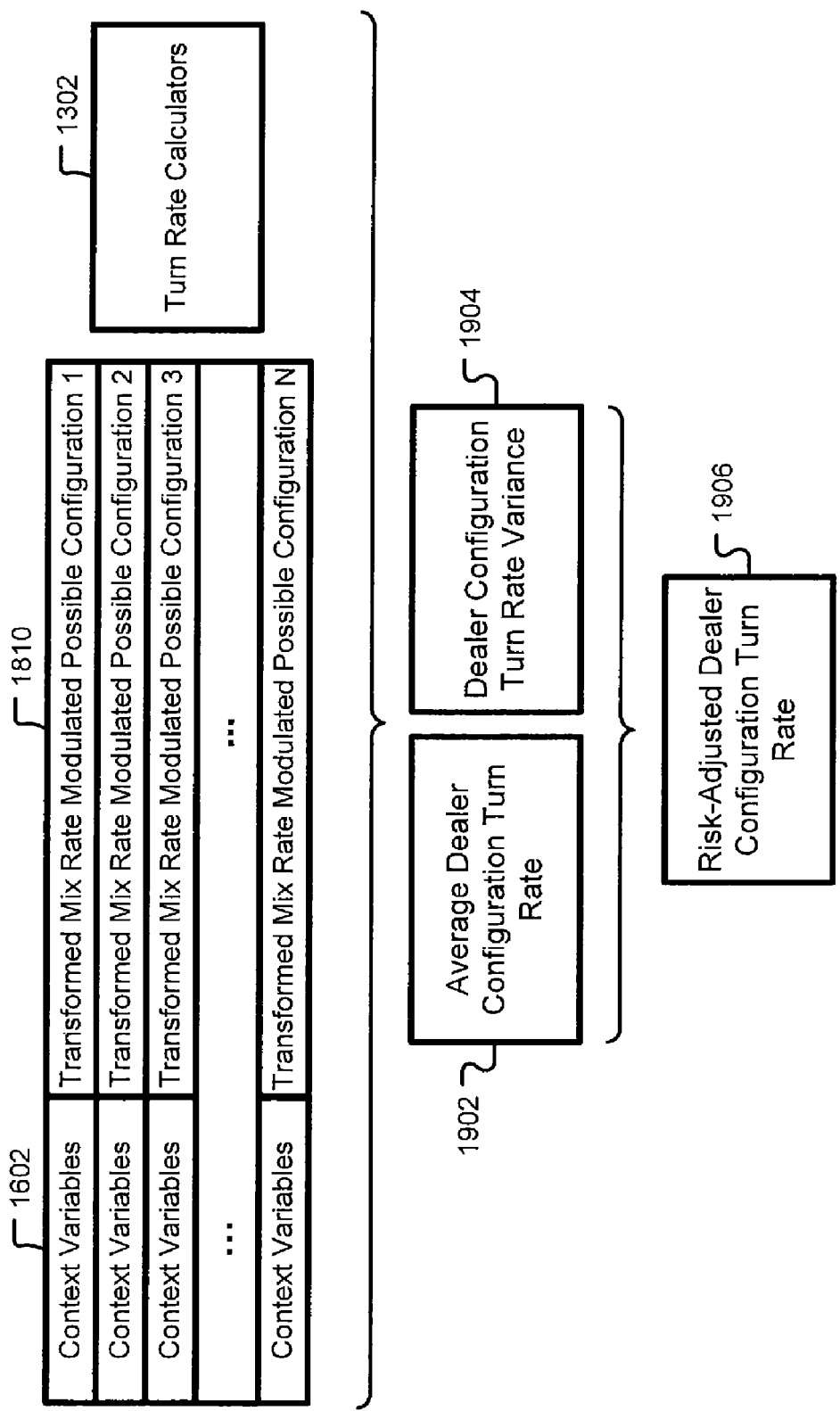
FIG. 19 illustrates an exemplary calculation of risk-adjusted turn rates based on inventory turn rate calculators.

FIG. 19 illustrates an exemplary calculation of risk-adjusted turn rates based on evaluation of inventory turn rate calculators 1302. In general, inventory turn rate calculators 1302 should be evaluated for each target dealer 420 in isolation from other dealers, because each target dealer 420 will have particular characteristics, e.g., as captured by the particular context variables 1602 and weighted feature level market inventory mix rates 908 associated with the target dealer 420.

As discussed above, feature allocations for the target dealer 420 are used to create a transformed mix rate modulated possible configurations matrix 1810. Context variables 1602 may then be added to the transformed mix rate modulated possible configurations matrix 1810. Exemplary context variables 1602 may include, but are by no means limited to, dealer latitude 1604, dealer longitude 1606, retail/stock indicator 1610, number of weeks in inventory 1612, dealer fraction of item market inventory 1614, and market turn rate 1616.

The matrix including context variables 1602 and transformed mix rate modulated possible configurations matrix 1810 may then be evaluated by the inventory turn rate calculators 1302 through use of the neural network. The neural network may then produce dealer configuration turn rates 1902 that indicate the expected turn rate for each configuration in the matrix. For example, the neural network may run 100 independent models on each configuration in the matrix, and may determine the dealer configuration turn rates 1902 based on an average of those 100 results.

The neural network may further produce dealer configuration turn rate variances 1904 for each dealer configuration turn rates 1902 that indicate a confidence factor for the associated dealer configuration turn rates 1902. For example, using the same one-hundred independent models run on each configuration in the matrix, the neural network may determine dealer configuration turn rate variances 1904 and the standard deviation as the square root of the variance 1904.

The dealer configuration turn rates 1902 and dealer configuration turn rate variances 1904 may then be used to determine risk-adjusted dealer configuration turn rates 1906, which are estimated turn rates for a configuration in the matrix adjusted according to the dealer configuration turn rate variances 1904. For example, risk-adjusted dealer configuration turn rates 1906 may be computed by subtracting dealer configuration turn rate variances 1904 multiplied by a constant from dealer configuration turn rates 1902.

Because the inventory turn rate calculators 1302 each may include a plurality of varying models (e.g., one-hundred models), each model in an inventory turn rate calculator 1302 may produce a somewhat different turn rate. These differences may be measured, and may be used to determine an average dealer configuration turn rate 1902 for the configuration.

Additionally, the variance of the calculated turn rates for an inventory turn rate calculator 1302 may also be calculated. Risk-adjusted dealer configuration turn rates 1906 may then be generated from the average dealer configuration turn rates 1902, by adjusting the average dealer configuration turn rates 1902 based on the dealer configuration turn rate variances 1904. In some examples, risk-adjusted dealer configuration turn rates 1906 may be computed by subtracting the dealer configuration turn rate variance 1904 multiplied by a scaling factor from the average dealer configuration turn rates 1902. Accordingly, an average calculated turn rate with a greater dealer configuration turn rate variance 1904 may be reduced by a greater amount than an average calculated turn rate with a lower dealer configuration turn rate variance 1904.

Figure 20:
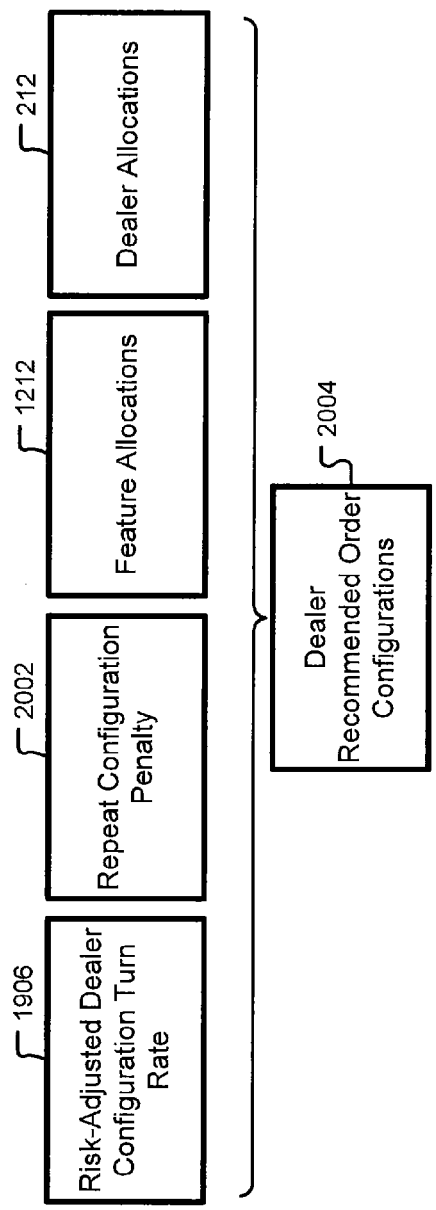
FIG. 20 illustrates exemplary data relationships relating to order selection.

FIG. 20 illustrates exemplary data relationships relating to order selection. Based on the feature allocations 1212 and the computed risk-adjusted dealer configuration turn rates 1906, dealer recommended order configurations 2004 can be generated.

More specifically, the risk-adjusted dealer configuration turn rates 1906 may be used to determine which configurations of features to recommend through a maximization of risk-adjusted dealer configuration turn rates 1906. The maximization further takes into account feature allocations 1212 for the target dealer 420.

The set of configurations resulting from maximizing risk-adjusted dealer configuration turn rates 1906 may then be recommended to a target dealer 420 to order. That is, specific dealer orders recommendations may be generated, including quantities, such that the sum of risk-adjusted turn dealer configuration turn rates 1906 of the recommended configurations is maximized. A penalty 2002 for selecting the same configuration multiple times may further be imposed on the optimization to introduce greater diversity in the inventory of a target dealer 420. The penalty 2002 term may be the scaled sum of the square of the number of items to order across all configurations; this will penalize choosing any one configuration more than once. Alternative schemes for promoting diversity that are linear in the additional terms for the objective function can be formulated. Similarly, rewards may be conferred for greater diversity, e.g., the score of a configuration may be adjusted up or down based on whether it promotes diversity, the degree to which diversity is desired even at the possible expense of maximizing sales, etc. In addition, the order selection step must also satisfy feature allocations 1212 for the target dealer 420, as well as dealer allocations 212.

8. Uses of Turn Rate Calculators

One use of neural network turn rate calculators disclosed herein is to provide a basis for evaluating the fitness of specific configurations, under specific inventory conditions, in order to guide the selection of configurations for dealers to order. That is, turn rate calculators may be used to score configurations that may be used in order recommendations. However, alternative applications of such turn rate calculators are possible, and contemplated. Two examples of such alternative applications are provided herein, although other examples are possible and even likely.

In a first example, inventory turn rate calculators can be used as a basis for trading items between dealers. Consider a situation in which Dealer A has a customer who desires a particular item that Dealer A does not currently have in inventory. Dealer A performs a search of available inventory at other dealerships, and finds that Dealer B currently has the item of interest in inventory. Dealer A inquires of Dealer B if Dealer B would be interested in trading the item of interest, in exchange for another item from Dealer A's inventory (plus any differential associated with the costs of the two items being exchanged). Dealer B is interested in such a trade, provided that the unit which would be provided in return from Dealer A is expected to have sales performance that is as good or better, in terms of expected risk-adjusted turn rate, as the item being traded away.

In one scenario, Dealer A could offer that Dealer B may select one of a group of vehicles for trade. Dealer A could select which items to offer for trade by evaluating the expected inventory turn rate for all items in Dealer A's inventory, and then select that group of items which is expected to be the worst performing units for Dealer A. In turn, Dealer B could evaluate the expected turn rate of the vehicles being offered by Dealer A, as well as that of the item being requested for trade. After evaluation of the respective expected turn rates, Dealer B could rank order each of the items, and if the highest ranked item has a higher expected turn rate than the item being traded away, then Dealer B might agree to the trade, and request that item which was highest ranked in exchange.

In a variation on this scenario, Dealer B could also evaluate other items that Dealer A has not offered in exchange to see if there are suitable candidates, and provide a counter-offer in case the group of items originally offered by Dealer A was found to be unacceptable. In yet another variation of this scenario, a manufacturer (sometimes referred to as the original equipment manufacturer, or OEM) could provide to dealers who regularly exchange items a mechanism for identifying items that are suitable for trade, such that items which are expected to be poor performers at one dealership would be good performers at the second, and vice-versa.

In a second alternative exemplary use of inventory turn rate calculators, an OEM could use evaluation of the turn rate calculators to determine which combinations of features should or should not be offered for sale. Turn rate calculators could thereby provide the basis of reducing orderable complexity, which has significant cost savings for the OEM (engineering, manufacturing, marketing, logistics, etc.), while at the same time improving dealer and customer satisfaction by insuring that undesirable items cannot be ordered and stocked by dealers, and ultimately purchased by end customers.

9. Alternatives to Turn Rate Calculators

An alternative to using turn-rate calculators 1302 to score configurations for order recommendation is to use survey data. For example, a paper survey or a survey application on a website, or through some other electronic mechanism, may be used to collect data from potential customers concerning preferred configurations. This data may then be used to rank possible configurations, and to serve as a basis for recommending orders to customers. Alternatively or in addition, dealers could be surveyed through paper or electronic mechanisms to score configurations, enter a preferred set of configurations, or enter an example set of configurations in a desirable inventory state. The frequency of observation of each configuration, or partial configuration, may then be used as a score for the configuration. Such use of survey data may be particularly useful when sales data for an item of interest does not exist, such as when new items are introduced into a marketplace.

Additional or alternative ways to score configurations could include evaluating the profitability of various configurations for one or both of dealers and suppliers, or scoring based on customer surplus utility. Customer surplus utility is the monetary value that a customer assigns to an item, minus the price paid for the item. In general, rational customers and dealers will want to maximize their surplus.

FF. Reporting

Figure 21:
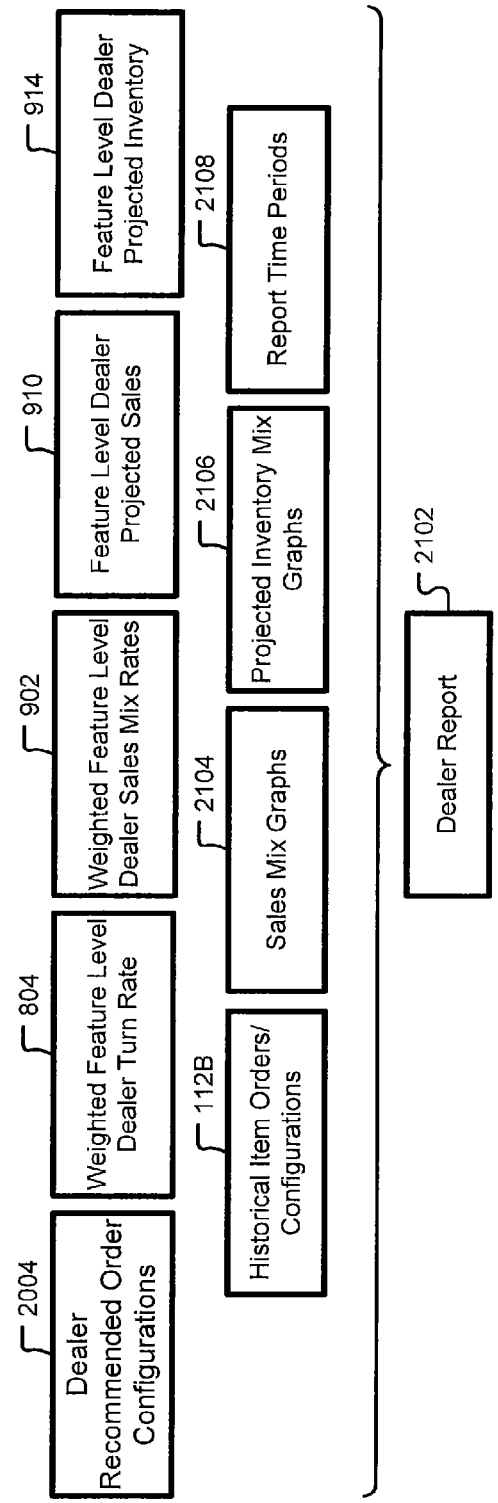
FIG. 21 illustrates an exemplary data relationship relating to information used in report generation.

FIG. 21 illustrates exemplary data relationships relating to report generation.

Dealer recommended order configurations 2004 for a target dealer 420 may be included in a dealer report 2102 that is sent to the target dealer 420.

For example, dealer reports 2102 may be communicated to target dealers 420 through reports in a PDF (portable document file) format, where the dealer reports 2102 are customized for each dealer. The reports may, for example, be made available through a website and/or are e-mailed to a designated contact at each target dealer 420.

In addition to dealer recommended order configurations 2004, the dealer report 2102 may further include information used to arrive or justify the dealer recommended order configurations 2004. For example, a dealer report 2102 may include one or more of the following: weighted feature level dealer turn rates 804, weighted feature level dealer sales mix rates 902, feature level dealer projected sales 1008, feature level dealer projected inventory 1012, as well as historical sales, sales mix graphs 2104, projected inventory mix graphs 2106, and report time periods 2108, among other things.

FIGS. 22-24 illustrate various exemplary dealer reports 2102. As illustrated in FIG. 22, a dealer report 2102 may include a cover page including general information, such as the title of the report, the reporting period, general findings regarding the dealer turn rate, the date of the report, etc. As illustrated in FIG. 23, a dealer report 2102 may include a set of recommended orders for the dealer to make for a particular time period, such as for a particular week. As illustrated in FIG. 24, a dealer report 2102 may include data regarding sales volumes, and dealer and market mix rates. In other examples, dealer report 2102 may include more, fewer, or different data elements.

IV. System Operation

A. Setup Process

Figure 25:
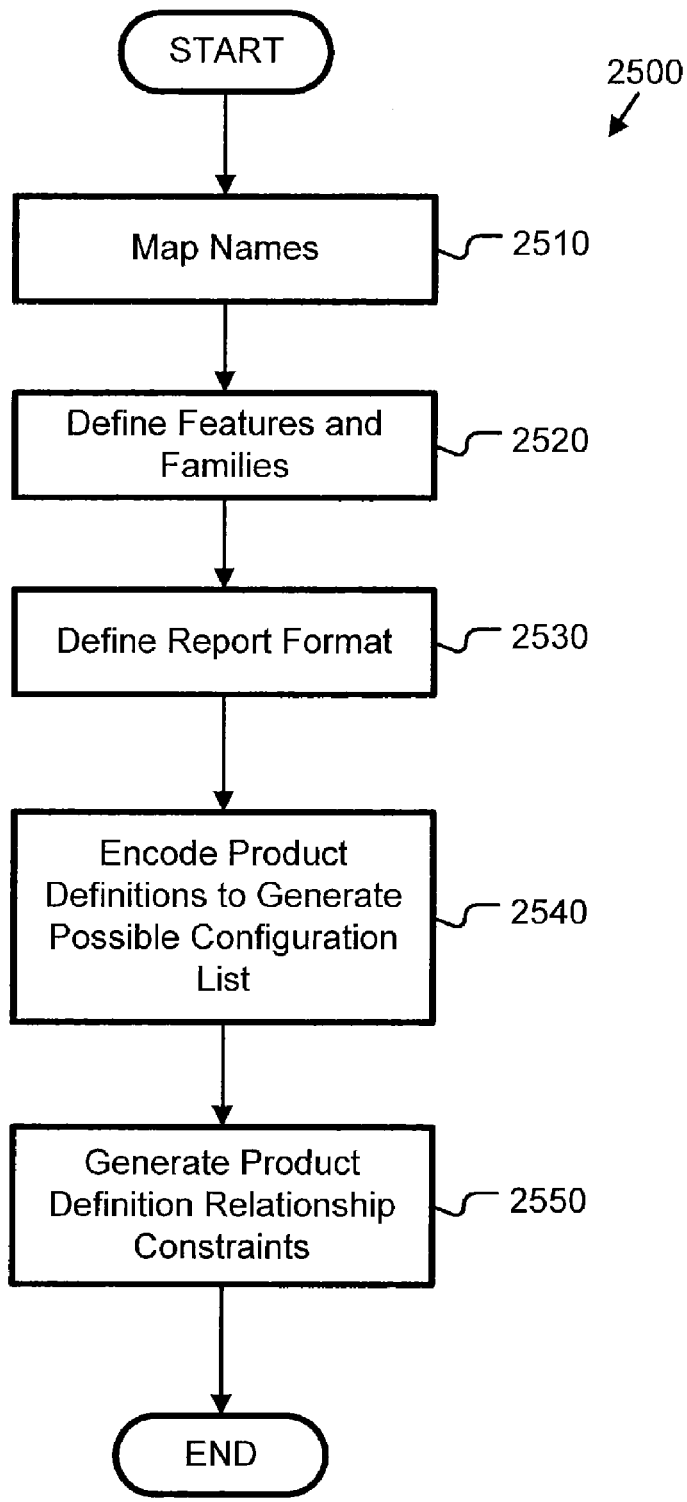
FIG. 25 illustrates an exemplary feature selection system setup process.

FIG. 25 illustrates an exemplary setup process 2500. Process 2500 details exemplary steps for storing and processing data, related to possible configurations of an item, for periodic processing by inventory management server 150. Accordingly, the setup process 2500 may only be required to be executed initially, not each time a new set of suggested orders are generated for the item, or each time new sales data inventory data, etc. are reported for the item. However, the setup process 2500 may be required to be executed more than once, for example, when there are changes in possible configurations for an item. For example, in the case of vehicles, process 2500 may need to be re-run in the event of mid-model year model changes, or for a new model year.

The process 2500 begins in a step 2510, in which data mappings between different data sources are generated. For example, a data mapping may be required for decoding a manufacturer-specific representation of item features. As an example, a manufacturer may represent item features as a concatenated string of codes that represent the features included in the item. If necessary, a translation table may be created which maps elements of the manufacturer-specific representation into a format more usable for the inventory management server 150, such as in a family.feature format.

One reason such a translation may be necessary is because the manufacturer may include one or more compound descriptors in the representation of item features, which are descriptors in which multiple features are encoded. For example, the Rear Spoiler and Moonroof feature families for a vehicle might share a character field with the following descriptors: "blank"=No Spoiler or Moonroof; "M"=Moonroof without a Spoiler; "S"=Spoiler without a Moonroof; and "1"=Moonroof with a Spoiler. Because two separate feature families are represented by the one descriptor, the data mapping needs to map from the exemplary compound descriptor into a feature family for spoiler, and a second feature family for moonroof. Table 2 illustrates an exemplary mapping of the compound descriptor into two individual feature families.

TABLE 2

Exemplary Mapping of a Compound Descriptor Into Feature Families

| VOI Descriptor | Moonroof Feature Family | Sunroof Feature Family |
|---|---|---|
| "" | Moonroof.null | Sunroof.null |
| M | Moonroof.Moonroof | Sunroof.null |
| S | Moonroof.null | Sunroof.Sunroof |
| 1 | Moonroof.Moonroof | Sunroof.Sunroof |

Next, in step 2520, features and feature families are defined. As discussed above, superfamilies may group families that should be considered together according to business judgments, and may accordingly allow for multiple features to be considered in combination to manage important interactions. For example, superfamilies may be defined to allow for two or more related sets of feature families to be grouped together. Each superfamily that is defined may consist of all possible ways of bundling features for the feature families that are included in the superfamily. The resulting superfamilies accordingly contain exactly one feature from each contributing feature family. Defining superfamilies allows the inventory management server 150 to treat features in combination, where they would otherwise be considered independently. Accordingly, these superfamilies may allow the inventory management server 150 to consider multiple features together, at the expense of potentially increasing the dimensionality of the problem of recommending orders.

In general, construction and use of superfamilies is most appropriate when there are relatively strong correlations or interactions among features from different feature families. Care should be exercised in the construction of superfamilies, because a superfamily may have a substantially greater number of possible feature combinations than the sum of the component features themselves. When considering inventory and sales turn rates over a superfamily, inventory and sales at the feature level may be more broadly distributed, which may lead to noisier estimates of mix and turn rates. Moreover, it is possible that order recommendations resulting from explicit consideration of feature family interactions may be different than the order recommendations obtained when feature families are considered independently. Accordingly, features that are estimated to have a strong correspondence with one another may be good features to include in a superfamily.

For example, for a vehicle line, a superfamily may be created for a base-vehicle super-feature which may include a body style, trim level or marketing series, wheelbase, engine, transmission, and drive type (e.g., 4×2 or 4×4), as applicable. As another example, a superfamily may be created as the combination of primary exterior paint family with two-tone accent color family, to create a Paint/Two-Tone superfamily. Since every accent color is generally not available with every primary paint color, and since the two feature families are expected to interact strongly, then the grouping of these feature families into a superfamily may be appropriate.

Once superfamilies are defined, those feature families that belong to the superfamily may be ignored during the remaining inventory management server 150 process steps until specific orders are constructed, which may require that a superfamily once again be decomposed into its constituent components. However, in other examples, it may be advantageous to additionally include the constituent components in the feature allocation step. For example, a superfamily defining a base of a vehicle may be included in feature allocation. Although cab style may be included in the superfamily, cab style may additionally be broken out separately in the feature allocation. This may be done because cab style may result in a greater turn rate than the turn rate shown when cab style is included in the base vehicle superfamily, or as another example, due to a production constraint on cab style. For example, a superfamily may include ten different features, wherein each of the different features has a slightly low inventory mix rate (e.g., 0.01 units low). However, when each of the different features of a cab style is considered individually, each of the different features may still have a slightly low inventory mix rate (e.g., 0.01 units low) that when summed yields a more significant mix rate (e.g., 0.01 *10=0.1 units).

Next, in step 2530, report formats are defined. For example, a report format including one or more of weighted feature level dealer turn rates 804, weighted feature level dealer sales mix rates 902, feature level dealer projected sales 1008, feature level dealer projected inventory 1012, as well as historical sales, sales mix graphs 2104, projected inventory mix graphs 2106, and report time periods 2108 may be established. As discussed above, exemplary reports are illustrated in FIGS. 22-24.

Next, in step 2540, product information is encoded to generate a list of all possible configurations. In this step, the inventory management server 150 may encode the product definition into a standard format, and may generate a list of all possible item configurations based on the encoding. An exemplary portion of a listing of all possible configurations for a vehicle is illustrated in Table 3; in practice, an actual such listing would likely be much larger.

TABLE 3

| Exemplary portion of a listing of all possible configurations for a vehicle | | | | | | |
|---|---|---|---|---|---|---|
| Audio.Ap | Audio.null | Navig.N | Navig.null | Paint.BriSil | Paint.DarBlu | Paint.Ebo |
| 0 | 1 | 0 | 1 | 1 | 0 | 0 |
| 0 | 1 | 0 | 1 | 0 | 1 | 0 |
| 0 | 1 | 0 | 1 | 0 | 0 | 1 |
| 0 | 1 | 1 | 0 | 1 | 0 | 0 |
| 0 | 1 | 1 | 0 | 0 | 1 | 0 |
| 0 | 1 | 1 | 0 | 0 | 0 | 1 |
| 1 | 0 | 0 | 1 | 1 | 0 | 0 |

Next, in step 2550, product definition relationship constraints are generated. Such constraints may represented by a set of one or more inequalities. For example, a product dependency may be as simple as Feature A requiring Feature B, which implies that the allocation of Feature A has to be less than or equal to the allocation of Feature B. As an example, for some manufacturers, in order to have a heated seats feature, a vehicle also has to have leather seats. Therefore, the allocation of heated seats must be less than or equal to the allocation of leather seats. However, other features dependencies can be substantially more complicated, and may involve multiple features from multiple feature families or superfamilies.

Once the inventory management server 150 has generated the list of all possible configurations, the inventory management server 150 analyzes the configurations to generate a list of product definition relationship constraints that define how to constrain the feature allocation process when there are feature dependencies. That is, some features cannot be included in an item with certain other features, or can only be included when other features are present. Feature allocation needs to respect such constraints, or the system 100 could end up recommending that a dealer order items that could not or would not actually be built.

Following step 2550, the process 2500 ends.

B. Periodic Order Selection Process

Figure 26:
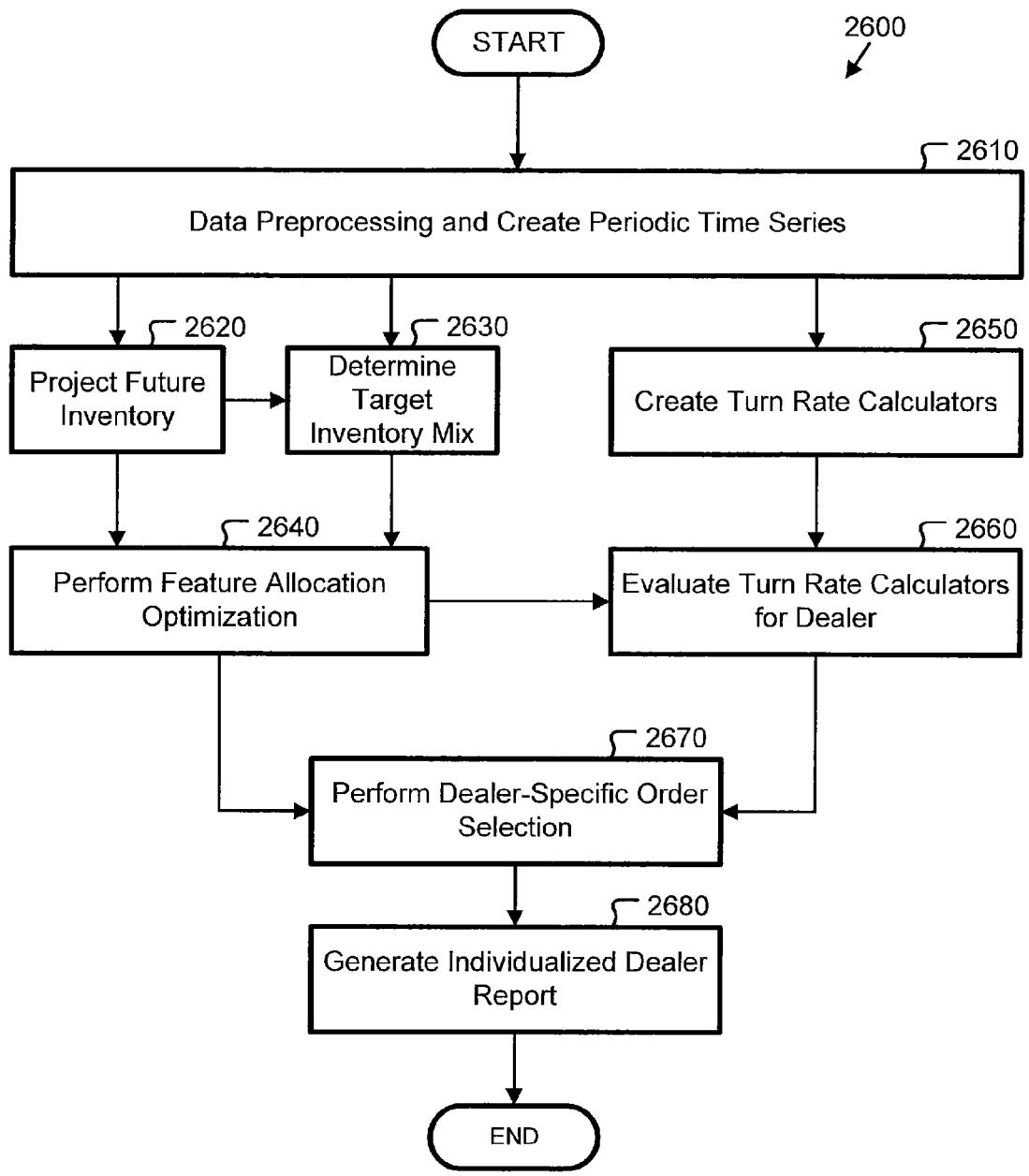
FIG. 26 illustrates an exemplary overall periodic process for a feature selection system.

FIG. 26 illustrates an order selection process 2600 for an order generation system. Once the inventory management server 150 has completed the setup process 2500, the overall process 2600 may be run one or multiple times for the selection of features to include in recommended orders to send to dealers. Generally, process 2600 is run on a periodic basis, e.g., once per week.

1. Order Cycles

Generally, order recommendations relating to an item are generated based on the item's historical sales and inventory. Further, the process 2600 takes into account the delay between the time an item is ordered and the time at which it is actually delivered into the dealer's inventory. Such delay may occur because of the time it takes for an item to be manufactured, processed through a fulfillment system, etc.

TABLE 4

Exemplary time line for periodic processing on the weekend of Jan. 31, 2009

| Oct. 6, 2008 | ... | Jan. 19, 2009 | January 26 | February 2 | February 9 | February 16 | February 23 | March 2 | March 9 | March 16 |
|---|---|---|---|---|---|---|---|---|---|---|
| Start Observed Sales Week | | Last Observed Sales Week | | Orders Placed & Scheduled | | | | Allocation and Item Production | | Item Arrival in Inventory |

Before discussing exemplary steps of process 2600, Table 4 illustrates an exemplary time line illustrating the relative timing of, the inputs to, processing time of, and outputs of process 2600. In this example, the order generation system 100 considers the most recent 16 weeks of complete data, and estimates that a four week period that elapses before items in a recommended order are built, and an additional two week period will elapse before the items are delivered into dealer inventory 115. These time periods are merely exemplary, and different time periods for measuring past sales and inventory, order production time, and order transit time are possible, and likely.

The dates as illustrated in Table 4 assume that Mondays are the first day of each weekly time period. Historical sales and inventory are observed from Oct. 6, 2008 through the week of Jan. 22, 2009 Based on these exemplary 16 weeks of sales and inventory data, the inventory management server 150 performs the overall periodic process 2600 between Friday, January 30$^{th}$, and Monday February 2$^{nd}$. These orders are then recommended to a target dealer 420, and may be ordered by the target dealer 420, for example by Wednesday, February 4$^{th}$. Scheduling of the orders may then be performed later that same week, such as on February 5$^{th}$-6$^{th}$. The scheduled items are then produced, for example, during the week of March 2$^{nd}$. Including an approximate transit time of two weeks from factory to dealer, the items are expected to arrive in inventory the week of Mar. 16, 2009

2. Process Description

With this background regarding the time at which overall periodic process 2600 may be run, exemplary steps of process 2600 are discussed in more detail. First, in a step 2610, the inventory management server 150 retrieves pertinent data, e.g., from data store 140 via data server 130. The received data may then be pre-processed into a periodic time series in a consistent form suitable for further processing.

Generally, data preprocessing includes determining weighted dealer sales 306, weighted feature level dealer sales 316, weighted market sales 312, weighted feature level market sales 320, weighted dealer inventory 704, weighted market inventory 708, weighted feature level dealer inventory 712, and weighted feature level market inventory 716. Data preprocessing is discussed in more detail with regard to FIG. 27.

After step 2610 is executed and the data is in a suitable format, steps 2620, 2630, and 2650 each may be executed next, either sequentially or in parallel, or in some combination of sequentially and in parallel. With regard to the parallelization, supercomputer 170 may be used to perform at least portions of steps 2620, 2630, and 2650 in parallel. Additionally, supercomputer 170 may further be used to calculate data for different item types in parallel, and for different sales regions in parallel.

In step 2620, future inventory is projected. For example, dealer projected inventory and feature level dealer projected inventory 1012 may be computed as discussed above. Inventory projection, as discussed above, determines the composition of dealer inventory 115 for a dealer at some future point in time when orders for items being placed in the current week begin to arrive at the dealer, e.g., 6 to 10 weeks in the future. The projection considers what is currently in the dealer's inventory 115, what is in the dealer's pipeline (i.e., items that have been ordered but have not yet arrived at the dealership), and items that are expected to be sold in the intervening time periods. In some examples, inventory projection may further take into account disturbances, such as shipment delays, item trades between dealers, and inaccurate sales forecasts.

Due to the large possible number of orderable configurations compared to the number of features, in many examples inventory is projected at a feature level, as opposed to a configuration level, so as to reduce the computational complexity of the inventory projection.

In addition to projecting future inventory, also in step 2620 historical inventory turn rates are determined. Historical sales mix rates, and historical feature level inventory mix rates may be determined at both the dealer and the market area levels. For example, the inventory management server 150 may determine weighted dealer turn rate 802, weighted feature level dealer turn rate 804, weighted market turn rate 806, weighted feature level market turn rates 808, weighted feature level dealer sales mix rate 902, and weighted feature level market sales mix rate 904. The historical sales mix rates provide a target level for allocating features, as discussed above. Details of the inventory projection step are further discussed below with regard to FIG. 28.

In step 2630, target feature level inventory mix rates 1104 are determined. For example, inventory management server 150 may determine the relative total weighted dealer turn rates 1102 for a target dealer 420. Then, based on the relative total weighted dealer turn rates 1102, the inventory management server 150 may determine target feature level inventory mix rates 1104 based on weighted feature level dealer sales mix rate 902, or further based on weighted feature level market sales mix rates 904 and relative total weighted dealer turn rates 1102. Further details of determining target feature level inventory mix rates 1104 are discussed with regard to FIG. 29.

Once steps 2620 and 2630 have been executed, step 2640 may be executed next. In step 2640, feature allocation optimization is performed. To perform feature allocation optimization, as discussed above, the inventory management server 150 may simultaneously or nearly simultaneously consider the allocation of features for all dealers 430 within a sales region.

Further, a target dealer 420 may have competing dealers 430 that are not in the same sales region as the target dealer 420. This may occur, for example, when a target dealer 420 is located near a boundary of a sales region. In such a situation, the target dealer 420 may have competing dealers 430 that are located outside of the dealer's sales region that are a part of the target dealer's 420 dealer market area 410. Although the system may not perform feature allocation simultaneously with the target dealer 420 and any potential competing dealers 430 that are located outside the sales region, those competing dealers 430 outside the dealer market area 410 may still contribute to the dealer market area 410 calculations including inventory and sales. Thus, while sales region boundaries may be explicit, dealer market areas 410 may overlap and may still be taken into account during feature allocation.

In any event, the inventory management server 150 may use, at least in part, item allocations for the target dealer 420, target feature level inventory mix rates 1104 for the target dealer 420, dealer projected inventory 1006 for the target dealer 420, and feature level dealer projected inventory 1012 for the target dealer 420 to perform feature allocation optimization. In addition, the inventory management server 150 may further use production constraints and product definition constraints determined during the setup process 2500. Given this information, the feature allocation optimization may be performed as a mixed integer quadratic programming problem whose output is an allocation of features to all target dealers 420 in a sales region that should lead to a balanced inventory, while ensuring that the vehicle allocation, production definitions, and production constraint are all satisfied. In other examples, rather than mixed integer quadratic programming, alternative approximate formulations that are faster and yield similar results may be used. Exemplary alternate formulations may initially be real-valued quadratic programming problems, followed by integerization of the solution, which can be structured as a mixed integer linear programming problem. Feature allocation optimization is discussed in more detail with regard to FIG. 30.

In step 2650, which may be executed in parallel with steps 2620, 2630, and 2640, turn rate calculators are generated. For example, the inventory management server 150, or the inventory management server 150 in combination with supercomputer 170 for use of parallelizing the calculations may create a set of turn rate calculators. Creation of the turn rate calculators is discussed above and also with regard to FIG. 31.

Once steps 2640 and 2650 are executed, step 2660 may be executed. In step 2660, turn rate calculators are evaluated for a target dealer 420. For example, the inventory management server 150, or the inventory management server 150 in combination with supercomputer 170 may use the determined feature allocations and the created turn rate calculators to determine average turn rates for each possible configuration that fits within the optimized feature allocations. Further, a variance for the estimated turn rates may also be computed which is used to adjust average turn rates according to their variance. Evaluation of the turn rate calculators is discussed in more detail with regard to FIG. 32.

Next in step 2670, dealer specific order selections are made. For example, these dealer specific order selections may include which configurations of features should be ordered, and how many of each configuration that should be ordered. Generation of dealer specific order selections is discussed in more detail with regard to FIG. 33.

Next in step 2680, individualized dealer reports 2102 are generated. For example, the inventory management server 150 may create a dealer report 2102 based on the dealer specific order selections generated for a target dealer 420 in step 2670. Dealer reports 2102, including recommended order configurations, may be made available in either human-readable and/or machine-readable format. For example, a dealer report 2102 may include a list of the possible configurations 1802 that are recommended to be ordered, along with quantities of each configuration that is recommended.

These dealer reports 2102 may be made accessible to a dealer computer 110 of the target dealer 420. In some cases, the dealer reports 2102 may be e-mailed to the dealer computer 110, placed on a web site accessible by the dealer computer 110, or sent through another electronic or physical mechanisms to the address of the target dealer 420, etc.

In some instances the target dealer 420 may enter orders into the ordering server 120 based on the dealer report 2102. Additionally or alternately, the recommended order configurations may be entered into the ordering server 120 by the inventory management server 150, and may be reviewed by the target dealer 420.

Next, process 2600 ends.

C. Data Preprocessing

Figure 27:
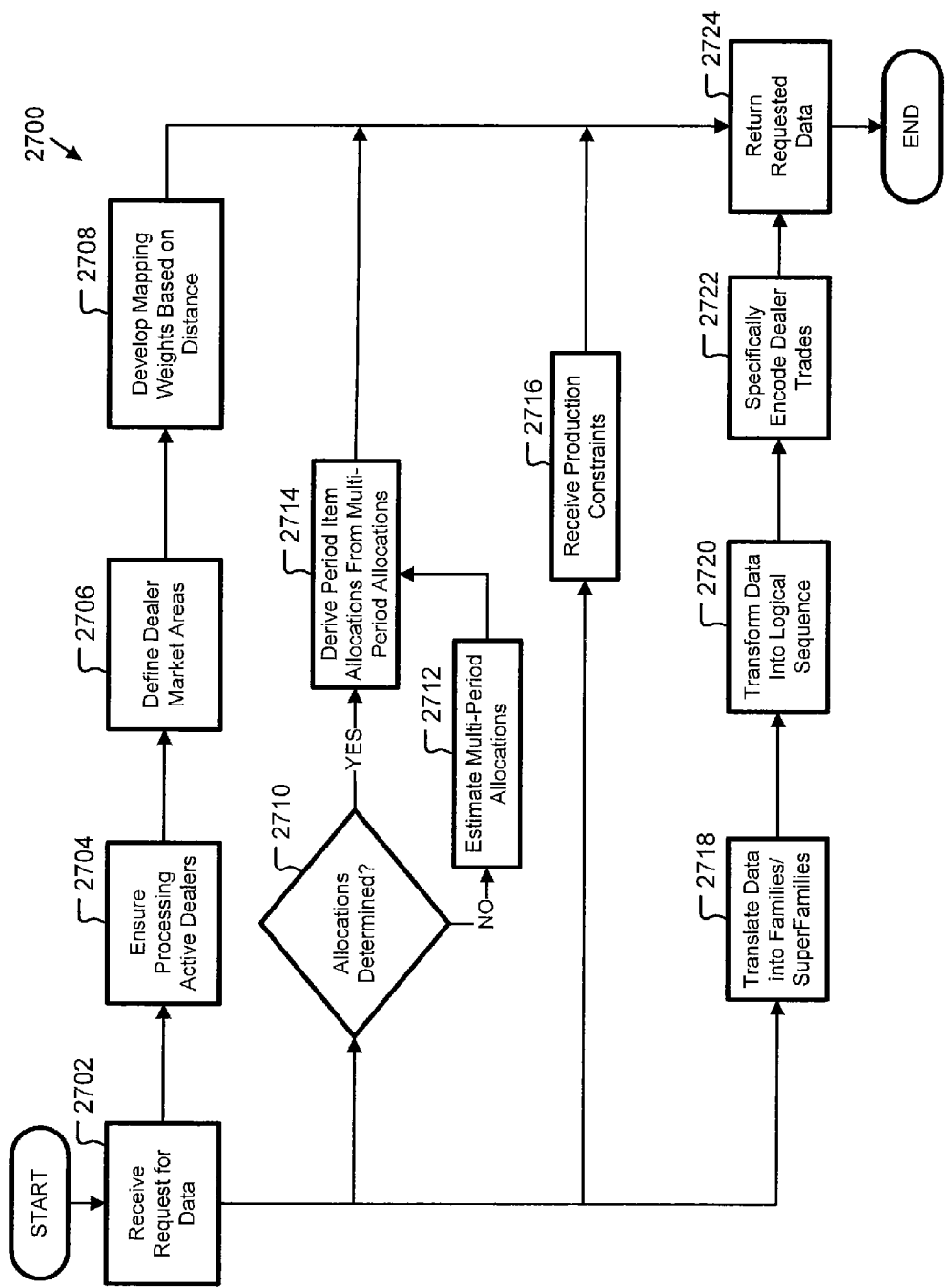
FIG. 27 illustrates an exemplary process for data preprocessing.

FIG. 27 illustrates an exemplary process 2700 for data preprocessing. FIG. 27 describes details of data preprocessing referenced above with respect to step 2610 of process 2600 discussed in FIG. 26.

Process 2700 begins in a step 2702, in which a request for data is received. For example, data server 130 may receive a request for data from the inventory management server 150. The request for data may include requests for dealer data, vehicle allocations, production constraints, and sales and inventory history. One or more of these items of data may be requested by the inventory management server 150, and the requests may be handled by the data server 130 sequentially or in parallel. Accordingly, one or more of steps 2704, 2710, 2716, and 2718 may be executed following step 2702.

In step 2704, data for the target dealer 420 is requested. This data includes, for example, dealer name 202 and dealer location 204, dealer market region 206, etc. For example, data for the target dealer 420 may be requested from data store 140 by data server 130, based on a request for dealer data received from inventory management server 150. In some instances, data for the target dealer 420 is requested by the inventory management server 150 each time the periodic process 2600 is run, so that the most current information for target dealers 420 is available. Once this information is retrieved, the inventory management server 150 may determine which target dealers 420 are currently active dealers, and which target dealers 420 have become inactive, due to temporary or permanent closure.

Next, in step 2706, the retrieved dealer data may be used to determine the dealer market areas 410 for each target dealer 420 determined to be active.

Next, in step 2708, mapping weights are determined for each competing dealer 430 in the target dealer market area 410. As discussed above, these weights may be based on the distance of the competing dealer 430 from the target dealer 420 and a dealer market weighting function 310 that determines the weighting for a competing dealer 430 according to the distance. Next, step 2724 is executed.

Step 2710 is executed after step 2702 determined whether an item allocation estimation is needed. If not, then step 2714 is executed next. Otherwise, step 2712 is executed next. Total item allocations are the number of units a dealer is contractually obligated to order for a given item within a given time period, such as a month. In some cases, item allocations may simply be retrieved from data store 140 by data server 130 and returned to the inventory management server 150. In these cases, an item allocations determination is not needed, and item allocations are simply retrieved in step 2714.

However, in cases where an actual item allocation is unavailable, an estimate of item allocations for a dealer may be determined. For example, item allocations may not have been agreed upon during a negotiation process between manufacturer and dealer, in which case a proposed value or a prior period value may be used. Thus, step 2712, item allocations are estimated. For example, the inventory management server 150 or the data server 130 may estimate item allocations, for example, based on item allocations from prior weeks. To take another example, the allocations may be determined for the period of a month, but the period for recommending orders may be performed weekly. Accordingly, the monthly allocations are thus converted into weekly allocations. Following step 2712, step 2714 is executed.

In step 2714, allocations for the current period are determined from the actual or estimated allocations. Next, step 2724 is executed.

As discussed above, step 2716 is executed next after step 2702 if production constraints are requested. In step 2716, the data server 130 retrieves production constraints. For example, if feature demand is higher than supply, production constraints must be imposed. As another example, a business decision may be is made to force or limit a mix rate or volume for a feature. Next, step 2724 is executed.

As discussed above, step 2718 is executed next after step 2702 if sales and inventory history are requested. Data store 140 may maintain one record for each item. Within each record, a variety of item attributes are stored, including all item features, and status data such as the production date, sales date and other related sales information. As discussed above, data store 140 is used by the data server 130 to provide information on vehicle content, a variety of relevant event dates, including item trade dates, a variety of other attributes such as whether an item was a stock or retail order type, and information about ordering and selling dealers. This data may require preprocessing to construct relevant period inventory and sales time series, and to assemble item-level data sets for developing neural network inventory turn rate calculators.

Accordingly, in step 2718, in order to construct a periodic time series and item-level data sets, data retrieved from the data store 140 via data server 130 is translated into definitions of feature families and superfamilies, as well as constituent features. The constituent features may be further encoded as a sequence of independent binary variables to denote the presence or absence of features, as also discussed above.

Next, in step 2720, the retrieved data is transformed to ensure that events occur in a logical date-ordered sequence. For example, a vehicle should not be indicated as arriving at a dealer before the item has been manufactured, or as being sold before being manufactured or arriving.

Next, in step 2722, dealer trades of items are tracked for items in inventory. For example, item records may include a field indicating a prior stocking dealer. If this field includes a non-null value, then the item may be determined as having been traded. This step is important to allow for tracking of which dealer has what items in inventory. For example, an item may be sold by a trading dealer. Where an item is traded, the item sale should reflect the dealer who sold the item, not the dealer from which the item was previously traded. Ensuring that item trades are properly accounted for allows for maintaining accuracy in the computation of inventory mix rates, among other things. Next, step 2724 is executed.

In step 2724, the data requested in step 2702 is returned to the inventory management server 150.

Process 2700 ends following step 2724.

D. Inventory Projection Process

Figure 28:
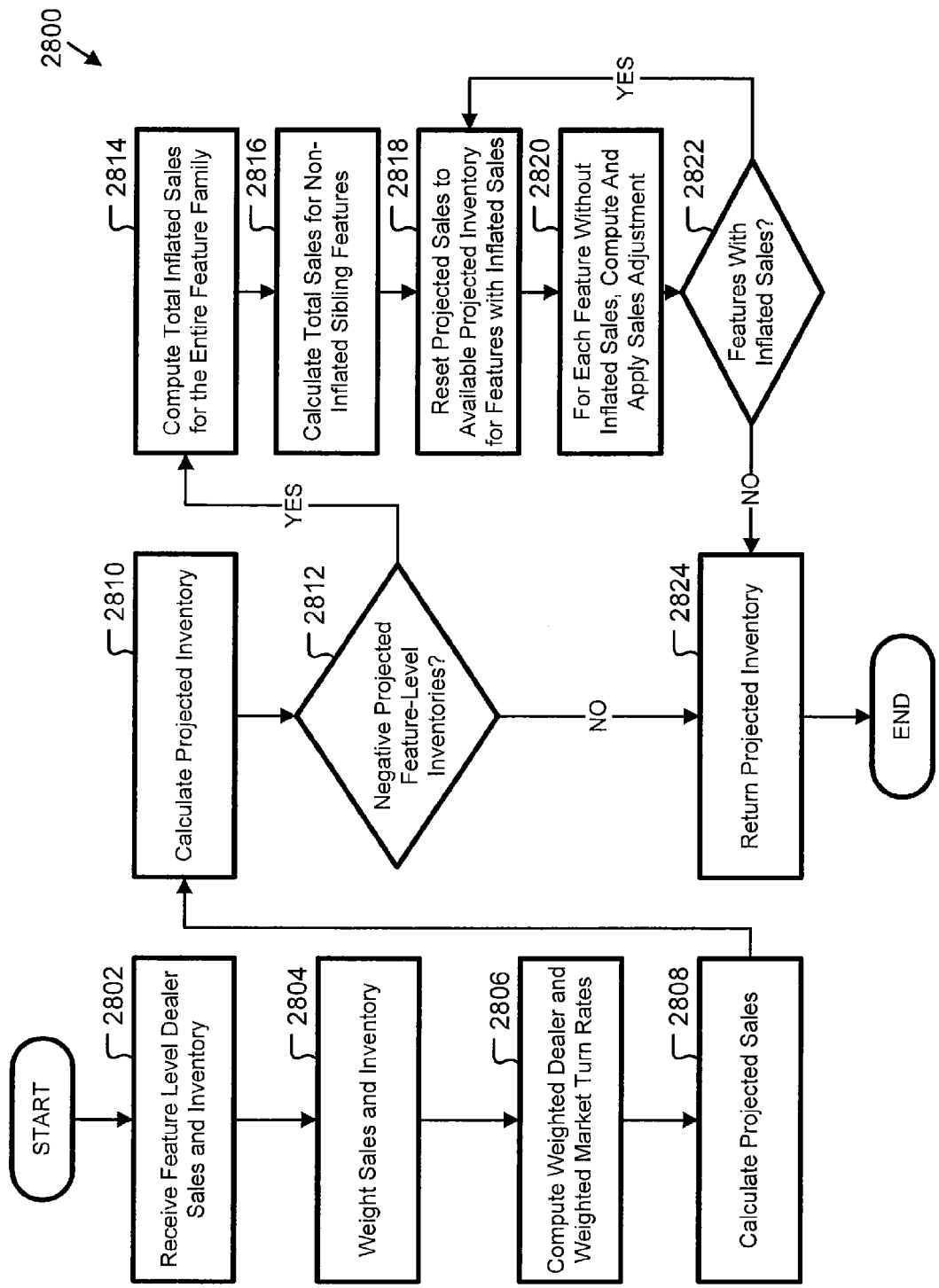
FIG. 28 illustrates an exemplary process for inventory projection.

FIG. 28 illustrates an exemplary process for inventory projection. FIG. 28 includes additional details of the step 2620 of process 2600 discussed in FIG. 26.

In step 2802, the inventory management server 150 receives, for an item, feature level actual dealer sales 314 and feature level actual dealer inventory 710 for a plurality of features, i.e., for a plurality of combinations of one or more features that may be associated with the item. For example, the sales and inventory information may be retrieved based on a request for data from the inventory management server 150 to the data server 130.

Next, in step 2804, the inventory management server 150 determines weighted sales and inventory. For example, the inventory management server 150 may determine weighted feature level dealer sales 316 and/or weighted feature level dealer inventory 712 for a plurality of features from the feature level actual dealer inventory 710 as discussed above.

Next, in step 2806, the inventory management server 150 determines weighted dealer and market turn rates. For example, as discussed above, the inventory management server 150 may determine weighted dealer turn rates 802, weighted feature level dealer turn rates 804, weighted market turn rates 806, and/or weighted feature level market turn rates 808 for a plurality of features.

Next, in step 2808, the inventory management server 150 determines projected sales. For example, as discussed above, the inventory management server 150 may determine dealer projected sales 1002 and/or feature level dealer projected sales 1008 for a plurality of features.

Next, in step 2810, the inventory management server 150 determines projected inventory. For example, as discussed above, the inventory management server 150 may determine dealer projected inventory 1006 and/or feature level dealer projected inventory 1012.

Next, in step 2812, the inventory management server 150 determines whether feature level dealer projected inventory 1012 for any features are negative. If so, then step 2814 is executed next. Otherwise step 2824 is executed next.

In step 2814, the inventory management server 150 determines the total inflated sales for the feature family 214 including the negative feature level dealer projected inventory 1012. Inflated sales are projected sales that are in excess of inventory available for sale. For example, the inventory management server 150 may determine inflated sales for a feature family as the number of units projected to have been sold that are in excess of available inventory over all features in a feature family 214.

Next, in step 2816, the inventory management server 150 determines the total sales for non-inflated sibling features. For example, the inventory management server 150 may determine total sales for other features in the feature family 214 that have sales less than feature level dealer projected inventory 1012 for the features.

Next, in step 2818, the inventory management server 150 resets feature level dealer projected sales 1008 to available feature level dealer projected inventory 1012 for features with inflated sales. For example, feature level dealer projected sales 1008 for the feature with inflated sales may be reset to feature level dealer projected inventory 1012 for that feature.

Next in step 2820, the inventory management server 150 computes and applies a sales adjustment to each feature in the feature family 214 that does not have inflated sales. For example, the inventory management server 150 may move projected sales for the feature with inflated sales into projected sales for other features in the feature family 214 that do not have inflated sales.

Next, in step 2822, the inventory management server 150 determines if any other features have inflated sales. If yes, then step 2818 is executed next. Otherwise step 2824 is executed.

In step 2824, the inventory management server 150 returns the feature level dealer projected inventory 1012 for further processing. For example, the inventory management server 150 may send the feature level dealer projected inventory 1012 to the data server 130 to be stored in the data store 140.

Next, the process 2800 ends.

Steps 2812 through 2822 redistribute negative inventory, because, in reality, a dealer cannot have negative items in inventory. However, it is possible that in some examples the calculated feature level dealer projected inventory 1012 may be returned as feature level dealer projected inventory 1012 without regard to the process for adjusting features with inflated sales (i.e., step 2824 may be executed following step 2810, bypassing steps 2812 through 2822). This is possible because, in principle, the system can predict negative inventories for items including various features, where these negative inventories may simply be taken to be an indication that demand is even greater than the inventory that is available. Accordingly, the system may take into account negative projected inventory by simply setting an appropriate target feature level inventory mix rate 1104 for the appropriate item feature.

E. Establishing Target Inventory Mix Rates

Figure 29:
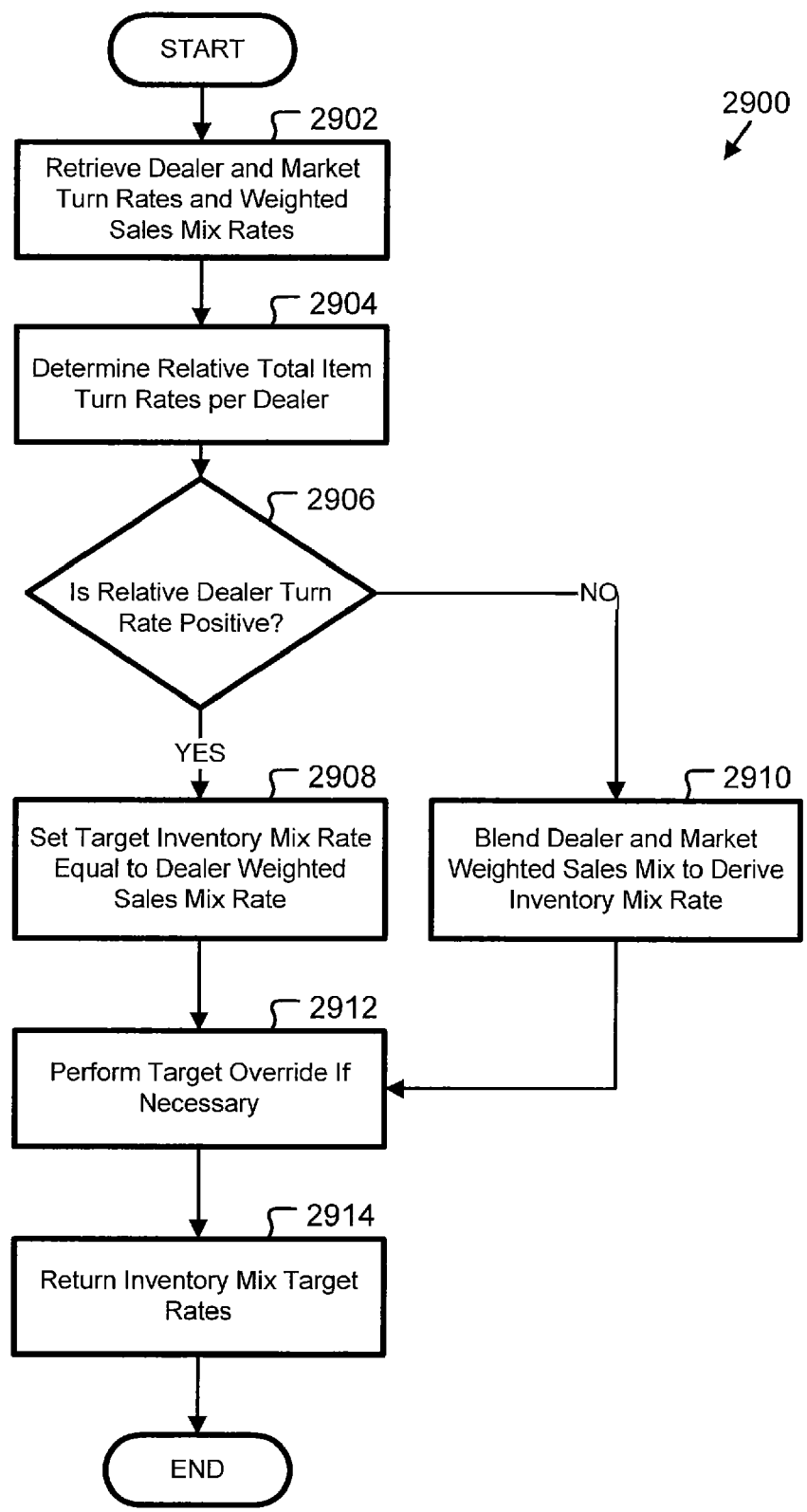
FIG. 29 illustrates an exemplary process for establishing target inventory mix rates.

FIG. 29 illustrates an exemplary process for establishing target inventory mix rates. FIG. 29 includes additional details concerning 2630 of process 2600 illustrated in FIG. 26.

In step 2902, the inventory management server 150 retrieves dealer and market turn rates and weighted sales mix rates. For example, the inventory management server 150 may retrieve one or more of weighted dealer turn rates 802, weighted feature level dealer turn rates 804, weighted market turn rates 806, weighted feature level market turn rates 808, weighted feature level dealer sales mix rates 902, and weighted feature level market sales mix rates 904 from the data store 140 via data server 130.

Next, in step 2904, the inventory management server 150 determines relative total weighted dealer turn rates 1102 per dealer. As discussed above, a relative total weighted dealer turn rate 1102 is a measure of whether a target dealer 420 is over or underperforming compared to competing dealers 430 in a market area 410.

Next, in step 2906, the inventory management server 150 determines whether the relative total weighted dealer turn rate 1102 is positive. A positive result indicates that the target dealer 420 is performing better than the average for the dealer market area 410, while a negative value indicates that the target dealer 420 is under-performing relative to the dealer market area 410. If the result is positive or zero, step 2908 is executed next. Otherwise, step 2910 is executed next.

In step 2908, the inventory management server 150 sets the target feature level inventory mix rates 1104 for the dealer equal to the corresponding weighted feature level dealer sales mix rate 902. Step 2912 is executed next.

In step 2910, the inventory management server 150 sets the target feature level inventory mix rates 1104 for the dealer according to a blend of the corresponding weighted feature level dealer sales mix rate 902 and the corresponding weighted feature level market sales mix rates 904. For example, the blending of weighted feature level dealer sales mix rates 902 and weighted feature level market sales mix rate 904 may be based on relative total weighted dealer turn rate 1102, such that a dealer that is only slightly underperforming may have a target feature level inventory mix rate 1104 consisting mostly of weighted feature level dealer sales mix rates 902. However, for a dealer that is at the other extreme (e.g., no sales in the past 16 weeks), target feature level inventory mix rate 1104 would be determined entirely or almost entirely based on the weighted feature level market sales mix rate 904. As with step 2908, step 2912 is executed next.

In step 2912, the inventory management server 150 optionally overrides the target feature level inventory mix rates 1104. For example, in some instances a user of the system may cause the inventory management server 150 to override or otherwise adjust target feature level inventory mix rates 1104 to take into account a temporary incentive offered on items that may have affected sales of particular items and thus skewed the data used to generate the target feature level inventory mix rates 1104. For example an incentive lowering the price on vehicles with moonroofs may have temporarily increased the sales of vehicles with moonroofs compared to those without. However, once the incentive is removed, the increased sales may not be expected to continue. Thus, a target feature level inventory mix rate 1104 for vehicles with moonroofs may be lowered by a target feature level inventory mix rate 1104 override.

When performing target inventory mix rate overrides, it is generally preferable to apply the override such that it can be applied to each dealer's target feature mix rates in a way that preserves the heterogeneity of the mix rates across dealers. For example, if a feature is selling in a region at a 30% mix, and a known price increase on that feature is anticipated to decrease the sales mix rate to 20%, a dealer that had been selling vehicles with an 85% mix of that feature might expect to drop to an 80% mix while a dealer that had been selling at a 15% mix of that feature might predict a drop to 8%. Further, the target inventory mix rates for all other features within the feature family may be adjusted so that the sum of mix rates over all features within a feature family remains equal to one. One way to accomplish this is to adjust the remaining mix rates in proportion to the distance between the current mix rates and zero, or to adjust the remaining mix rates in proportion to the distance between one and the current mix rates. Thus, the further a beginning mix rate is from a target value of zero or one, the larger its relative change, subject to the condition that the final mix rates must sum to unity.

Next, in step 2914, the inventory management server 150 returns the target feature level inventory mix rates 1104 for further processing. For example, the inventory management server 150 may send the target feature level inventory mix rates 1104 to the data server 130 to be stored in the data store 140. Next, the process 2900 ends.

F. Feature Allocation Process

Figure 30:
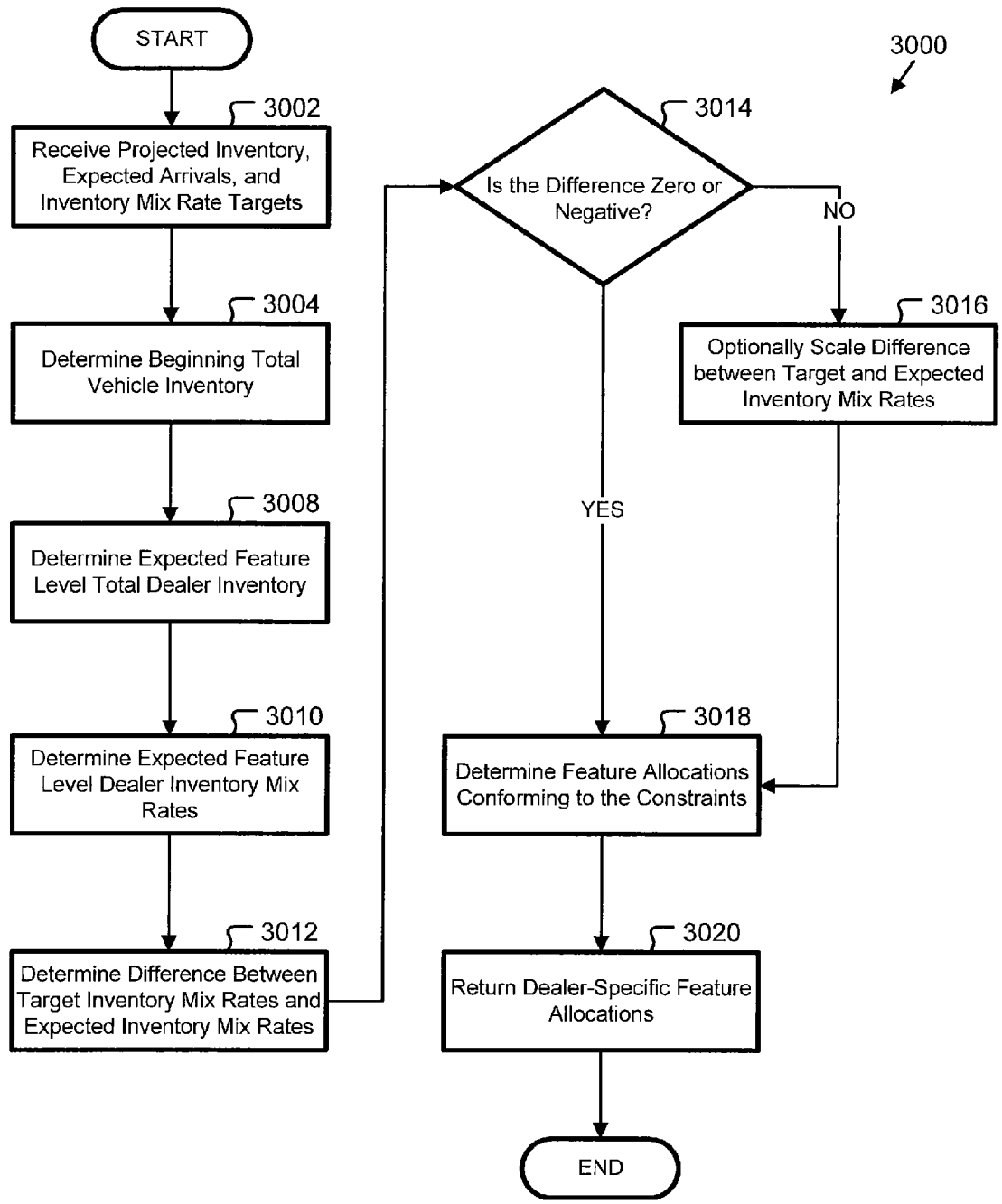
FIG. 30 illustrates an exemplary process for feature allocation.

FIG. 30 illustrates an exemplary process for feature allocation. FIG. 30 includes additional details of the perform feature allocation optimization step 2640 of process 2600 illustrated in FIG. 26.

In step 3002, the inventory management server 150 retrieves projected inventory, expected arrivals, and inventory mix rate targets. For example, the inventory management server 150 may request for the data server 130 to retrieve from the data store 140 one or more of initial total dealer inventory 1202, actual dealer inventory 702, dealer expected arrivals 1004, dealer projected inventory 1006, feature level dealer expected arrivals 1010, target feature level inventory mix rates 1104, and initial feature level total dealer inventory 1206.

Next, in step 3004, the inventory management server 150 determines the initial feature level total dealer inventory 1206, discussed above.

Next, in step 3008, the inventory management server 150 determines expected feature level total dealer inventory 1208, discussed above.

Next in step 3010, the inventory management server 150 determines expected feature level dealer inventory mix rates 1210, discussed above.

Next, in step 3012, the inventory management server 150 determines the difference between the target feature level inventory mix rates 1104 and the expected feature level dealer inventory mix rates 1210. For example, the inventory management server 150 may subtract the target feature level inventory mix rates 1104 from the expected feature level dealer inventory mix rates 1210.

Next, in step 3014, the inventory management server 150 determines whether the difference is zero or negative. If yes, then step 3018 is executed next. Otherwise, step 3016 is executed next.

In step 3016, the inventory management server 150 optionally adjusts the difference between the target feature level inventory mix rates 1104 and the expected feature level dealer inventory mix rates 1210. For example, the inventory management server 150 may adjust the target feature level inventory mix rate 1104 to be closer to the expected feature level dealer inventory mix rate 1210 to encourage variety during feature allocation.

In step 3018, the inventory management server 150, or a single processor or node of supercomputer 170, determines feature allocations 1212 as discussed above, feature allocations 1212 include quantities of each feature that are recommended to be ordered, but do not include the other features that may be included in an item configuration. The feature allocations 1212 may be optimized using the feature allocation objective function, also taking into account the other constraints, so as to achieve the desired feature allocations 1212 while simultaneously adhering to any imposed constraints (e.g., product definition constraints, inequality constraints, etc.). It should be noted that the feature allocations are based on product definitions. Therefore, while the individual features may not directly interact within the objective function, and are basically isolated and independent with essentially no cross coupling, there is still coupling between the features in the optimization due to the product definition constraints. For example, feature allocations 1212 would not allocate two heated seats features, and one leather seat feature, if heated seats require for seats to be leather.

A function for feature allocation 1212 may be structured as a minimization of the squared difference between the target feature level inventory mix rates 1104 and actual inventory mix rates at a future time for all item features that can be ordered by a target dealer 420. Feature allocation may be performed by inventory management server 150, or by a dedicated computing device suited to complex computing tasks such as supercomputer 170.

Next, in step 3020, the inventory management server 150 returns the dealer specific feature allocations. For example, the feature allocation 1212 may be sent by the inventory management server 150 to the data server 130 to be stored in the data store 140 for further use.

Next, the process 3000 ends.

G. Creating Inventory Turn Rate Calculators

Figure 31:
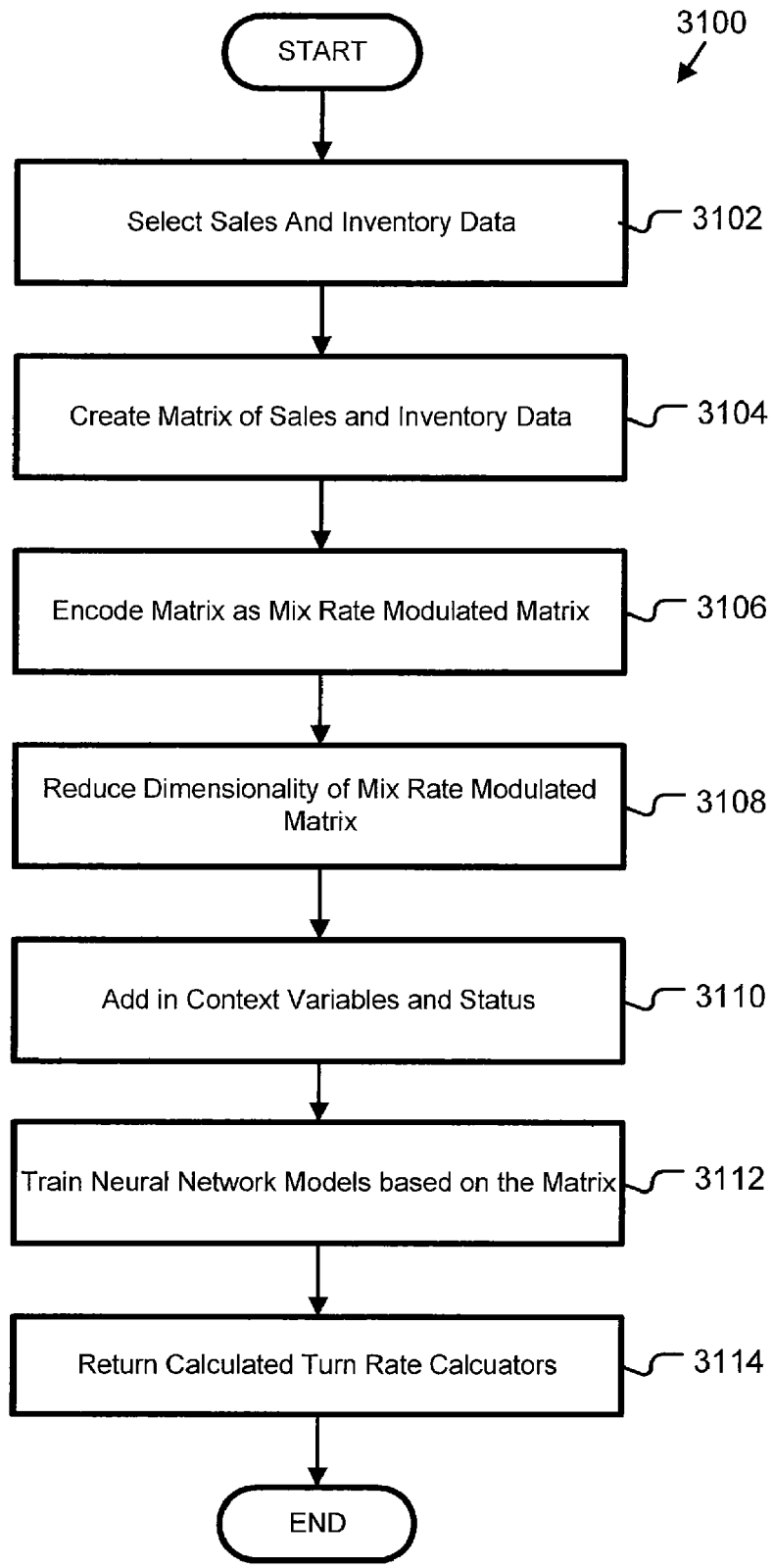
FIG. 31 illustrates an exemplary process for creating turn rate calculators.

FIG. 31 illustrates an exemplary process for creating neural network inventory turn rate calculators. FIG. 31 includes additional details of step 2650 of process 2600 illustrated in FIG. 26.

In step 3102, the inventory management server 150 selects sales and inventory data. The inventory management server 150 may retrieve records relating to the configuration of items that have sold or are in inventory, and also contextual information for the items to be input to neural network models executed by supercomputer 170, such as discussed above. For example, the inventory management server 150 may retrieve from the data store 140 using data server 130 data including historical item orders/configurations 208, item transactions 210, dealer locations 204, feature families 214, actual market inventory 706, actual dealer inventory 702, weighted feature level market turn rates 808, weighted feature level market sales mix rates 904, feature bundling 220 and incentives 228.

Next, in step 3104, the inventory management server 150 creates a matrix of sales and inventory data. For example, as discussed above, inventory management server 150 may take item configuration data 208 in combination with weighted feature level market inventory mix rates 908 to construct a representation of configurations of individual items. The inventory management server 150 may create a data record for each item being encoded, where the data record includes a list of features associated with an item by placing the value one in a field associated with a feature if the feature exists with respect to the item, and placing the value zero in the field associated with the feature if the feature does not exist with respect to the item.

Next, in step 3106, the inventory management server 150 encodes the matrix as a mix rate modulated item configuration data 1402 matrix. For example, the inventory management server 150 may subtract a market level inventory mix rate for the feature from the one or the zero encoded in the field corresponding to that feature.

Next, in step 3108, the inventory management server 150 reduces the dimensionality of the mix rate modulated item configuration data 1402 matrix. For example, the inventory management server 150 may perform principal components analysis (PCA) on the matrix, as discussed above.

Next, in step 3110, the inventory management server 150 combines context variables and status information with the mix rate modulated item configuration data 1402 matrix. For example, each data record may further include context variables 1602 relating to the item associated with the data record, such as dealer latitude 1604, dealer longitude 1606, dealer item market inventory 1608, retail/stock order type indicator 1610, number of weeks in inventory 1612, dealer fraction of item market inventory 1614, and market turn rate 1616. Additionally, each data record may further include a sold status 1702, which may be appended to the rows in the matrix to indicate whether or not the item corresponding to the data row was sold.

Next, in step 3112, the inventory management server 150 and/or supercomputer 170 train the neural network models using the mix rate modulated item configuration data 1402 matrix including context variables 1602 and sold status 1702 information. For example, each neural network model may be trained to determine a dealer configuration turn rate 1902 for an item configuration in the matrix. Each turn rate calculator 1302 may include one or more such trained models, and may be used to determine an expected inventory turn rate for an item configuration.

Next, in step 3110, the trained calculated turn rate calculators 1302 may be returned for later use. For example, the inventory management server 150 may receive the calculated turn rate calculators, and may send the calculated turn rate calculators to the data server 130 for storage in the data store 140.

Following step 3110, the process 3100 ends.

H. Evaluating Turn Rate Calculators

Figure 32:
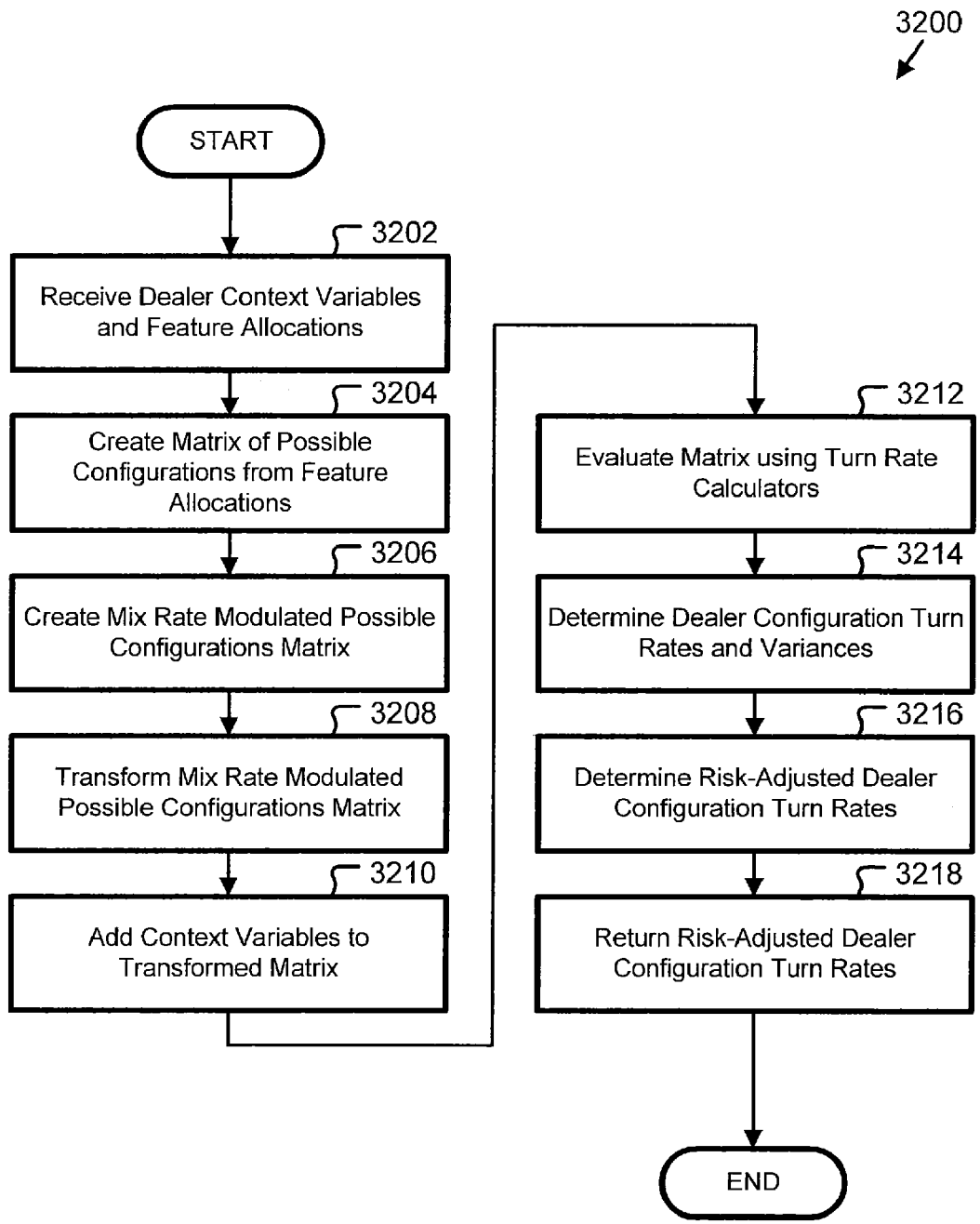
FIG. 32 illustrates an exemplary process for evaluating turn rate calculators.

FIG. 32 illustrates an exemplary process for evaluating neural network inventory turn rate calculators 1302. FIG. 32 includes additional details of step 2660 of process 2600 illustrated in FIG. 26.

In step 3202, the inventory management server 150 receives context variables 1602, weighted feature level market inventory mix rates 908 and feature allocations 1212 for a target dealer 420. Each target dealer 420 should be considered in isolation for the neural network, because each target dealer 420 will have potentially unique characteristics, such as context variables 1602.

Next, in step 3204, the inventory management server 150 creates a possible configurations matrix 1802. For example, the inventory management server 150 may create a matrix including all realizable configurations that may be built. Then, any configuration that is precluded from being considered due to zero allocation of features based on the feature allocations 1212 may be removed to create a possible configurations matrix 1802. Creation of the possible configurations matrix 1802 may also take into account other constraints, such as production constraints 222 and material availability constraints 226.

Next, in step 3206, the inventory management server 150 creates a mix rate modulated possible configurations matrix 1804 from the possible configurations matrix 1802. For example, the inventory management server 150 may determine a percentage of items in inventory for which the feature exists for each feature listed in the possible configurations matrix 1802. Then, for each field associated with a feature in the data record, the supercomputer 170 may subtract the percentage of items in inventory for which the feature is expected to exist from the one or the zero encoded in the field, thereby generating the mix rate modulated possible configurations matrix 1804.

Next, in step 3208, the inventory management server 150 transforms the mix rate modulated possible configurations matrix 1804. For example, the mix rate modulated possible configurations matrix 1804 may be transformed according to the rotation matrix 1506 previously computed during the PCA of the mix rate modulated item configuration data 1402. Specifically, the rotation matrix 1506 from the PCA performed in the neural network training step may be applied to the matrix of mix rate modulated possible configurations matrix 1804 to transform the matrix 1804 into a transformed mix rate modulated possible configurations matrix 1810. The resulting transformed mix rate modulated possible configurations matrix 1810 may thus be transformed into a reduced space.

Next, in step 3210, the inventory management server 150 combines context variables 1602 with the mix rate modulated item configurations matrix 1804. Exemplary context variables 1602 may include, but are by no means limited to, dealer latitude 1604, dealer longitude 1606, retail/stock indicator 1610, number of weeks in inventory 1612, dealer fraction of item market inventory 1614, and market turn rate 1616.

Next, in step 3212, the inventory management server 150 evaluates the mix rate modulated item configurations matrix 1804 using the turn rate calculators 1302. For example, the inventory management server 150 may evaluate the mix rate modulated item configurations matrix 1804 against inventory turn rate calculators 1302 created through use of the neural network. Accordingly, the inventory management server 150 may run many different inventory turn rate calculators 1302, for example 100 models, on the matrix to determine multiple dealer configuration turn rates 1902 that indicate the expected turn rate for each configuration in the matrix according to each model. In some instances, these calculations of multiple dealer configuration turn rates 1902 may be performed in parallel through use of supercomputer 170 for various item types and sales regions.

Next, in step 3214, the inventory management server 150 determines dealer configuration turn rates 1902 and dealer configuration turn rate variances 1904 based on the multiple dealer configuration turn rates 1902. For example, the inventory management server 150 may determine an average dealer configuration turn rate 1902 based on an average of a set of independent models run for each configuration in the matrix 1804. For example, in one implementation, the set of independent models includes one hundred different models. The neural network may further produce dealer configuration turn rate variances 1904 for each dealer configuration turn rate 1902 that indicate a confidence factor for the associated dealer configuration turn rates 1902.

Next, in step 3216, the inventory management server 150 determines risk-adjusted dealer configuration turn rates 1906 based on the configuration turn rates 1902 and dealer configuration turn rate variances 1904. For example, the supercomputer 170 may determine risk-adjusted dealer configuration turn rates 1906 by subtracting dealer configuration turn rate variances 1904 multiplied by a constant from dealer configuration turn rates 1902.

Next, in step 3218, the inventory management server 150 returns risk-adjusted dealer configuration turn rates 1906. For example, the inventory management server 150 may receive the risk-adjusted dealer configuration turn rates 1906 from the supercomputer 170. The inventory management server 150 may then send the risk-adjusted dealer configuration turn rates 1906 to the data server 130 to store in the data store 140. Next, the process 3200 ends.

I. Generating Recommended Orders

Figure 33:
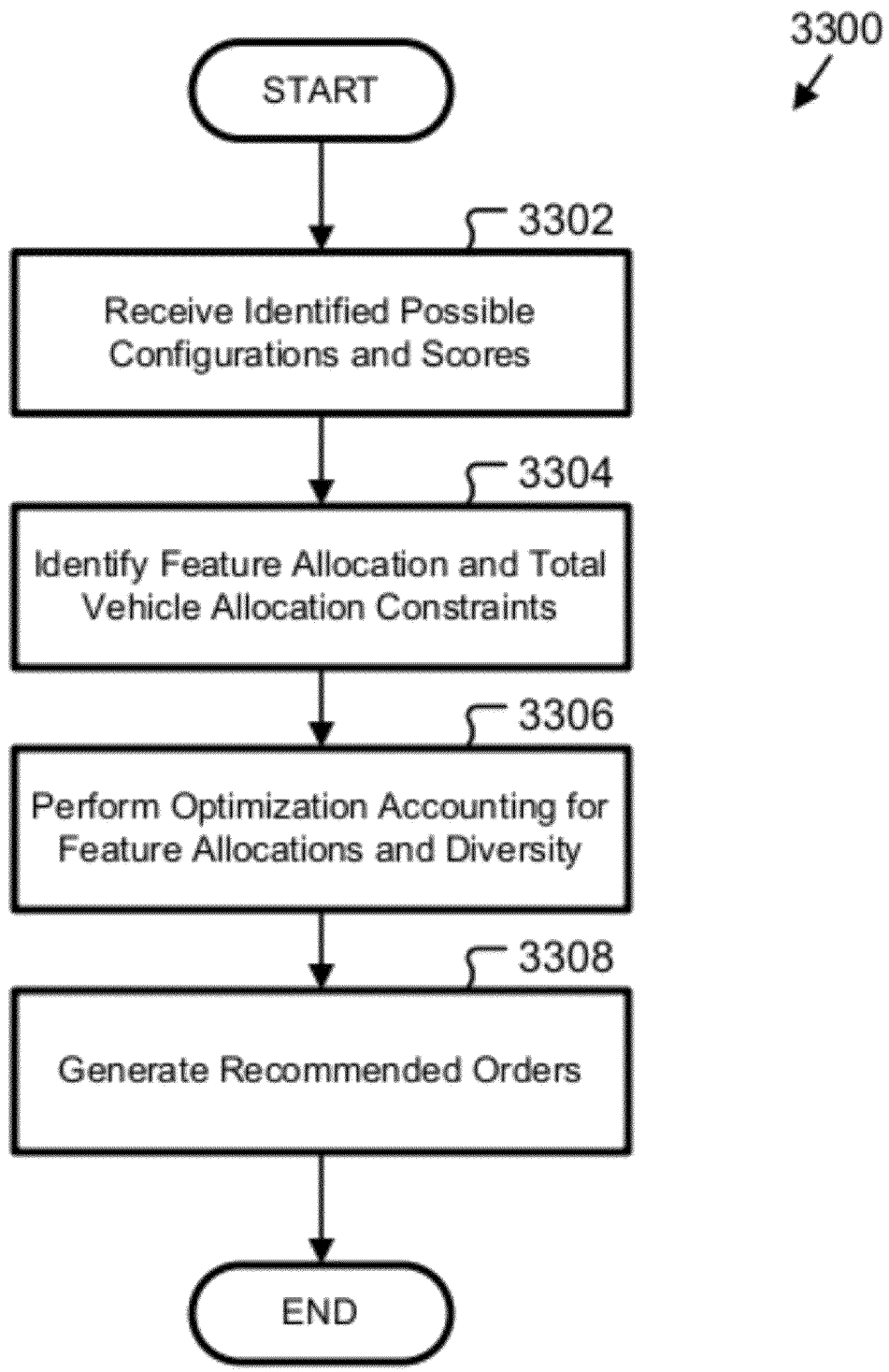
FIG. 33 illustrates an exemplary process for generating recommended orders.

FIG. 33 illustrates an exemplary process for generating recommended orders for a target dealer 420. FIG. 33 includes additional details of step 2680 of process 2600 illustrated in FIG. 26.

In step 3302, the inventory management server 150 receives risk-adjusted dealer configuration turn rates 1906 for possible configurations of the item of interest. That is, the possible configurations may correspond to the list of possible configurations 1802 determined above with regard to turn rate calculator evaluation discussed above with regard to process 3200 in FIG. 32.

Next, in step 3304, the inventory management server 150 identifies feature allocations 1212 and dealer allocations 212 relating to the target dealer 420. For example, the inventory management server 150 may retrieve from the data store 140, e.g., using data server 130, the feature allocations 1212 and dealer allocations 212 corresponding to the target dealer 420.

Next, in step 3306, the inventory management server 150 performs an optimization that takes into account the feature allocations 1212 and any diversity penalties 2002. For example, specific dealer orders recommendations may be generated, including quantities, such that the sum of risk-adjusted dealer configuration turn rates 1906 of the recommended configurations is maximized. A penalty 2002 for selecting the same configuration multiple times may further be imposed on the optimization to introduce greater diversity in the inventory of a target dealer 420.

Next, in step 3308, the inventory management server 150 generates a list of recommended order configurations. For example, the inventory management server 150 may determine a corresponding numeric count of the number of items of each configuration of the possible configurations 1802 to recommend.

Next the process 3300 ends.

V. Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

We claim:

1. A method, comprising:
   generating a matrix that combines item configuration data for a plurality of configurations of an item with inventory mix rate data such that cells in the matrix include an indication of an inventory mix rate related to an item feature;
   using the matrix to develop a plurality of neural network inventory turn rate models; and
   using the turn rate models to associate a value with each configuration in the plurality of configurations.

2. The method of claim 1, further comprising, prior to using the matrix to develop a plurality of neural network inventory turn rate models, augmenting the matrix with a set of context variables that are unrelated to item configuration.

3. The method of claim 1, wherein the inventory mix rate data relates to a market area defined according to a dealer.

4. The method of claim 1, further comprising performing a statistical analysis to reduce the dimensionality of the matrix before using the matrix to develop a plurality of neural network inventory turn rate models.

5. The method of claim 1, wherein the set of context variables includes at least one of dealer latitude, dealer longitude, dealer item market inventory, retail/stock order type indicator, number of weeks in inventory, dealer fraction of item market inventory, and market turn rate.

6. The method of claim 1, further comprising:
   evaluating the combined data set in each of the plurality of neural network inventory turn rate models to generate a set of estimated turn rates, each of the estimated turn rates relating to a configuration in the plurality of configurations; and
   computing an average estimated turn rate for a first configuration from the plurality of configurations based at least in part on estimated turn rates that relate to the first configuration.

7. The method of claim 6, further comprising:
   computing a risk adjusted estimated turn rate for the configuration based at least in part on the average estimated turn rate and a risk adjustment factor; and
   computing a plurality of second risk adjusted turns rates, each of the second adjusted turn rates corresponding to one of a plurality of second configurations for the item.

8. The method of claim 7, wherein the risk adjustment factor is based on a standard deviation of the set of estimated turn rates.

9. The method of claim 7, further comprising optimizing, subject to a set of constraints, a sum of the risk adjusted turn rate and the second risk adjusted turn rates to determine a set of recommended configurations to provide a dealer with a maximized average turn rate for the item.

10. The method of claim 9, wherein the set of recommended configurations further includes quantities of each configuration, wherein at least one configuration is included more than one time in the set of recommended configurations.

11. The method of claim 9, further comprising generating at least one of order recommendations and dealer trade recommendations that include at least a portion of the set of recommended configurations associated with the turn rates included in the sum.

12. The method of claim 9, wherein the constraints include at least one of: bounding the number of items ordered for any configuration by zero and a total item allocation for the dealer, limiting the number of items to order over all configurations to the total item allocation for the dealer, limiting the sum of all items ordered over all features in a feature family to the total item allocation for the dealer, and a limit on the total number of items that may be ordered with a particular feature.

13. The method of claim 1, wherein generating the matrix includes:
   encoding a plurality of data records included in the configuration data, each data record being associated with one of the configurations and including a list of features of the associated item, wherein for each feature in the list of features the encoding includes placing a first value in a field associated with a feature if the feature exists with respect to the item, and placing a second value in the field associated with the feature if the feature does not exist with respect to the item;
   for each feature in the list of features, determining the percentage of items in the encoding for which the feature exists; and for each field associated with a feature in the data record, subtracting the percentage from the first value or the second value encoded in the field, thereby generating a matrix of inventory mix rates.

14. The method of claim 13, wherein the first value and the second value are each selected from the group consisting of a one and a zero.

15. A system, comprising:
a data store that includes item configuration data for a plurality of configurations of an item and inventory mix rate data; and
a computing device configured to:
generate a matrix that combines the item configuration data with the inventory mix rate data such that cells in the matrix include an indication of an inventory mix rate related to an item feature;
use the matrix to develop a plurality of neural network inventory turn rate models; and
use the turn rate models to associate a value with each configuration in the plurality of configurations.

16. The system of claim 15, the computing device further configured to augment the matrix with a set of context variables that are unrelated to item configuration prior to using the matrix to develop a plurality of neural network inventory turn rate models.

17. The system of claim 15, wherein the inventory mix rate data relates to a market area defined according to a dealer.

18. The system of claim 15, the computing device further configured to perform a statistical analysis to reduce the dimensionality of the matrix before using the matrix to develop a plurality of neural network inventory turn rate models.

19. The system of claim 15, wherein the set of context variables includes at least one of dealer latitude, dealer longitude, dealer item market inventory, retail/stock order type indicator, number of weeks in inventory, dealer fraction of item market inventory, and market turn rate.

20. The system of claim 15, the computing device further configured to:
evaluate the combined data set in each of the plurality of neural network inventory turn rate models to generate a set of estimated turn rates, each of the estimated turn rates relating to a configuration in the plurality of configurations; and
compute an average estimated turn rate for a first configuration from the plurality of configurations based at least in part on estimated turn rates that relate to the first configuration.

21. The system of claim 20, the computing device further configured to:
compute a risk adjusted estimated turn rate for the configuration based at least in part on the average estimated turn rate and a risk adjustment factor; and
compute a plurality of second risk adjusted turns rates, each of the second adjusted turn rates corresponding to one of a plurality of second configurations for the item.

22. The system of claim 21, wherein the risk adjustment factor is based on a standard deviation of the set of estimated turn rates.

23. The system of claim 21, the computing device further configured to optimize, subject to a set of constraints, a sum of the risk adjusted turn rate and the second risk adjusted turn rates to determine a set of recommended configurations to provide a dealer with a maximized average turn rate for the item.

24. The system of claim 23, wherein the set of recommended configurations further includes quantities of each configuration, wherein at least one configuration is included more than one time in the set of recommended configurations.

25. The system of claim 23, the computing device further configured to generate at least one of order recommendations and dealer trade recommendations that include at least a portion of the set of recommended configurations associated with the turn rates included in the sum.

26. The system of claim 23, wherein the constraints include at least one of: bounding the number of items ordered for any configuration by zero and a total item allocation for the dealer, limiting the number of items to order over all configurations to the total item allocation for the dealer, limiting the sum of all items ordered over all features in a feature family to the total item allocation for the dealer, and a limit on the total number of items that may be ordered with a particular feature.

27. The system of claim 15, the computing device further configured to:
encode a plurality of data records included in the configuration data, each data record being associated with one of the configurations and including a list of features of the associated item, wherein for each feature in the list of features the encoding includes placing a first value in a field associated with a feature if the feature exists with respect to the item, and placing a second value in the field associated with the feature if the feature does not exist with respect to the item;
for each feature in the list of features, determine the percentage of items in the encoding for which the feature exists; and
for each field associated with a feature in the data record, subtract the percentage from the first value or the second value encoded in the field, thereby generating a matrix of inventory mix rates.

28. The system of claim 27, wherein the first value and the second value are each selected from the group consisting of a one and a zero.

29. A computer-readable medium having computer-executable instructions tangibly embodied thereon, the instructions comprising instructions for:
generating a matrix that combines item configuration data for a plurality of configurations of an item with inventory mix rate data such that cells in the matrix include an indication of an inventory mix rate related to an item feature;
using the matrix to develop a plurality of neural network inventory turn rate models; and
using the turn rate models to associate a value with each configuration in the plurality of configurations.

30. The medium of claim 29, the instructions further comprising instructions for, prior to using the matrix to develop a plurality of neural network inventory turn rate models, augmenting the matrix with a set of context variables that are unrelated to item configuration.

31. The medium of claim 29, wherein the inventory mix rate data relates to a market area defined according to a dealer.

32. The medium of claim 29, the instructions further comprising instructions for performing a statistical analysis to reduce the dimensionality of the matrix before using the matrix to develop a plurality of neural network inventory turn rate models.

33. The medium of claim 29, wherein the set of context variables includes at least one of dealer latitude, dealer longitude, dealer item market inventory, retail/stock order type indicator, number of weeks in inventory, dealer fraction of item market inventory, and market turn rate.

34. The medium of claim 29, the instructions further comprising instructions for:

evaluating the combined data set in each of the plurality of neural network inventory turn rate models to generate a set of estimated turn rates, each of the estimated turn rates relating to a configuration in the plurality of configurations; and computing an average estimated turn rate for a first configuration from the plurality of configurations based at least in part on estimated turn rates that relate to the first configuration.

35. The medium of claim 34, the instructions further comprising instructions for:

computing a risk adjusted estimated turn rate for the configuration based at least in part on the average estimated turn rate and a risk adjustment factor; and computing a plurality of second risk adjusted turns rates, each of the second adjusted turn rates corresponding to one of a plurality of second configurations for the item.

36. The medium of claim 35, wherein the risk adjustment factor is based on a standard deviation of the set of estimated turn rates.

37. The medium of claim 35, the instructions further comprising instructions for optimizing, subject to a set of constraints, a sum of the risk adjusted turn rate and the second risk adjusted turn rates to determine a set of recommended configurations to provide a dealer with a maximized average turn rate for the item.

38. The medium of claim 37, wherein the set of recommended configurations further includes quantities of each configuration, wherein at least one configuration is included more than one time in the set of recommended configurations.

39. The medium of claim 37, the instructions further comprising instructions for generating at least one of order recommendations and dealer trade recommendations that include at least a portion of the set of recommended configurations associated with the turn rates included in the sum.

40. The medium of claim 37, wherein the constraints include at least one of: bounding the number of items ordered for any configuration by zero and a total item allocation for the dealer, limiting the number of items to order over all configurations to the total item allocation for the dealer, limiting the sum of all items ordered over all features in a feature family to the total item allocation for the dealer, and a limit on the total number of items that may be ordered with a particular feature.

41. The medium of claim 29, wherein generating the matrix includes:

encoding a plurality of data records included in the configuration data, each data record being associated with one of the configurations and including a list of features of the associated item, wherein for each feature in the list of features the encoding includes placing a first value in a field associated with a feature if the feature exists with respect to the item, and placing a second value in the field associated with the feature if the feature does not exist with respect to the item;

for each feature in the list of features, determining the percentage of items in the encoding for which the feature exists; and for each field associated with a feature in the data record, subtracting the percentage from the first value or the second value encoded in the field, thereby generating a matrix of inventory mix rates.

42. The medium of claim 41, wherein the first value and the second value are each selected from the group consisting of a one and a zero.

* * * * *